(12) United States Patent
Tadi et al.

(10) Patent No.: US 11,495,053 B2
(45) Date of Patent: Nov. 8, 2022

(54) SYSTEMS, METHODS, DEVICES AND APPARATUSES FOR DETECTING FACIAL EXPRESSION

(71) Applicant: MINDMAZE HOLDING SA, Lausanne (CH)

(72) Inventors: Tej Tadi, Lausanne (CH); Robert Leeb, Lausanne (CH); Nicolas Bourdaud, Lausanne (CH); Gangadhar Garipelli, Lausanne (CH); Skander Mensi, Lausanne (CH); Nicolas Merlini, Lausanne (CH); Yann Lebrun, Lausanne (CH)

(73) Assignee: MINDMAZE GROUP SA, Lausanne (CH)

( * ) Notice: Subject to any disclaimer, the term of this patent is extended or adjusted under 35 U.S.C. 154(b) by 0 days.

(21) Appl. No.: 17/000,671

(22) Filed: Aug. 24, 2020

(65) Prior Publication Data
US 2021/0174071 A1 Jun. 10, 2021

Related U.S. Application Data

(63) Continuation of application No. 15/875,227, filed on Jan. 19, 2018, now Pat. No. 10,943,100.

(60) Provisional application No. 62/481,760, filed on Apr. 5, 2017, provisional application No. 62/448,347, filed on Jan. 19, 2017.

(51) Int. Cl.
| G06V 40/16 | (2022.01) |
| G06K 9/62  | (2022.01) |
| G06F 3/01  | (2006.01) |
| G06K 9/00  | (2022.01) |
| G10L 15/02 | (2006.01) |

(Continued)

(52) U.S. Cl.
CPC .......... *G06V 40/174* (2022.01); *G06F 3/015* (2013.01); *G06K 9/6234* (2013.01); *G06K 9/6278* (2013.01); *G06K 9/6285* (2013.01); *G06K 9/6287* (2013.01); *G06V 40/176* (2022.01); *G06K 9/0051* (2013.01); *G06K 9/00523* (2013.01); *G10L 15/04* (2013.01); *G10L 2015/025* (2013.01); *G10L 2021/105* (2013.01)

(58) Field of Classification Search
None
See application file for complete search history.

(56) References Cited

U.S. PATENT DOCUMENTS

| 4,248,244 A | 2/1981 | Charnitski |
| 4,856,891 A | 8/1989 | Pflibsen |

(Continued)

FOREIGN PATENT DOCUMENTS

| CN | 103810463 | 5/2014 |
| CN | 104460955 | 3/2015 |

(Continued)

OTHER PUBLICATIONS

Sun et al. "Intelligent Human Computer Interaction Based on non redundant EMG Signal" Alexandria Engineering Journal (Nov. 14, 2019) pp. 1-9.*

(Continued)

*Primary Examiner* — Mia M Thomas
(74) *Attorney, Agent, or Firm* — Graeser Associates International Inc; Dvorah Graeser

(57) ABSTRACT

A system, method and apparatus for detecting facial expressions according to EMG signals.

17 Claims, 32 Drawing Sheets

(51) Int. Cl.
  *G10L 15/04* (2013.01)
  *G10L 21/10* (2013.01)

(56) References Cited

U.S. PATENT DOCUMENTS

| | | | |
|---|---|---|---|
| 5,767,941 | A | 6/1998 | Ferguson |
| 6,785,574 | B2 | 8/2004 | Kajitani |
| 7,554,549 | B2 | 6/2009 | Sagar |
| 8,130,225 | B2 | 3/2012 | Sullivan |
| 8,144,153 | B1 | 3/2012 | Sullivan |
| 8,493,286 | B1 | 7/2013 | Agrama |
| 8,908,960 | B2 | 12/2014 | Sullivan |
| 9,037,530 | B2 | 5/2015 | Tan |
| 9,155,487 | B2 | 10/2015 | Linderman |
| 9,191,643 | B2 | 11/2015 | Sweeney |
| 9,275,487 | B1 | 3/2016 | Van Gelder |
| 9,351,658 | B2 | 5/2016 | Lee |
| 9,389,694 | B2 | 7/2016 | Ataee |
| 9,552,510 | B2 | 1/2017 | Li |
| 9,622,703 | B2 | 4/2017 | Badower |
| 9,817,498 | B2 | 11/2017 | Song |
| 9,928,633 | B2 | 3/2018 | Cotter |
| 10,120,413 | B2 | 11/2018 | Aimone |
| 10,154,810 | B2* | 12/2018 | Tzvieli ............... A61B 5/165 |
| 10,156,949 | B2 | 12/2018 | Lee |
| 10,235,807 | B2 | 3/2019 | Thomas |
| 10,485,471 | B2* | 11/2019 | Ray ..................... A61B 5/11 |
| 10,515,474 | B2* | 12/2019 | Tadi .................. G06K 9/00335 |
| 10,521,014 | B2* | 12/2019 | Tadi .................. G06K 9/6256 |
| 10,835,167 | B2* | 11/2020 | Voss ................. G16H 20/70 |
| 10,943,100 | B2* | 3/2021 | Tadi .................. G06K 9/6234 |
| 11,000,669 | B2* | 5/2021 | Derungs ............. G06F 3/165 |
| 11,105,696 | B2* | 8/2021 | Mariani ............. G01L 5/0095 |
| 11,328,533 | B1* | 5/2022 | Tadi .................. G06V 40/15 |
| 2002/0097678 | A1 | 7/2002 | Bisher |
| 2003/0109306 | A1 | 6/2003 | Karmarkar |
| 2003/0117651 | A1 | 6/2003 | Matraszek |
| 2003/0167019 | A1 | 9/2003 | Viertio-Oja |
| 2004/0117513 | A1 | 6/2004 | Scott |
| 2004/0229685 | A1 | 11/2004 | Smith |
| 2005/0180613 | A1 | 8/2005 | Bronstein |
| 2006/0071934 | A1 | 4/2006 | Sagar |
| 2006/0235318 | A1 | 10/2006 | Ordonez Smith |
| 2007/0179396 | A1 | 8/2007 | Le |
| 2008/0058668 | A1 | 3/2008 | Seyed Momen et al. |
| 2008/0065468 | A1 | 3/2008 | Berg |
| 2008/0181507 | A1 | 7/2008 | Gope |
| 2008/0218472 | A1 | 9/2008 | Breen |
| 2008/0292147 | A1 | 11/2008 | Bronstein |
| 2009/0326406 | A1 | 12/2009 | Tan |
| 2010/0156935 | A1 | 6/2010 | Lim |
| 2010/0211397 | A1 | 8/2010 | Park |
| 2010/0315524 | A1 | 12/2010 | Gordon |
| 2011/0181601 | A1 | 7/2011 | Mumbauer |
| 2011/0243380 | A1 | 10/2011 | Forutanpour |
| 2012/0134548 | A1 | 5/2012 | Rhoads |
| 2012/0172682 | A1 | 7/2012 | Linderman |
| 2013/0021447 | A1 | 1/2013 | Brisedoux |
| 2013/0279577 | A1 | 10/2013 | Schwarz |
| 2013/0314401 | A1 | 11/2013 | Engle |
| 2014/0043434 | A1 | 2/2014 | Asano |
| 2014/0118582 | A1 | 5/2014 | Artyomov |
| 2014/0153816 | A1 | 6/2014 | Cohen |
| 2014/0164056 | A1 | 6/2014 | Johnson |
| 2014/0267413 | A1 | 9/2014 | Du |
| 2014/0267544 | A1 | 9/2014 | Li |
| 2014/0323148 | A1 | 10/2014 | Schmalstieg |
| 2014/0364703 | A1 | 12/2014 | Kim |
| 2015/0178988 | A1 | 6/2015 | Montserrat Mora |
| 2015/0192950 | A1 | 7/2015 | Tubbs |
| 2015/0213646 | A1 | 7/2015 | Ma |
| 2015/0310262 | A1 | 10/2015 | Do |
| 2015/0310263 | A1 | 10/2015 | Zhang |
| 2015/0313498 | A1 | 11/2015 | Coleman |
| 2015/0325004 | A1 | 11/2015 | Utsunomiya |
| 2016/0042548 | A1 | 2/2016 | Du |
| 2016/0077547 | A1 | 3/2016 | Aimone |
| 2016/0119541 | A1 | 4/2016 | Alvarado-Moya |
| 2016/0193732 | A1 | 7/2016 | Breazeal |
| 2016/0300252 | A1 | 10/2016 | Frank |
| 2016/0323565 | A1 | 11/2016 | Van Baarsen |
| 2016/0328875 | A1 | 11/2016 | Fang |
| 2016/0350979 | A1 | 12/2016 | Zeng |
| 2016/0360970 | A1 | 12/2016 | Tzvieli |
| 2017/0060256 | A1 | 3/2017 | Heck |
| 2017/0069094 | A1 | 3/2017 | Kim |
| 2017/0109864 | A1 | 4/2017 | Ohba |
| 2017/0140578 | A1 | 5/2017 | Xiao |
| 2017/0205903 | A1 | 7/2017 | Miller |
| 2017/0231490 | A1 | 8/2017 | Toth |
| 2017/0352183 | A1 | 12/2017 | Katz |
| 2017/0364374 | A1 | 12/2017 | Maiden |
| 2017/0367590 | A1 | 12/2017 | Sebe |
| 2018/0027222 | A1 | 1/2018 | Ogasawara |
| 2018/0107275 | A1 | 4/2018 | Chen |
| 2018/0120936 | A1 | 5/2018 | Keller |
| 2018/0139431 | A1 | 5/2018 | Simek |
| 2018/0204356 | A1 | 7/2018 | Xia |
| 2018/0211102 | A1 | 7/2018 | Alsmadi |
| 2018/0211398 | A1 | 7/2018 | Schmidt |
| 2018/0225866 | A1 | 8/2018 | Zhang |
| 2018/0239956 | A1* | 8/2018 | Tadi ................. G06V 40/176 |
| 2018/0240261 | A1 | 8/2018 | Tadi |
| 2018/0325447 | A1 | 11/2018 | Hriso |
| 2018/0335930 | A1 | 11/2018 | Scapel |
| 2019/0001129 | A1 | 1/2019 | Rosenbluth |
| 2019/0004639 | A1 | 1/2019 | Faulkner |
| 2019/0025919 | A1* | 1/2019 | Tadi ................. A61B 5/1114 |
| 2019/0029528 | A1 | 1/2019 | Tzvieli |
| 2019/0082990 | A1 | 3/2019 | Poltorak |
| 2019/0155386 | A1 | 5/2019 | Tadi |
| 2019/0188281 | A1 | 6/2019 | Bivens |
| 2019/0200888 | A1 | 7/2019 | Poltorak |
| 2019/0212752 | A1 | 7/2019 | Fong |
| 2019/0343457 | A1* | 11/2019 | Rahmani ................ G06N 3/08 |
| 2019/0369727 | A1 | 12/2019 | Li |
| 2020/0129855 | A1 | 4/2020 | Ambinder |
| 2020/0129856 | A1 | 4/2020 | Bond |
| 2020/0410702 | A1 | 12/2020 | Zhang |
| 2021/0217419 | A1* | 7/2021 | Chen .................. G06F 3/015 |
| 2022/0011864 | A1* | 1/2022 | Tadi ................. G06K 9/00536 |
| 2022/0160296 | A1* | 5/2022 | Rahmani ............... A61B 5/265 |
| 2022/0208194 | A1* | 6/2022 | Rameau ............... A61B 5/256 |

FOREIGN PATENT DOCUMENTS

| | | |
|---|---|---|
| CN | 104504366 | 4/2015 |
| DE | 102011052836 | 2/2012 |
| EP | 1032872 | 9/2000 |
| EP | 1433118 | 6/2004 |
| EP | 2118757 | 11/2009 |
| EP | 2453658 | 5/2012 |
| EP | 3155560 | 4/2017 |
| JP | 2016126500 | 7/2016 |
| KR | 20120094857 | 8/2012 |
| KR | 101307046 | 7/2013 |
| KR | 20150057424 | 5/2015 |
| KR | 20150099129 | 8/2015 |
| KR | 101585561 | 1/2016 |
| KR | 20160053749 | 5/2016 |
| WO | 2008108965 | 9/2008 |
| WO | 2015025251 | 2/2015 |
| WO | 2015192117 | 12/2015 |
| WO | 2016083826 | 6/2016 |
| WO | 2016165052 | 10/2016 |
| WO | 2017015949 | 2/2017 |

OTHER PUBLICATIONS

Patel "Human Computer Interaction Based HEMD Using Hand Gesture" SSRN Electronic Journal (May 1, 2017) pp. 1-5.*

(56) References Cited

OTHER PUBLICATIONS

Ahsan, R., Md., et.al., EMG Signal Classification for Human Computer Interaction: A Review, European Journal of Scientific Research vol. 33, No. 3 (2009) pp. 1-23 of pdf.
AlZoubi, O. et.al. Classification of EEG for Affect Recognition: An Adaptive Approach, Conference Paper, Dec. 2009, pp. 1-11 pdf.
AlZoubi, O., et al., Classification of EEG for Affect Recognition: An Adaptive Approach, Conference Paper, Dec. 2009, pp. 52-61.
Angkoon P., et at., The Relationship between Anthro-pometric Variables and Features of Electromyography Signal for Human-Computer Interface. Dr. Ganesh Naik. Applications, Challenges, and Advancements in Electromyography Signal Processing, IGI Global, 2014, 9781466660908, pp. 1-28.
Barreto, A. B. PhD., A practical EMG-based human-computer interface for users with motor disabilities, Journal of Rehabilitation Research and Development, vol. 37, No. 1 Jan./Feb. 2000, pp. 53-64.
Bartlett, M., et al., Automatic Analysis of Spontaneous Facial Behavior: A Final Project Report, Jan. 2001, pp. 1-40.
Cristhian Manuel Duran Acevedo et.al., Development of an Embedded System for Classification of EMG Signals, 2014, pp. 1-5 of pdf.
Dr Jan et al., "Fusion of Terrestrial LiDAR Point Clouds with Color Imagery", (Mar. 16, 2013), URL: http://www.cis.rit.edu/DocumentLibrary/admin/uploads/CIS000202.PDF, XP055284936.
Dubuisson, S., et al., A solution for facial expression representation and recognition, Signal Processing Image Communication 17 (2002) pp. 657-673.
Gillies, M., et.al., Semi-Autonomous Avatars: A New Direction for Expressive User Embodiment, https://doi.org/10.1075/aicr.74.17gil, Published online: Nov. 27, 2008, pp. 1-20.
Giuseppina, Carla Gini, et al., New Results on Classifying EMG Signals for Interfacing Patients and Mechanical Devices, New Trends in Medical and Service Robots, Mechanisms and Machines Science, vol. 20, (2014), pp. 1-16pdf.
Gruebler, A., et al., Design of a Wearable Device for Reading Positive Expressions from Facial EMG Signals, IEEE Transactions on Affective Computing, vol. 5, No. 3, Jul.-Sep. 2014, pp. 1-11 of pdf.
Hamedi, M., et.al. Time-Frequency Facial Gestures EMG Analysis using Bilinear Distribution, Conference Paper Nov. 2015, pp. 1-6 of pdf.
Hema, C.R. et al., Classification of Human Emotional States using Facial Electromyogram signals, Conference: International Post Graduate Research Conference ENGGPOS 2015 At: Karpagam University, Coimbatore, Mar. 2015, pp. 1-7.
Hsieh, C., et al., Effective Semantic features for facial expressions recognition using SVM, International Journal of Multimedia Tools and Applications, Mar. 2015, pp. 1-23pdf.
Huang, C., The Review of Applications and Measurements in Facial Electromyography, Journal of Medical and Biological Engineering vol. 25, No. 1 (2005), pp. 15-20.
Krepki, R., et al., Berlin Brain-Computer Interface (BBCI) towards a new communication channel for online control multimedia, Jan. 2003, pp. 1-30 pdf.
Lopez, N., Hybrid Human-Machine Interface to Mouse Control for Severely Disabled People, International Journal of Engineering and Innovative Technology, vol. 4 Iss. May 11, 2015, pp. 1-9 of pdf.
Mantoro, T., Distributed Support for Intelligent Environments, Apr. 2006, pp. 1-204.
Martisius, I., Design of a Neural Interface Based System for Control of Robotic Devices, Communications in Computerand Information Science, Sep. 2012, pp. 297-311.
Mohammad-Rezazadeh, I., et al., A novel human-machine interface based on multi-channel facial bioelectric signals, Australasian Physical & Engineering Sciences in Medicine vol. 34, No. 4, (2011) pp. 497-513.
Mohd-Yasin, F., et al., Techniques of EMG signal analysis: Detection, processing, classification and applications,Biological Procedures Online, Feb. 1997-2006, pp. 1-22 www.biologicalprocedures.com.
Notice of Allowance dated Aug. 3, 2021 for U.S. Appl. No. 16/678,182 (pp. 1-10).
Notice of Allowance dated Aug. 8, 2019 for U.S. Appl. No. 16/261,693 (pp. 1-9).
Notice of Allowance dated May 7, 2020 for U.S. Appl. No. 15/875,227 (pp. 1-11).
Novak, D., et al., A survey of methods for data fusion and system adaptation using autonomic nervous system responses in physiological computing, Interacting with Computers vol. 24 (2012) 154-172.
Office Action (Notice of Allowance and Fees Due (PTOL-85)) dated Nov. 26, 2021 for U.S. Appl. No. 16/582,675 (pp. 1-6).
Office Action dated Apr. 24, 2019 for U.S. Appl. No. 15/875,382 (pp. 1-23).
Office Action dated Apr. 30, 2019 for U.S. Appl. No. 16/261,693 (pp. 1-15).
Office Action dated Aug. 16, 2019 for U.S. Appl. No. 15/875,227 (pp. 1-12).
Office Action dated Jan. 11, 2018 for U.S. Appl. No. 15/875,306 (pp. 1-22).
Office Action dated Jan. 22, 2021 for U.S. Appl. No. 16/678,182 (pp. 1-6).
Office Action dated Jul. 31, 2020 for U.S. Appl. No. 16/678,163 (pp. 1-10).
Office Action dated Jul. 9, 2020 for U.S. Appl. No. 16/678,182 (pp. 1-8).
Office Action dated Oct. 18, 2021 for U.S. Appl. No. 16/243,186 (pp. 1-6).
Podrug, E., et al., Surface EMG pattern recognition by using DWT feature extraction and SVM classifier, First Conference of Medical and Biological Engineering in Bosnia and Herzegovina, CMBEBIH 2015, pp. 1-4 pdf.
Putze, F., et.al. Online Recognition of Facial Actions for Natural EEG-Based BCI Applications, Conference Paper Jan. 2011, pp. 1-11 of pdf.
Quan, W., et al., Facial Expression Biometrics Using Statistical Shape Models, Journal on Advances in Signal Processing, vol. 2009, Article ID 261542, pp. 1-18.
Rechy-Ramirez, E.J., et al., Bio-signal based control in assistive robots: a survey, Digital Communications and Networks vol. 1 (2015) 1-18 pdf.
Sheikh, M., Robust Recognition of Facial Expressions on Noise Degraded Facial Images, Thesis, Feb. 2011, pp. 1-129.
Sorci, M., et al., Fisher's Discriminant and Relevant Component Analysis for Static Facial Expression Classification, 15th European Signal Processing Conference (EUSIPCO 2007) pp. 115-119.
Surendran, N.K., et al., Towards Real-Time Facial Expression Recognition, Jan. 2006, pp. 1-9 pdf.
Zhang, X., et al. A real-time, practical sensor fault-tolerant module for robust EMG pattern recognition, Journal of NeuroEngineering and Rehabilitation (2015) pp. 1-16 pdf.
Notice of Allowance dated Mar. 8, 2022 for U.S. Appl. No. 16/243,186 (pp. 1-9).
Office Action (Non-Final Rejection) dated Mar. 30, 2022 for U.S. Appl. No. 17/163,327 (pp. 1-10).

\* cited by examiner

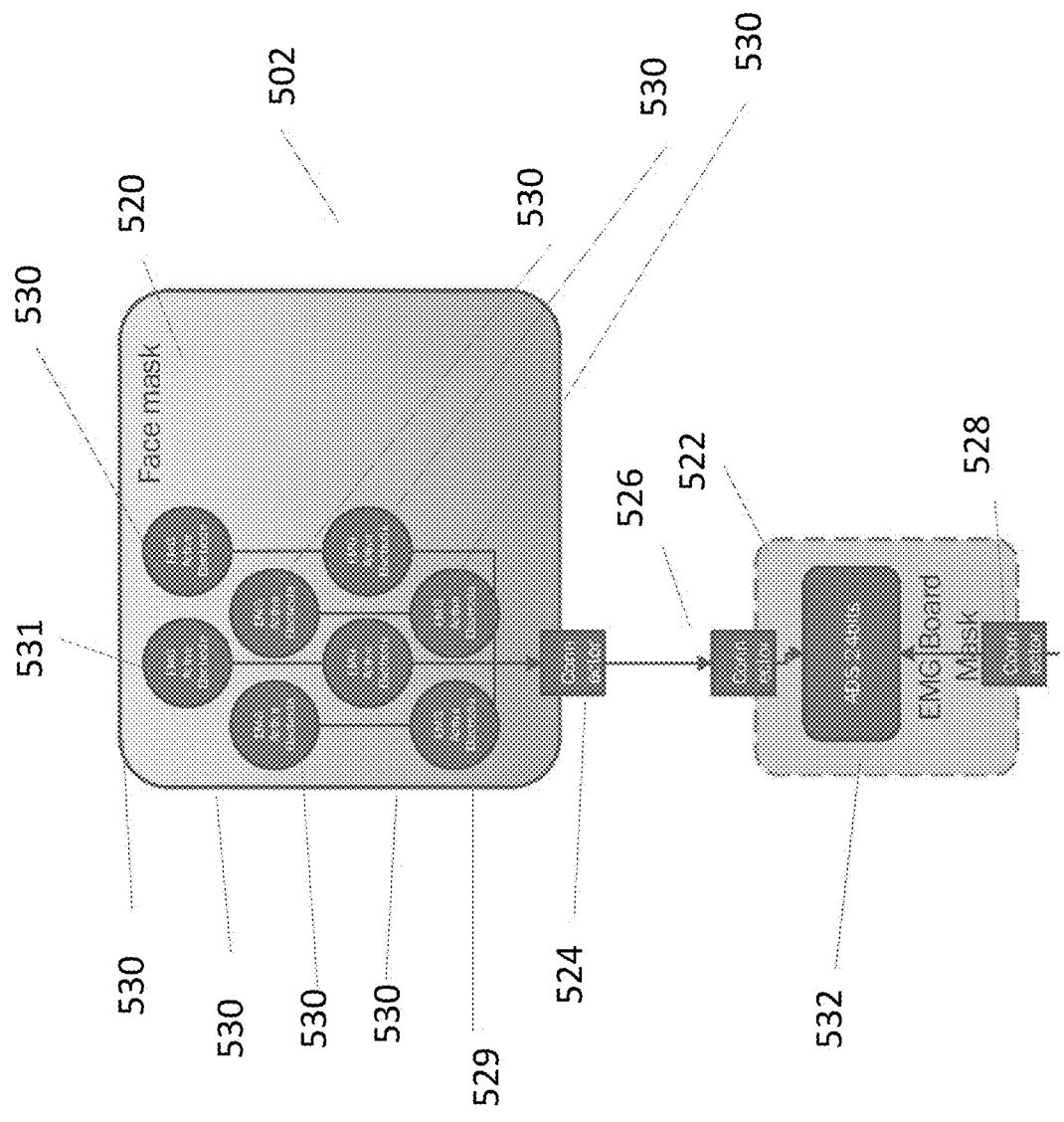
Figure 5B (zoom)

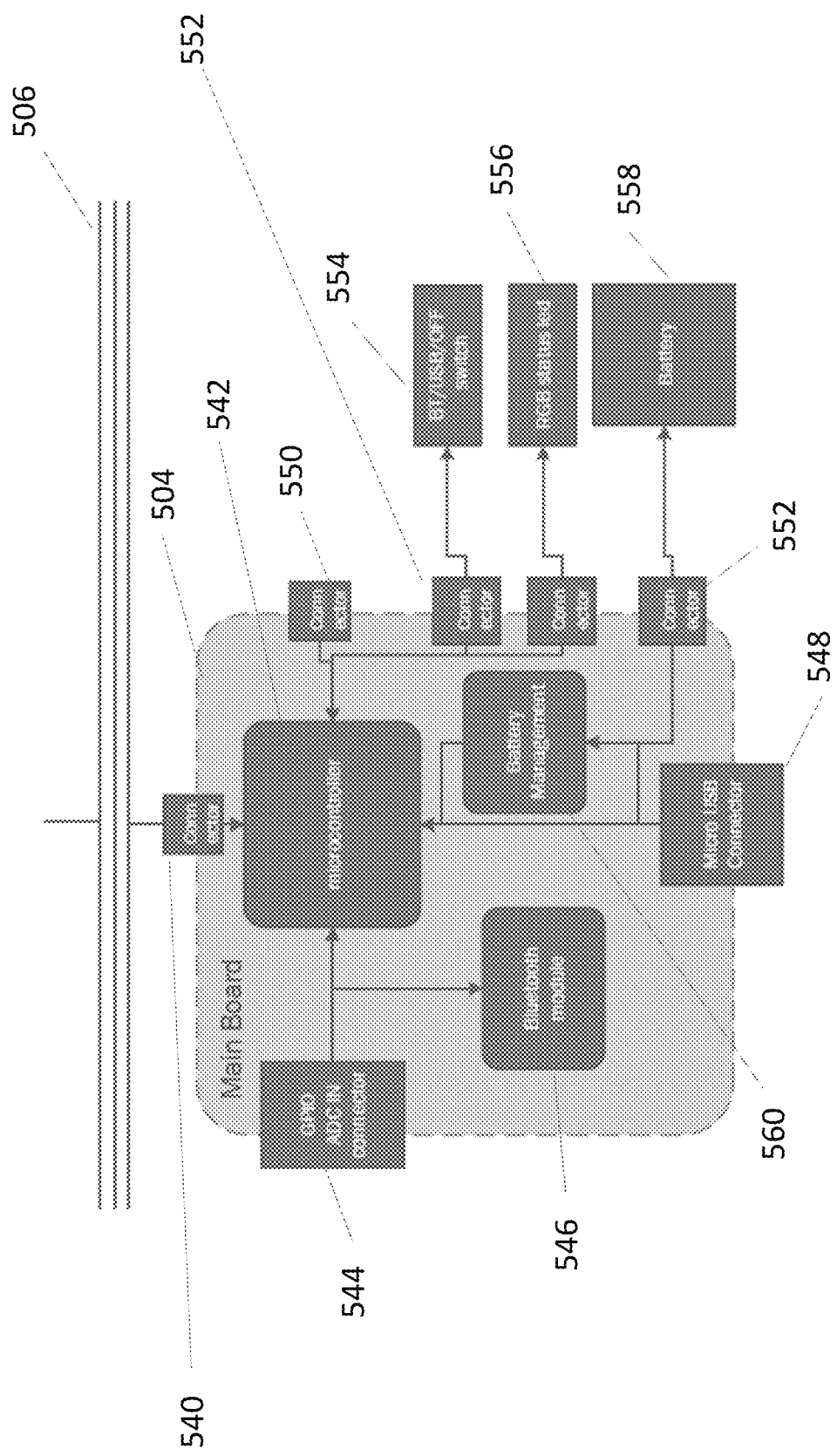
Figure 5C (zoom)

SYSTEMS, METHODS, DEVICES AND APPARATUSES FOR DETECTING FACIAL EXPRESSION

FIELD OF THE DISCLOSURE

The present disclosure relates to systems, methods and apparatuses for detecting muscle activity, and in particular, to systems, methods and apparatuses for detecting facial expression according to muscle activity.

BACKGROUND OF THE DISCLOSURE

In some known systems, online activities can use user facial expressions to perform actions for an online activity. For example, in some known systems, the systems may estimate a user's facial expressions so as to determine actions to perform within an online activity. Various algorithms can be used to analyze video feeds provided by some known systems (specifically, to perform facial recognition on frames of video feeds so as to estimate user facial expressions). Such algorithms, however, are less effective when a user engages in virtual reality (VR) activities. Specifically, VR hardware (such as VR helmets, headsets, and/or other apparatuses) can obscure portions of a user's face, making it difficult to detect a user's facial expressions while using the VR hardware.

Thus, a need exists for apparatuses, methods and systems that can accurately and efficiently detect user facial expressions even when the user's face is partially obscured.

SUMMARY OF THE DISCLOSURE

Apparatuses, methods, and systems herein facilitate a rapid, efficient mechanism for facial expression detection according to electromyography (EMG) signals. In some implementations, apparatuses, methods and system herein can detect facial expressions according to EMG signals that can operate without significant latency on mobile devices (including but not limited to tablets, smartphones, and/or the like).

For example, in some implementations, systems, methods and apparatuses herein can detect facial expressions according to EMG signals that are obtained from one or more electrodes placed on a face of the user. In some implementations, the electrodes can be unipolar electrodes. The unipolar electrodes can be situated on a mask that contacts the face of the user, such that a number of locations on the upper face of the user are contacted by the unipolar electrodes.

In some implementations, the EMG signals can be preprocessed to remove noise. The noise removal can be common average reference (i.e. CAR) (i.e., in which interfering signals from one or more neighboring electrodes are removed). After preprocessing the EMG signals, apparatuses, methods and systems can be analyzed to determine roughness.

The EMG signals can also be normalized. Normalization can allow facial expressions to be categorized into one of a number of users. The categorization can subsequently be used to identify facial expressions of new users (e.g., by comparing EMG signals of new users to those categorized from previous users. In some implementations, deterministic or probabilistic classifiers can be used to classify EMG signals representing facial expressions.

In some implementations, a user state can be determined before classification of the signals is performed. For example, if the user is in a neutral state (i.e., a state in which the user has a neutral expression on his/her face), the structure of the EMG signals (even after normalization) is different from the signals from a non-neutral state (i.e., a state in which the user has a non-neutral expression on his or her face). Determining whether or not a user is in a neutral state can increase the accuracy of the user's EMG signal classification.

In some implementations, a number of classification methods may be performed as described herein, including but not limited to: a categorization classifier; discriminant analysis (including but not limited to LDA (linear discriminant analysis), QDA (quadratic discriminant analysis) and variations thereof such as sQDA (time series quadratic discriminant analysis)); Riemannian geometry; a linear classifier; a Naïve Bayes Classifier (including but not limited to Bayesian Network classifier); a k-nearest neighbor classifier; a RBF (radial basis function) classifier; and/or a neural network classifier, including but not limited to a Bagging classifier, a SVM (support vector machine) classifier, a NC (node classifier), a NCS (neural classifier system), SCRLDA (Shrunken Centroid Regularized Linear Discriminate and Analysis), a Random Forest, and/or a similar classifier, and/or a combination thereof. Optionally, after classification, the determination of the facial expression of the user is adapted according to one or more adaptation methods, using one or more adaptation methods (for example, by retraining the classifier on a specific expression of the user and/or applying a categorization (pattern matching) algorithm).

According to at least some embodiments, there is provided a facial expression determination system for determining a facial expression on a face of a user comprising: an apparatus comprising a plurality of EMG (electromyography) electrodes configured for contact with the face of the user; and a computational device configured with instructions operating thereon to cause the computational device to: preprocess a plurality of EMG signals received from said EMG electrodes to form preprocessed EMG signals; and classify a facial expression according to said preprocessed EMG using a classifier, wherein: said preprocessing comprises determining a roughness of said EMG signals according to a predefined window, and said classifier classifies the facial expression according to said roughness.

Optionally classifying comprises determining whether the facial expression corresponds to a neutral expression or a non-neutral expression based upon.

Optionally upon determining a non-neutral expression, classifying includes determining said non-neutral expression.

Optionally said predefined window is of 100 ms.

Optionally said classifier classifies said preprocessed EMG signals of the user using at least one of (1) a discriminant analysis classifier; (2) a Riemannian geometry classifier; (3) Naïve Bayes classifier, (4) a k-nearest neighbor classifier, (5) a RBF (radial basis function) classifier, (6) a Bagging classifier, (7) a SVM (support vector machine) classifier, (8) a node classifier (NC), (9) NCS (neural classifier system), (10) SCRLDA (Shrunken Centroid Regularized Linear Discriminate and Analysis), or (11) a Random Forest classifier.

Optionally said discriminant analysis classifier is one of (1) LDA (linear discriminant analysis), (2) QDA (quadratic discriminant analysis), or (3) sQDA.

Optionally said classifier is one of (1) Riemannian geometry, (2) QDA and (3) sQDA.

Optionally the system further comprises a classifier training system for training said classifier, said training system configured to receive a plurality of sets of preprocessed EMG signals from a plurality of training users, wherein: each set including a plurality of groups of preprocessed EMG signals from each training user, and each group of preprocessed EMG signals corresponding to a previously classified facial expression of said training user; said training system additionally configured to: determine a pattern of variance for each of said groups of preprocessed EMG signals across said plurality of training users corresponding to each classified facial expression, and compare said preprocessed EMG signals of the user to said patterns of variance to adjust said classification of the facial expression of the user. Optionally the instructions are additionally configured to cause the computational device to receive data associated with at least one predetermined facial expression of the user before classifying the facial expression as a neutral expression or a non-neutral expression. Optionally said at least one predetermined facial expression is a neutral expression. Optionally said at least one predetermined facial expression is a non-neutral expression. Optionally the instructions are additionally configured to cause the computational device to: retrain said classifier on said preprocessed EMG signals of the user to form a retrained classifier, and classify said expression according to said preprocessed EMG signals by said retrained classifier to determine the facial expression.

Optionally the system further comprises a training system for training said classifier and configured to receive a plurality of sets of preprocessed EMG signals from a plurality of training users, wherein: each set comprising a plurality of groups of preprocessed EMG signals from each training user, each group of preprocessed EMG signals corresponding to a previously classified facial expression of said training user; said training system additionally configured to: determine a pattern of variance of for each of said groups of preprocessed EMG signals across said plurality of training users corresponding to each classified facial expression; and compare said preprocessed EMG signals of the user to said patterns of variance to classify the facial expression of the user.

Optionally said electrodes comprise unipolar electrodes.

Optionally preprocessing said EMG signals comprises removing common mode interference of said unipolar electrodes.

Optionally said apparatus further comprises a local board in electrical communication with said EMG electrodes, the local board configured for converting said EMG signals from analog signals to digital signals, and a main board configured for receiving said digital signals.

Optionally said EMG electrodes comprise eight unipolar EMG electrodes and one reference electrode, the system further comprising: an electrode interface in electrical communication with said EMG electrodes and with said computational device, and configured for providing said EMG signals from said EMG electrodes to said computational device; and a mask configured to contact an upper portion of the face of the user and including an electrode plate; wherein said EMG electrodes being configured to attach to said electrode plate of said mask, such that said EMG electrodes contact said upper portion of the face of the user.

Optionally the system further comprises: a classifier training system for training said classifier, said training system configured to receive a plurality of sets of preprocessed EMG signals from a plurality of training users, wherein:
each set comprising a plurality of groups of preprocessed EMG signals from each training user, and each group of preprocessed EMG signals corresponding to a previously classified facial expression of said training user;

wherein said training system configured to:
compute a similarity score for said previously classified facial expressions of said training users,
fuse together each plurality of said previously classified facial expressions having said similarity score above a threshold indicating excessive similarity, so as to form a reduced number of said previously classified facial expressions; and
train said classifier on said reduced number of said previously classified facial expressions.

Optionally the instructions are further configured to cause the computational device to determine a level of said facial expression according to a standard deviation of said roughness.

Optionally said preprocessing comprises removing electrical power line interference (PLI).

Optionally said removing said PLI comprising filtering said EMG signals with two series of Butterworth notch filters of order 1, a first series of filter at 50 Hz and all its harmonics up to the Nyquist frequency, and a second series of filter with cutoff frequency at 60 Hz and all its harmonics up to the Nyquist frequency.

Optionally said determining said roughness further comprises calculating an EMG-dipole.

Optionally said determining said roughness further comprises a movement of said signals according to said EMG-dipole.

Optionally said classifier determines said facial expression at least partially according to a plurality of features, wherein said features comprise one or more of roughness, roughness of EMG-dipole, a direction of movement of said EMG signals of said EMG-dipole and a level of facial expression.

According to at least some embodiments, there is provided a facial expression determination system for determining a facial expression on a face of a user, comprising:
an apparatus comprising a plurality of EMG (electromyography) electrodes in contact with the face of the user; and
a computational device in communication with said electrodes and configured for receiving a plurality of EMG signals from said EMG electrodes, said computational device including:
a signal processing abstraction layer configured to preprocess said EMG signals to form preprocessed EMG signals; and
a classifier configured to receive said preprocessed EMG signals, the classifier configured to retrain said classifier on said preprocessed EMG signals of the user to form a retrained classifier; the classifier configured to classify said facial expression based on said preprocessed EMG signals and said retrained classifier.

According to at least some embodiments, there is provided a facial expression determination system for determining a facial expression on a face of a user, comprising:
an apparatus comprising a plurality of EMG (electromyography) electrodes in contact with the face of the user;
a computational device in communication with said electrodes and configured for receiving a plurality of EMG signals from said EMG electrodes, said computational device including:
a signal processing abstraction layer configured to preprocess said EMG signals to form preprocessed EMG signals; and
a classifier configured to receive said preprocessed EMG signals and for classifying the facial expression according to said preprocessed EMG signals; and a training system configured to:

train said classifier, said training system configured to receive a plurality of sets of preprocessed EMG signals from a plurality of training users, wherein:

each set comprising a plurality of groups of preprocessed EMG signals from each training user, each group of preprocessed EMG signals corresponding to a previously classified facial expression of said training user;

determine a pattern of variance of for each of said groups of preprocessed EMG signals across said plurality of training users corresponding to each classified facial expression; and compare said preprocessed EMG signals of the user to said patterns of variance to classify the facial expression of the user.

According to at least some embodiments, there is provided a facial expression determination system for determining a facial expression on a face of a user, comprising:

an apparatus comprising a plurality of unipolar EMG (electromyography) electrodes in contact with the face of the user; and a computational device in communication with said electrodes and configured with instructions operating thereon to cause the computational device to:

receive a plurality of EMG signals from said EMG electrodes, preprocess said EMG signals to form preprocessed EMG signals by removing common mode effects, normalize said preprocessed EMG signals to form normalized EMG signals, and classify said normalized EMG signals to determine the facial expression.

According to at least some embodiments, there is provided a system for determining a facial expression on a face of a user, comprising an apparatus comprising a plurality of EMG (electromyography) electrodes in contact with the face of the user; a computational device in communication with said electrodes and configured for receiving a plurality of EMG signals from said EMG electrodes, said computational device including: a signal processing abstraction layer configured to preprocess for preprocessing said EMG signals to form preprocessed EMG signals; and a classifier configured to receive said preprocessed EMG signals and for classifying the facial expression according to said preprocessed EMG signals; and a training system for training said classifier, said training system configured to: receive a plurality of sets of preprocessed EMG signals from a plurality of training users, wherein each set comprises a plurality of groups of preprocessed EMG signals from each training user, each group of preprocessed EMG signals corresponding to a previously classified facial expression of said training user; compute a similarity score for said previously classified facial expressions of said training users, fuse each plurality of said previously classified facial expressions having said similarity score above a threshold indicating excessive similarity, so as to reduce a number of said previously classified facial expressions; and train said classifier on said reduced number of said previously classified facial expressions.

According to at least some embodiments, there is provided a facial expression determination method for determining a facial expression on a face of a user, the method operated by a computational device, the method comprising: receiving a plurality of EMG (electromyography) electrode signals from EMG electrodes in contact with the face of the user; preprocessing said EMG signals to form preprocessed EMG signals, preprocessing comprising determining roughness of said EMG signals according to a predefined window; and determining if the facial expression is a neutral expression or a non-neutral expression; and classifying said non-neutral expression according to said roughness to determine the facial expression, when the facial expression is a non-neutral expression.

Optionally said preprocessing said EMG signals to form preprocessed EMG signals further comprises removing noise from said EMG signals before said determining said roughness, and further comprises normalizing said EMG signals after said determining said roughness.

Optionally said electrodes comprise unipolar electrodes and wherein said removing noise comprises removing common mode interference of said unipolar electrodes.

Optionally said predefined window is of 100 ms.

Optionally said normalizing said EMG signals further comprises calculating a log normal of said EMG signals and normalizing a variance for each electrode.

Optionally said normalizing said EMG signals further comprises calculating covariance across a plurality of users.

Optionally the method further comprises:

before classifying the facial expression, the method includes training said classifier on a plurality of sets of preprocessed EMG signals from a plurality of training users, wherein:

each set comprising a plurality of groups of preprocessed EMG signals from each training user, each group of preprocessed EMG signals corresponding to a previously classified facial expression of said training user;

said training said classifier comprises determining a pattern of covariances for each of said groups of preprocessed EMG signals across said plurality of training users corresponding to each classified facial expression; and said classifying comprises comparing said normalized EMG signals of the user to said patterns of covariance to adjust said classification of the facial expression of the user.

Optionally said classifier classifies said preprocessed EMG signals of the user according to a classifier selected from the group consisting of discriminant analysis; Riemannian geometry; Naïve Bayes, k-nearest neighbor classifier, RBF (radial basis function) classifier, Bagging classifier, SVM (support vector machine) classifier, NC (node classifier), NCS (neural classifier system), SCRLDA (Shrunken Centroid Regularized Linear Discriminate and Analysis), Random Forest, or a combination thereof.

Optionally said discriminant analysis classifier is selected from the group consisting of LDA (linear discriminant analysis), QDA (quadratic discriminant analysis) and sQDA.

Optionally said classifier is selected from the group consisting of Riemannian geometry, QDA and sQDA.

Optionally said classifying further comprises receiving at least one predetermined facial expression of the user before said determining if the facial expression is a neutral expression or a non-neutral expression.

Optionally said at least one predetermined facial expression is a neutral expression.

Optionally said at least one predetermined facial expression is a non-neutral expression.

Optionally said classifying further comprises retraining said classifier on said preprocessed EMG signals of the user to form a retrained classifier; and classifying said expression according to said preprocessed EMG signals by said retrained classifier to determine the facial expression.

Optionally the method further comprises:

training said classifier, before said classifying the facial expression, on a plurality of sets of preprocessed EMG signals from a plurality of training users, wherein:

each set comprising a plurality of groups of preprocessed EMG signals from each training user, and each group of preprocessed EMG signals corresponding to a previously classified facial expression of said training user; and determining a pattern of variance of for each of said groups of preprocessed EMG signals across said plurality of training users corresponding to each classified facial expression, wherein said classifying comprises comparing said preprocessed EMG signals of the user to said patterns of variance to classify the facial expression of the user.

Optionally the method further comprises:

training said classifier, before said classifying the facial expression, on a plurality of sets of preprocessed EMG signals from a plurality of training users, wherein:

each set comprising a plurality of groups of preprocessed EMG signals from each training user, each group of preprocessed EMG signals corresponding to a previously classified facial expression of said training user;

said training further comprises:

assessing a similarity score for said previously classified facial expressions of said training users, and fusing together each plurality of said previously classified facial expressions having said similarity score above a threshold indicating excessive similarity, to form a reduced number of said previously classified facial expressions wherein said training said classifier comprises training on said reduced number of said previously classified facial expressions.

Optionally said training further comprises:

determining a pattern of variance for each of said groups of preprocessed EMG signals across said plurality of training users corresponding to each classified facial expression, wherein said classifying comprises comparing said preprocessed EMG signals of the user to said patterns of variance to adjust said classification of the facial expression of the user.

According to at least some embodiments, there is provided a facial expression determination apparatus for determining a facial expression on a face of a user, comprising:

a plurality of unipolar or bipolar EMG (electromyography) electrodes in contact with the face of the user and a computational device in communication with said electrodes, the device configured with instructions operating thereon to cause the device to:

receive a plurality of EMG signals from said EMG electrodes;

preprocess said EMG signals to form preprocessed EMG signals by removing common mode effects, normalize said preprocessed EMG signals to form normalized EMG signals, and classify said normalized EMG signals to detect the facial expression.

Optionally the apparatus further comprises:

an electrode interface; and a mask which contacts an upper portion of the face of the user, said mask including an electrode plate attached to eight EMG electrodes and one reference electrode such that said EMG electrodes contact said upper portion of the face of the user, wherein said electrode interface being operatively coupled to said EMG electrodes and said computational device for providing said EMG signals from said EMG electrodes to said computational device.

According to at least some embodiments, there is provided a facial expression determination system for determining a facial expression on a face of a user comprising:

an apparatus comprising a plurality of EMG (electromyography) electrodes configured for contact with the face of the user; and a computational device configured for receiving a plurality of EMG signals from said EMG electrodes, said computational device configured with instructions operating thereon to cause the computational device to:

preprocess said EMG signals to form preprocessed EMG signals;

determining a plurality of features according to said preprocessed EMG using a classifier, wherein said features include roughness and wherein said preprocessing preprocesses said EMG signals to determine a roughness of said EMG signals according to a predefined window; and determine the facial expression according to said features.

Optionally the instructions are further configured to cause the computational device to determine a level of said facial expression according to a standard deviation of said roughness, wherein said features further comprise said level of said facial expression.

Optionally said determining said roughness further comprises calculating an EMG-dipole, and determining said roughness for said EMG-dipole, wherein said features further comprise said roughness of said EMG-dipole.

Optionally said determining said roughness further comprises a movement of said signals according to said EMG-dipole, wherein said features further comprise said movement of said signals.

Optionally the system further comprises a weight prediction module configured for performing weight prediction of said features; and an avatar modeler for modeling said avatar according to a blend-shape, wherein said blend-shape is determined according to said weight prediction.

Optionally said electrodes comprise bi-polar electrodes.

Optionally the system, method or apparatus of any of the above claims further comprises detecting voice sounds made by the user; and animating the mouth of an avatar of the user in response thereto.

Optionally upon voice sounds being detected from the user, further comprising animating only an upper portion of the face of the user.

Optionally the system, method or apparatus of any of the above claims further comprises upon no facial expression being detected, animating a blink or an eye movement of the user.

Optionally said system and/or said apparatus comprises a computational device and a memory, wherein:

said computational device is configured to perform a predefined set of basic operations in response to receiving a corresponding basic instruction selected from a predefined native instruction set of codes, set instruction comprising:

a first set of machine codes selected from the native instruction set for receiving said EMG data, a second set of machine codes selected from the native instruction set for preprocessing said EMG data to determine at least one feature of said EMG data and a third set of machine codes selected from the native instruction set for determining a facial expression according to said at least one feature of said EMG data; wherein each of the first, second and third sets of machine code is stored in the memory.

As used herein, the term "EMG" refers to "electromyography," which measures the electrical impulses of muscles.

As used herein, the term "muscle capabilities" refers to the capability of a user to operate a plurality of muscles in coordination for some type of activity. A non-limiting example of such an activity is a facial expression. It should be noted that a deficit in a muscle capability is not necessarily due to damage to the muscles involved, but may be due to damage in any part of the physiological system required for muscles to be operated in coordination, including but not limited to, central or peripheral nervous system damage, or a combination thereof.

US Patent Application No. 20070179396 describes a method for detecting facial muscle movements. The facial muscle movements are described as being detectable by using one or more of electroencephalograph (EEG) signals, electrooculograph (EOG) signals and electromyography (EMG) signals.

U.S. Pat. No. 7,554,549 describes a system and method for analyzing EMG (electromyography) signals from muscles on the face to determine a user's facial expression, but by using bipolar electrodes. Such expression determination is then used for computer animation.

Unless otherwise defined, all technical and scientific terms used herein have the same meaning as commonly understood by one of ordinary skill in the art to which user matter of this disclosure belongs. The materials, methods, and examples provided herein are illustrative only and not intended to be limiting.

Implementation of the apparatuses, methods and systems of the present disclosure involves performing or completing certain selected tasks or steps manually, automatically, or a combination thereof. Specifically, several selected steps can be implemented by hardware or by software on an operating system, of a firmware, and/or a combination thereof. For example, as hardware, selected steps of the invention can be implemented as a chip or a circuit. As software, selected steps of the invention can be implemented as a number of software instructions being executed by a computer (e.g., a processor of the computer) using an operating system. In any case, selected steps of the method and system of the invention could be described as being performed by a data processor, such as a computing platform for executing a plurality of instructions.

Although the present invention is described with regard to a "computer" on a "computer network," it should be noted that any device featuring a data processor and the ability to execute one or more instructions may be described as a computer or as a computational device, including but not limited to a personal computer (PC), a processor, a server, a cellular telephone, an IP telephone, a smart phone, a PDA (personal digital assistant), a thin client, a mobile communication device, a smart watch, head mounted display or other wearable that is able to communicate externally, a virtual or cloud based processor, a pager, and/or a similar device. Two or more of such devices in communication with each other may be a "computer network."

BRIEF DESCRIPTION OF THE DRAWINGS

Embodiments herein are described, by way of example only, with reference to the accompanying drawings. It should be understood that the particulars shown in said drawings are by way of example and for purposes of illustrative discussion of some embodiments only.

FIG. 5B shows the electronic diagram of the facemask apparatus in a zoomed view according to some embodiments;

FIG. 5C shows the electronic diagram of the main board in a zoomed view according to some embodiments;

DETAILED DESCRIPTION

Generally, each software component described herein can be assumed to be operated by a computational device (e.g., such as an electronic device including at least a memory and/or a processor, and/or the like).

Figure 1A:
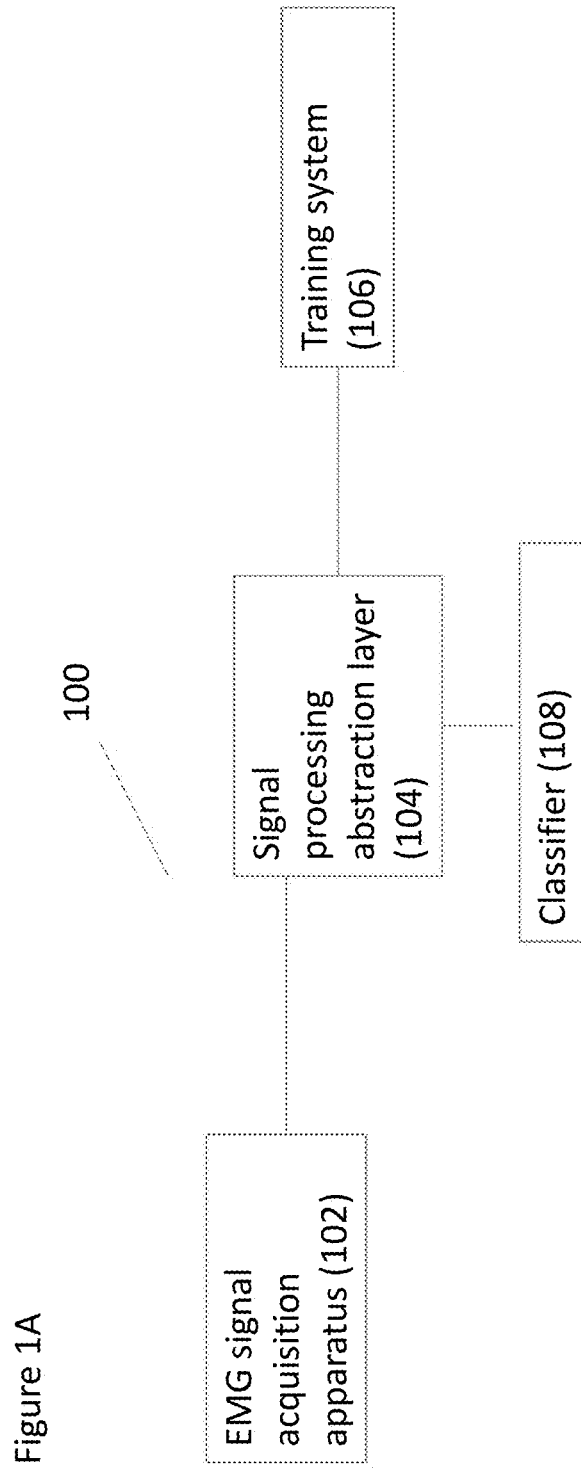
FIG. 1A shows an exemplary, non-limiting, illustrative system for acquiring and analyzing EMG signals according to some embodiments.

FIG. 1A illustrates an example system for acquiring and analyzing EMG signals, according to at least some embodiments. As shown, a system 100 includes an EMG signal acquisition apparatus 102 for acquiring EMG signals from a user. In some implementations, the EMG signals can be acquired through electrodes (not shown) placed on the surface of the user, such as on the skin of the user (see for example FIG. 1B). In some implementations, such signals are acquired non-invasively (i.e., without placing sensors and/or the like within the user). At least a portion of EMG signal acquisition apparatus 102 can adapted for being placed on the face of the user. For such embodiments, at least the upper portion of the face of the user can be contacted by the electrodes.

EMG signals generated by the electrodes can then be processed by a signal processing abstraction layer 104 that can prepare the EMG signals for further analysis. Signal processing abstraction layer 104 can be implemented by a computational device (not shown). In some implementations, signal processing abstraction layer 104 can reduce or remove noise from the EMG signals, and/or can perform normalization and/or other processing in the EMG signals to increase the efficiency of EMG signal analysis. The processed EMG signals are also referred to herein as "EMG signal information."

The processed EMG signals can then be classified by a classifier 108, e.g., according to the underlying muscle activity. In a non-limiting example, the underlying muscle activity can correspond to different facial expressions being made by the user. Other non-limiting examples of classification for the underlying muscle activity can include determining a range of capabilities for the underlying muscles of a user, where capabilities may not correspond to actual expressions being made at a time by the user. Determination of such a range may be used, for example, to determine whether a user is within a normal range of muscle capabilities or whether the user has a deficit in one or more muscle capabilities.

As a non-limiting example, a user can have a medical condition, such as a stroke or other type of brain injury. After a brain injury, the user may not be capable of a full range of facial expressions, and/or may not be capable of fully executing a facial expression. As non-limiting example, after having a stroke in which one hemisphere of the brain experiences more damage, the user may have a lopsided or crooked smile. Classifier 108 can use the processed EMG signals to determine that the user's smile is abnormal, and to further determine the nature of the abnormality (i.e., that the user is performing a lopsided smile) so as to classify the EMG signals even when the user is not performing a muscle activity in an expected manner.

As described in greater detail below, classifier 108 may operate according to a number of different classification protocols, such as: categorization classifiers; discriminant analysis (including but not limited to LDA (linear discriminant analysis), QDA (quadratic discriminant analysis) and variations thereof such as sQDA (time series quadratic discriminant analysis), and/or similar protocols); Riemannian geometry; any type of linear classifier; Naïve Bayes Classifier (including but not limited to Bayesian Network classifier); k-nearest neighbor classifier; RBF (radial basis function) classifier; neural network and/or machine learning classifiers including but not limited to Bagging classifier, SVM (support vector machine) classifier, NC (node classifier), NCS (neural classifier system), SCRLDA (Shrunken Centroid Regularized Linear Discriminate and Analysis), Random Forest; and/or some combination thereof.

The processed signals may also be used by a training system 106 for training classifier 108. Training system 106 can include a computational device (not shown) that implements and/or instantiates training software. For example, in some implementations, training system 106 can train classifier 108 before classifier 108 classifies an EMG signal. In other implementations, training system 106 can train classifier 108 while classifier 108 classifies facial expressions of the user, or a combination thereof. As described in greater detail below, training system 106, in some implementations, can train classifier 108 using known facial expressions and associated EMG signal information.

Training system 106 may also optionally reduce the number of facial expressions for classifier 108 to be trained on, for example to reduce the computational resources required for the operation of classifier 108 or for a particular purpose for the classification process and/or results. Training system 106 may optionally fuse or combine a plurality of facial expressions in order to reduce their overall number. Training system 106 may optionally also receive a predetermined set of facial expressions for training classifier 108, and may then optionally either train classifier 108 on the complete set or a sub-set thereof.

Figure 1B:
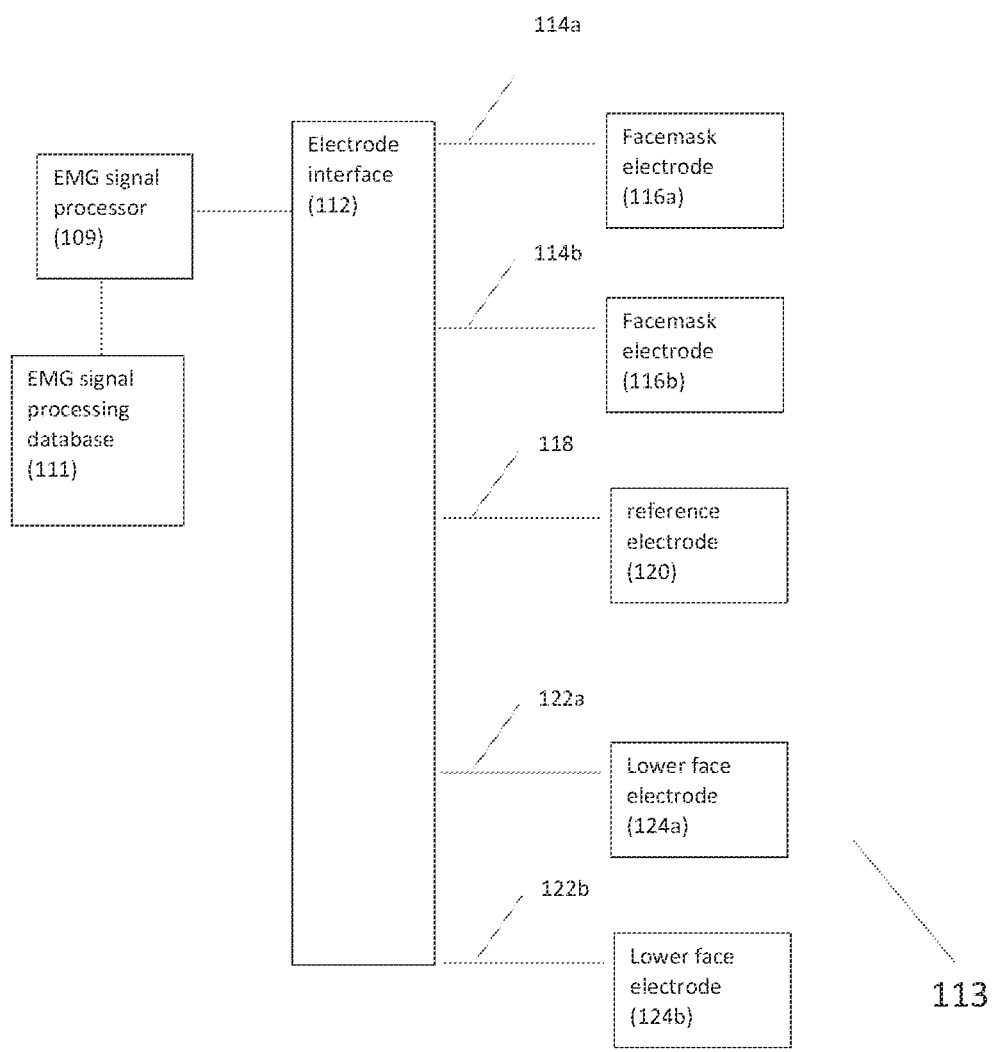
FIG. 1B shows an exemplary, non-limiting, illustrative EMG signal acquisition apparatus according to some embodiments.

FIG. 1B shows an exemplary, non-limiting, illustrative implementation for an EMG signal acquisition apparatus according to at least some embodiments which may be used with the system of FIG. 1A. For example, in some implementations, EMG signal acquisition apparatus 102 can include an EMG signal processor 109 operatively coupled to an EMG signal processing database 111. EMG signal processor 109 can also be operatively coupled to an electrode interface 112, which in turn can receive signals from a set of electrodes 113 interfacing with muscles to receive EMG signals. Electrodes 113 may be any suitable type of electrodes that are preferably surface electrodes, including but not limited to dry or wet electrodes (the latter may use gel or water for better contact with the skin). The dry electrodes may optionally be rigid gold or Ag/CL electrodes, conductive foam or the like.

In some implementations, the set of electrodes 113 comprise a set of surface EMG electrodes that measure a voltage difference within the muscles of a user (the voltage difference being caused by a depolarization wave that travels along the surface of a muscle when the muscle flexes). In some implementations, the set of surface EMG electrodes 113 can be aligned with an expected direction of an electrical impulse within a user's muscle(s), and/or can be aligned perpendicular to impulses that the user wishes to exclude from detection. In some implementations, the set of surface EMG electrodes 113 can be unipolar electrodes (e.g., that can collect EMG signals from a general area). Unipolar electrodes, in some implementations, can allow for more efficient facial expression classification, as the EMG signals collected by unipolar electrodes can be from a more general area of facial muscles, allowing for more generalized information about the user's muscle movement to be collected and analyzed. Optionally, EMG electrodes 113 can be bipolar electrodes. Also optionally EMG electrodes 113 can be made of any suitable material, including but not limited to foam electrodes, flexible electrodes, direct contact electrodes, electrodes on foam and/or gel electrodes (in which a gel is applied to the skin before contact is made with the electrode) or non-gel electrodes.

In some implementations, the set of surface EMG electrodes 113 can include facemask electrodes 116a, 116b, and/or additional facemask electrodes, each of which can be operatively coupled to an electrode interface 112 through respective electrical conductors 114a, 114b and/or the like. Facemask electrodes 116 may be provided so as to receive EMG signals from muscles in a portion of the face, such as an upper portion of the face for example. In this implementation, facemask electrodes 116 are preferably located around and/or on the upper portion of the face, more preferably including but not limited to one or more of cheek, forehead and eye areas, most preferably on or around at least the cheek and forehead areas.

In some implementations, the set of surface EMG electrodes 113 can also include lower face electrodes 124a, 124b which can be operatively coupled to electrode interface 112 through respective electrical conductors 122a, 122b and/or the like. Lower face electrodes 124 can be positioned on and/or around the areas of the mouth, lower cheeks, chin, and/or the like of a user's face. in some implementations, lower face electrodes 124 can be similar to facemask electrodes 116, and/or can be included in a wearable device as described in greater detail below. In other implementations, the set of surface EMG electrodes 113 may not include lower face electrodes 124. In some implementations, the set of surface EMG electrodes 113 can also include a ground or reference electrode 120 that can be operatively coupled to the electrode interface 112, e.g., through an electrical conductor 118.

In some implementations, EMG signal processor 109 and EMG signal processing database 111 can be located in a separate apparatus or device from the remaining components shown in FIG. 1B. For example, the remaining components shown in FIG. 1B can be located in a wearable device (not shown), while EMG signal processor 109 and EMG signal processing database 111 can be located in a computational device and/or system that is operatively coupled to the wearable device (e.g., via a wired connection, a wireless Internet connection, a wireless Bluetooth connection, WiFi of various types, a cellular telephony connection and/or the like).

Figure 2A:
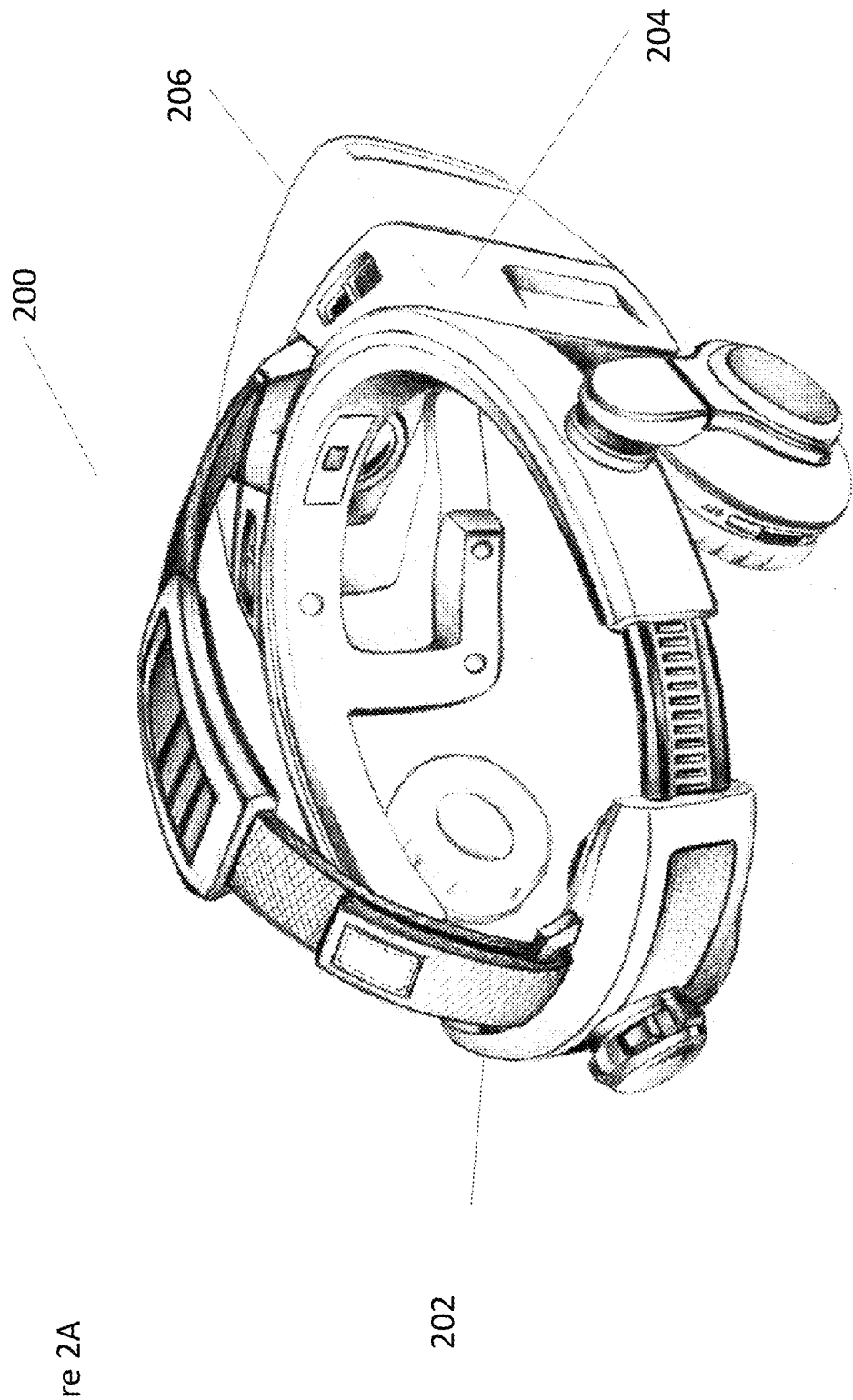
FIG. 2A shows a back view of an exemplary, non-limiting, illustrative facemask apparatus according to some embodiments.
Figure 2B:
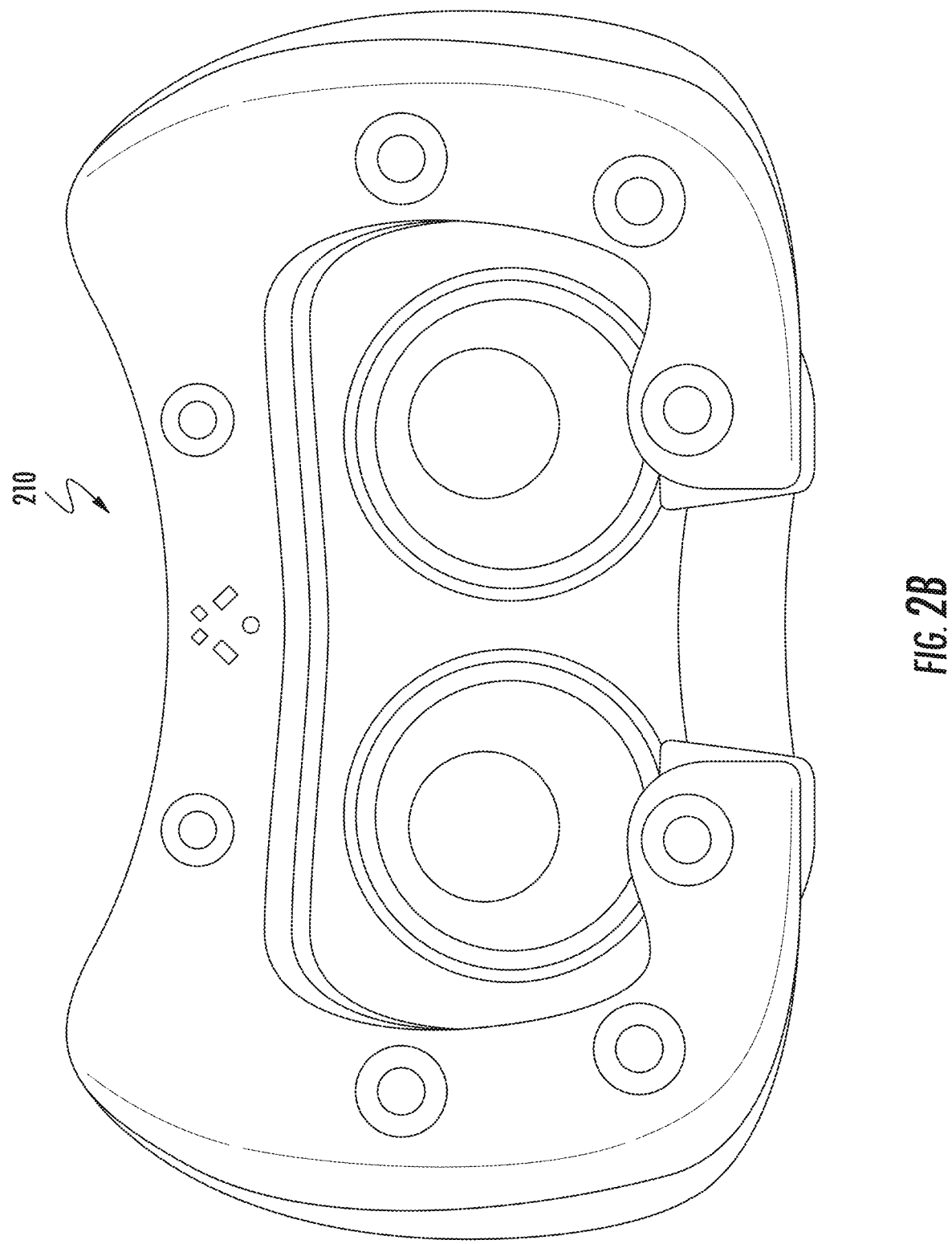
FIG. 2B shows a front view of an exemplary, non-limiting, illustrative facemask apparatus according to some embodiments.

FIG. 2A shows a back view of an exemplary, non-limiting, illustrative facemask apparatus according to at least some embodiments. For example, in some implementations, a facemask apparatus 200 can include a mount 202 for mounting the facemask apparatus 200 on the head of a user (not shown). Mount 202 can, for example, feature straps and/or similar mechanisms for attaching the facemask apparatus 200 to the user's head. The facemask apparatus 200 can also include a facemask electrodes holder 204 that can hold the surface EMG electrodes 113 against the face of the user, as described above with respect to FIG. 1B. A facemask display 206 can display visuals or other information to the user. FIG. 2B shows a front view of an exemplary, non-limiting, illustrative facemask apparatus according to at least some embodiments.

Figure 3:
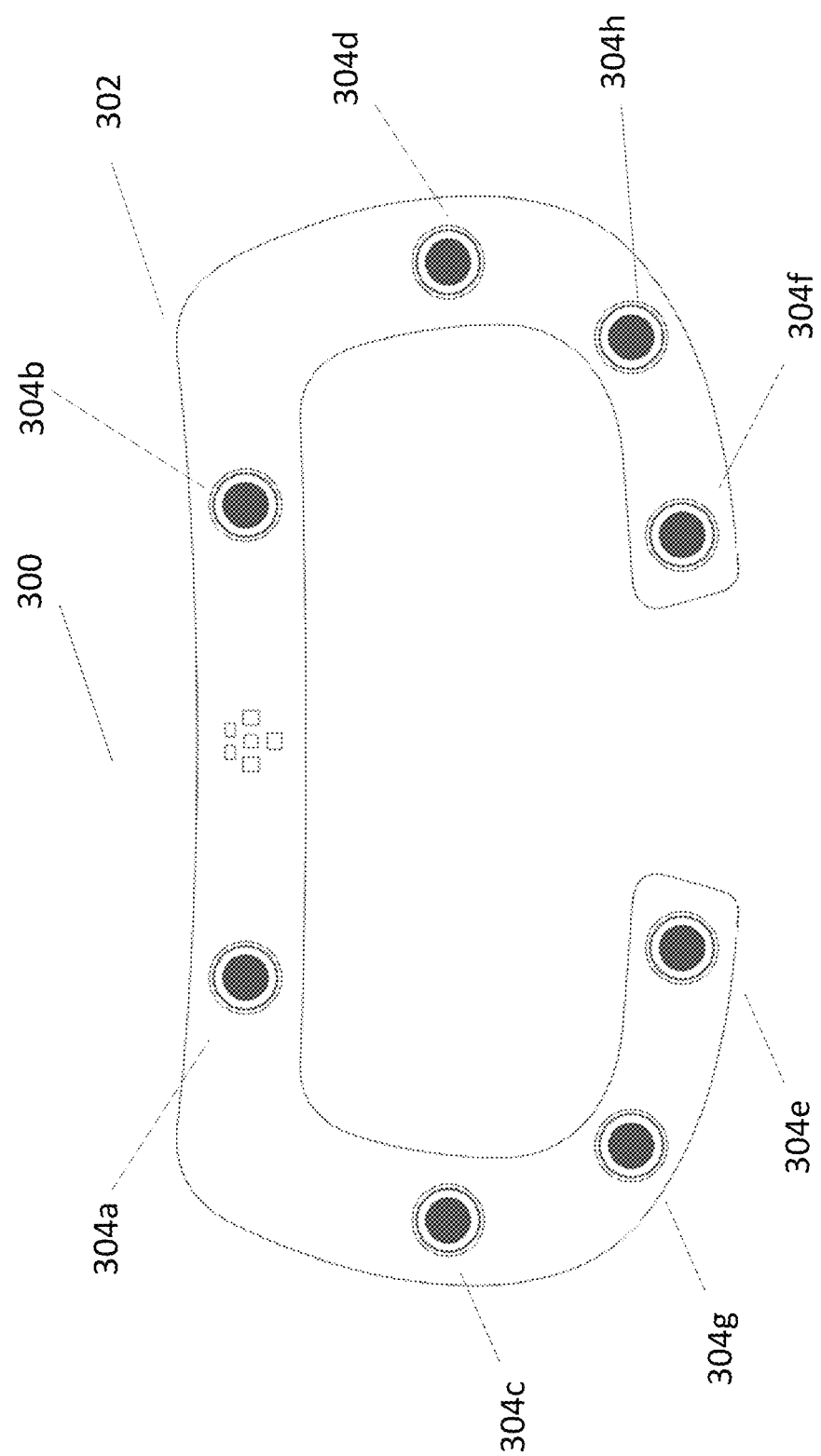
FIG. 3 shows an exemplary, non-limiting, illustrative schematic diagram of electrode placement on an electrode plate of an electrode holder of a facemask apparatus according to some embodiments.

FIG. 3 shows an exemplary, non-limiting, illustrative schematic diagram of electrode placement on an electrode plate 300 of an electrode holder 204 of a facemask apparatus 200 according to at least some embodiments. An electrode plate 300, in some implementations, can include a plate mount 302 for mounting a plurality of surface EMG electrodes 113, shown in this non-limiting example as electrodes 304a to 304h. Optionally one or more electrodes, including but not limited to one or both of electrodes 304e and 304f for example, are not present or if present, optionally their signals are dropped, which may in some circumstances improve accuracy. Each electrode 304 can, in some implementations, contact a different location on the face of the user. Preferably, at least electrode plate 300 comprises a flexible material, as the disposition of the electrodes 304 on a flexible material allows for a fixed or constant location (positioning) of the electrodes 304 on the user's face. In addition, a ground electrode and a reference electrode are provided (not shown), for example connected to an ear of the subject wearing facemask apparatus 200.

Figure 4:
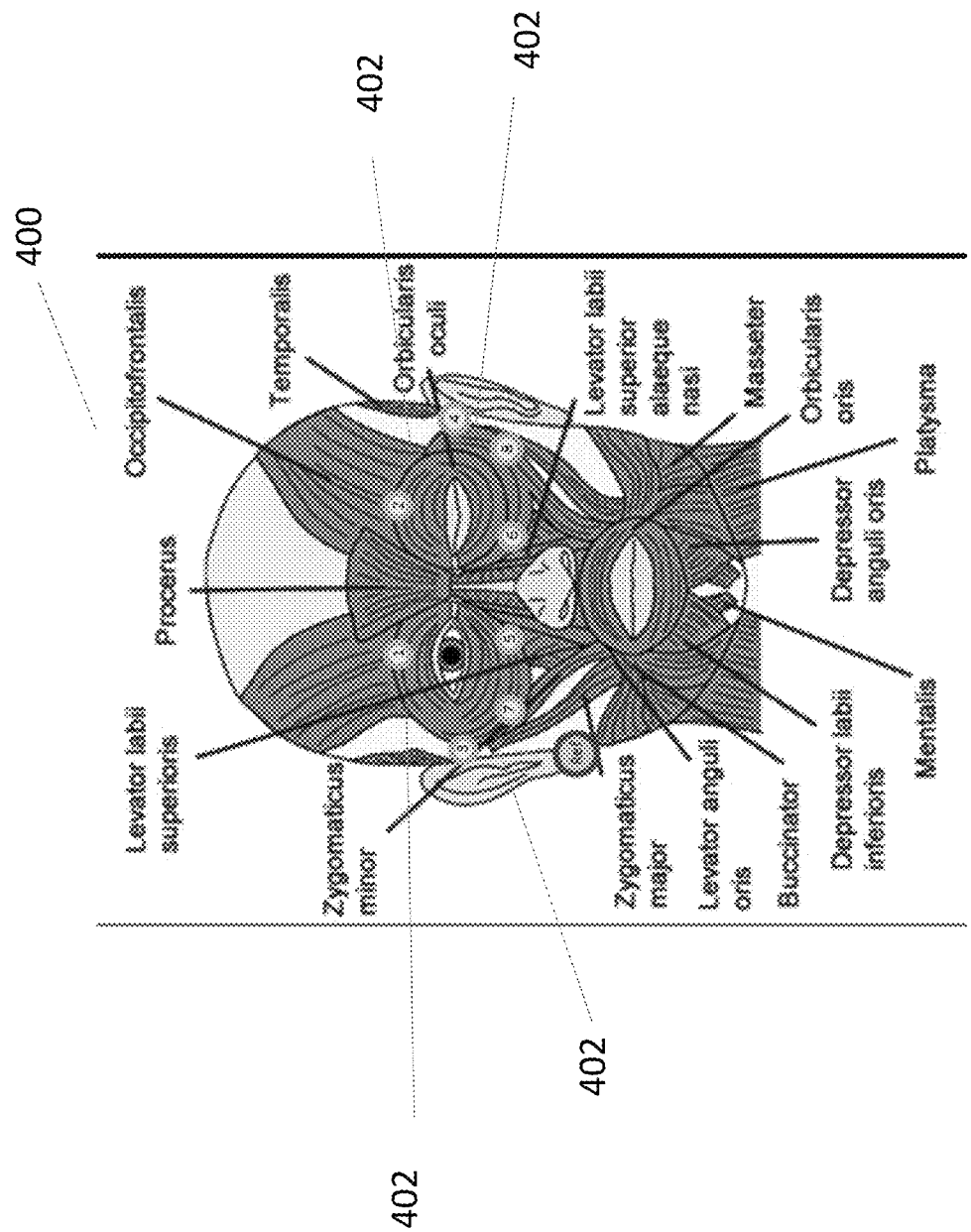
FIG. 4 shows an exemplary, non-limiting, illustrative schematic diagram of electrode placement on at least some muscles of the face according to some embodiments.

FIG. 4 shows an exemplary, non-limiting, illustrative schematic diagram of electrode placement on at least some muscles of the face according to at least some embodiments. For example, in some implementations, a face 400 can include a number of face locations 402, numbered from 1 to 8, each of which can have a surface EMG electrodes 113 in physical contact with that face location, so as to detect EMG signals. At least one reference electrode REF can be located at another face location 402.

For this non-limiting example, 8 electrodes are shown in different locations. The number and/or location of the surface EMG electrodes 113 can be configured according to the electrode plate of an electrode holder of a facemask apparatus, according to at least some embodiments. Electrode 1 may correspond to electrode 304a of FIG. 3, electrode 2 may correspond to electrode 304b of FIG. 3 and so forth, through electrode 304h of FIG. 3, which can correspond to electrode 8 of FIG. 4.

Figure 5A:
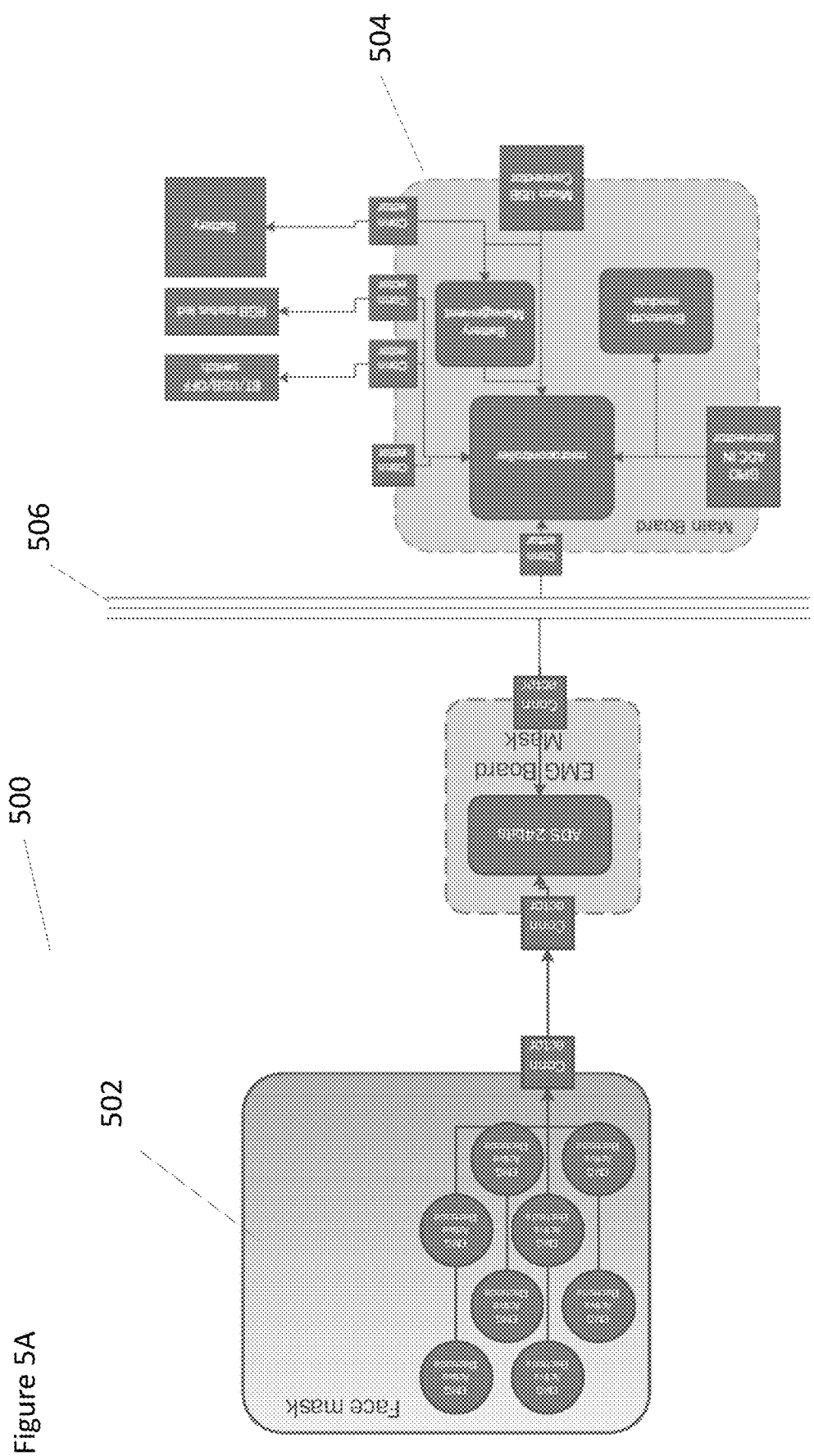
FIG. 5A shows an exemplary, non-limiting, illustrative schematic electronic diagram of a facemask apparatus and system according to some embodiments.

FIG. 5A shows an exemplary, non-limiting, illustrative schematic electronic diagram of a facemask apparatus and system according to at least some embodiments. FIG. 5B shows the electronic diagram of the facemask apparatus in a zoomed view, and FIG. 5C shows the electronic diagram of the main board in a zoomed view. Numbered components in FIG. 5A have the same numbers in FIGS. 5B and 5C; however for the sake of clarity, only some of the components are shown numbered in FIG. 5A.

FIG. 5A shows an example electronic diagram of a facemask system 500 that can include a facemask apparatus 502 coupled to a main board 504 through a bus 506. Bus 506 can be a SPI or Serial Peripheral Interface bus. The components and connections of FIGS. 5B and 5C will be described together for the sake of clarity, although some components only appear in one of FIGS. 5B and 5C.

Facemask apparatus 502, in some implementations, can include facemask circuitry 520, which can be operatively coupled to a local board 522. The facemask connector 524 can also be operatively coupled to a first local board connector 526. Local board 522 can be operatively coupled to bus 506 through a second local board connector 528. In some implementations, the facemask circuitry 520 can include a number of electrodes 530. Electrodes 530 can include or correspond to surface EMG electrodes 113 in FIGS. 1A and 1B. Electrodes 530 include a ground electrode 529 and a reference electrode 531.

The output of electrodes 530 can, in some implementations, be delivered to local board 522, which can include an ADC, which may for example be an ADS (analog to digital signal converter) 532 for converting the analog output of electrodes 530 to a digital signal. ADS 532 may be a 24 bit ADS.

In some implementations, the digital signal can then be transmitted from local board 522 through second local board connector 528, and then through bus 506 to main board 504. Local board 522 could also support connection of additional electrodes to measure ECG, EEG or other biological signals (not shown).

Main board 504, in some implementations, can include a first main board connector 540 for receiving the digital signal from bus 506. The digital signal can then be sent from the first main board connector 540 to a microcontroller 542. Microcontroller 542 can receive the digital EMG signals, process the digital EMG signals and/or initiate other components of the main board 504 to process the digital EMG signals, and/or can otherwise control the functions of main board 504. In some implementations, microcontroller 542 can collect recorded data, can synchronize and encapsulate data packets, and can communicate the recorded data to a remote computer (not shown) through some type of communication channel, e.g., via a USB, Bluetooth or wireless connection. The preferred amount of memory is at least enough for performing the amount of required processing, which in turn also depends on the speed of the communication bus and the amount of processing being performed by other components.

In some implementations, the main board 504 can also include a GPIO (general purpose input/output) ADC connector 544 operatively coupled to the microcontroller 542. The GPIO and ADC connector 544 can allow the extension of the device with external TTL (transistor-transistor logic signal) triggers for synchronization and the acquisition of external analog inputs for either data acquisition, or gain control on signals received, such as a potentiometer. In some implementations, the main board 504 can also include a Bluetooth module 546 that can communicate wirelessly with the host system. In some implementations, the Bluetooth module 546 can be operatively coupled to the host system through the UART port (not shown) of microcontroller 542. In some implementations, the main board 504 can also include a micro-USB connector 548 that can act as a main communication port for the main board 504, and which can be operatively coupled to the UART port of the microcontroller. The micro-USB connector 548 can facilitate communication between the main board 504 and the host computer. In some implementations, the micro-USB connector 548 can also be used to update firmware stored and/or implemented on the main board 504. In some implementations, the main board can also include a second main board connector 550 that can be operatively coupled to an additional bus of the microcontroller 542, so as to allow additional extension modules and different sensors to be connected to the microcontroller 542. Microcontroller 542 can then encapsulate and synchronize those external sensors with the EMG signal acquisition. Such extension modules can include, but are not limited to, heart beat sensors, temperature sensors, or galvanic skin response sensors.

In some implementations, multiple power connectors 552 of the main board 504 can provide power and/or power-related connections for the main board 504. A power switch 554 can be operatively coupled to the main board 504 through one of several power connectors 552. Power switch 554 can also, in some implementations, control a status light 556 that can be lit to indicate that the main board 504 is receiving power. A power source 558, such as a battery, can be operatively coupled to a power management component 560, e.g., via another power connector 552. In some implementations, the power management component 560 can communicate with microcontroller 542.

Figure 6:
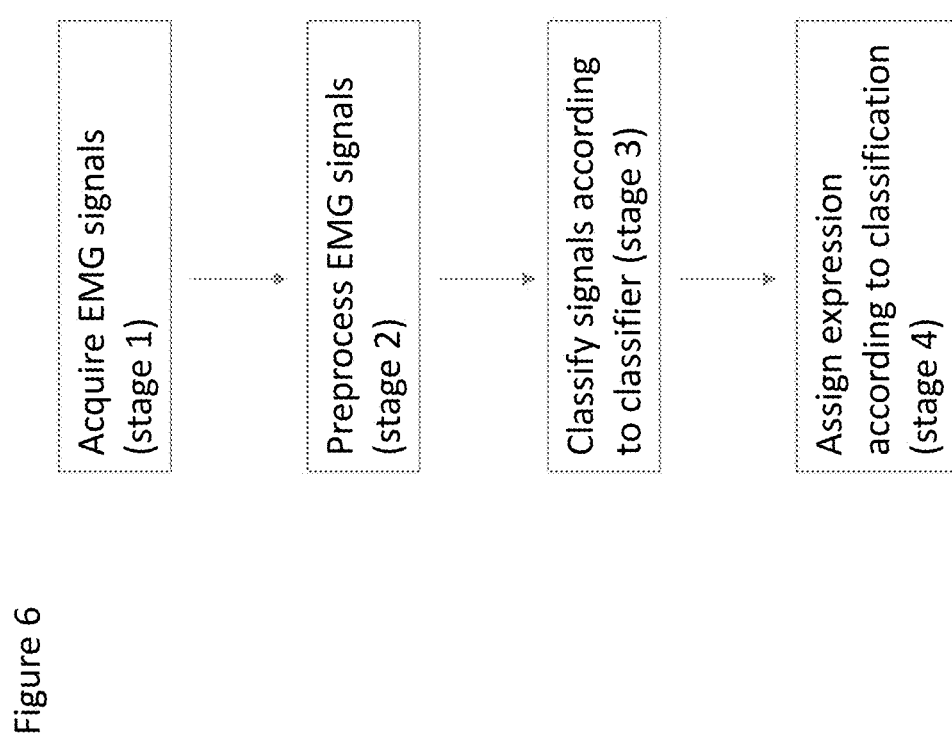
FIG. 6 shows an exemplary, non-limiting, illustrative method for facial expression classification according to some embodiments.

FIG. 6 shows an exemplary, non-limiting, illustrative method for facial expression classification according to at least some embodiments. As an example, in stage 1, a plurality of EMG signals can be acquired. In some implementations, the EMG signals are obtained as described in FIGS. 1A-2, e.g., from electrodes receiving such signals from facial muscles of a user.

In stage 2, the EMG signals can, in some implementations, be preprocessed to reduce or remove noise from the EMG signals. Preprocessing may also include normalization and/or other types of preprocessing to increase the efficiency and/or efficacy of the classification process, as described in greater detail below in the discussion of FIG. 7A. As one example, when using unipolar electrodes, the preprocessing can include reducing common mode interference or noise. Depending upon the type of electrodes used and their implementation, other types of preprocessing may be used in place of, or in addition to, common average referencing.

In stage 3, the preprocessed EMG signals can be classified using the classifier 108. of the classifier 108 can classify the preprocessed EMG signals using a number of different classification protocols as discussed above with respect to FIG. 1A.

Figure 8A:
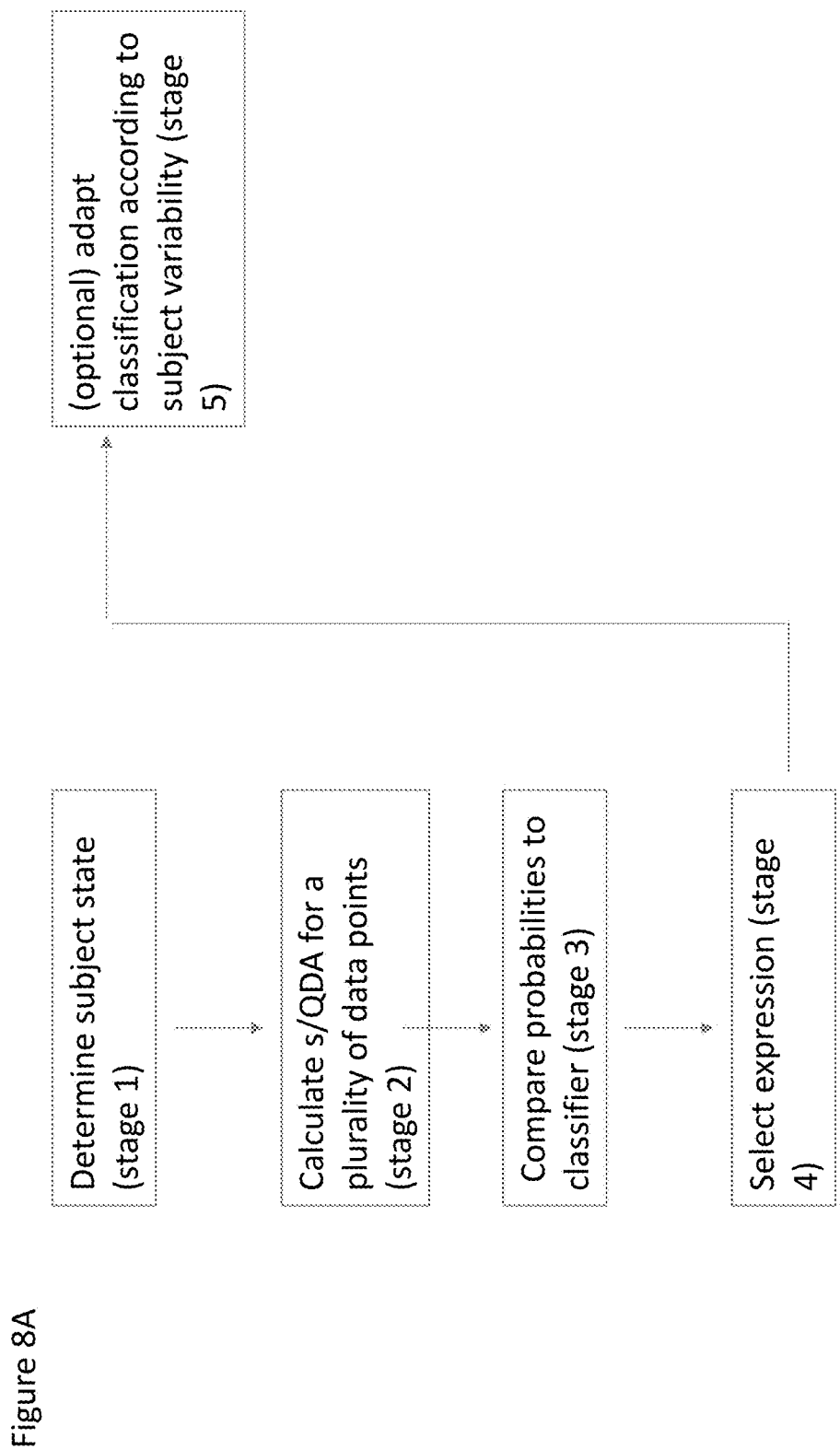
FIGS. 8A and 8B show different example, non-limiting, illustrative methods for facial expression classification according to at least some embodiments.
Figure 8B:
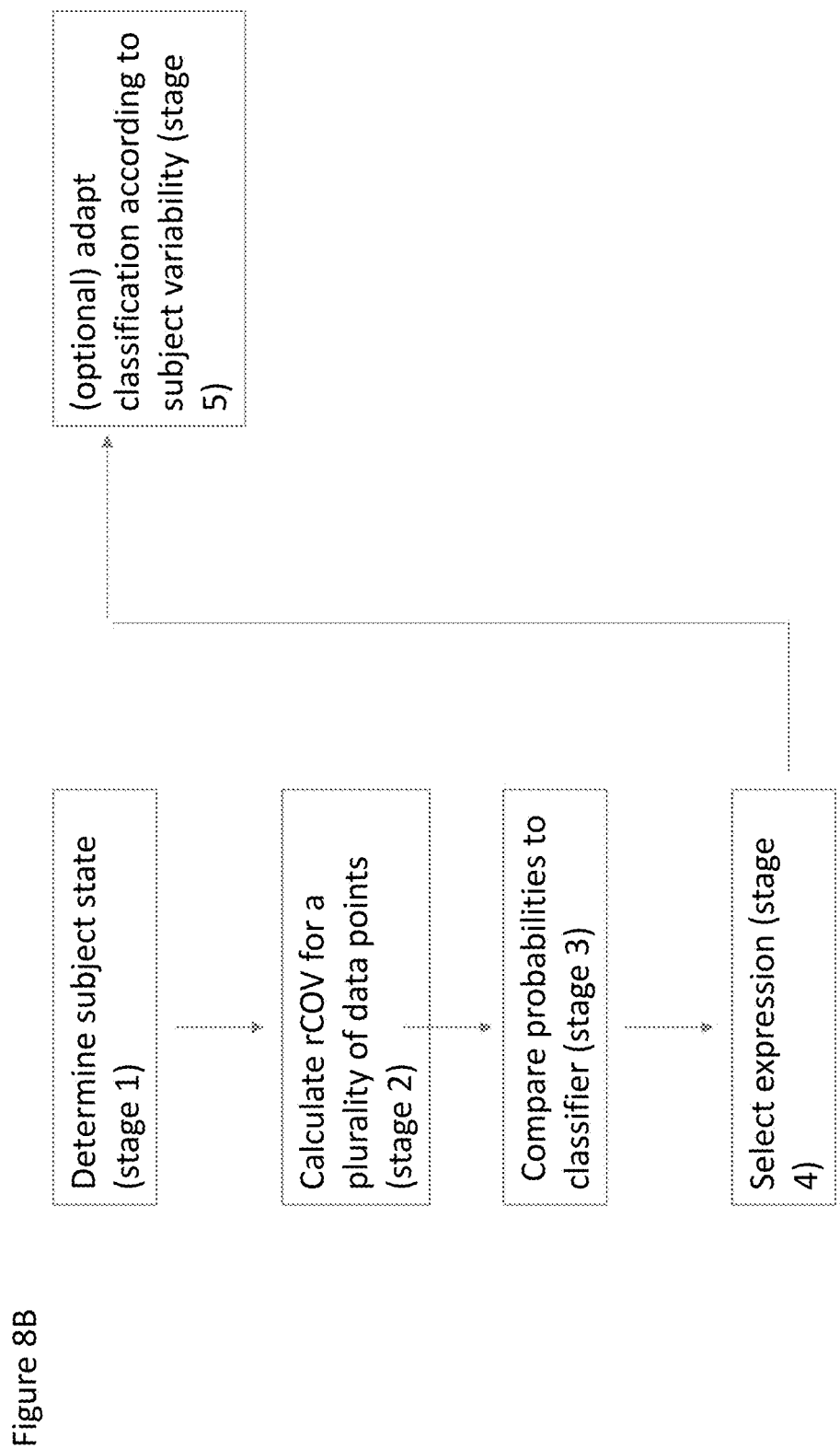

As described below in more detail, FIGS. 8A and 8B show non-limiting examples of classification methods which may be implemented for this stage. FIG. 8A shows an exemplary, non-limiting, illustrative method for classification according to QDA or sQDA; while FIG. 8B shows an exemplary, non-limiting, illustrative method for classification according to Riemannian geometry.

Figure 9A:
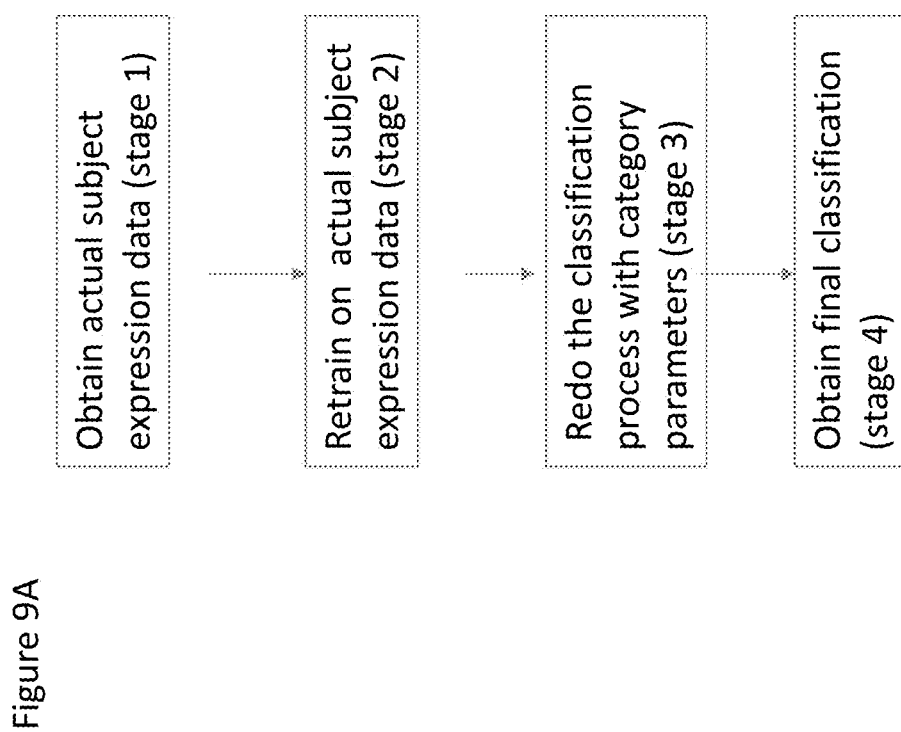
FIGS. 9A and 9B show different example, non-limiting, illustrative methods for facial expression classification adaptation according to at least some embodiments.
Figure 9B:
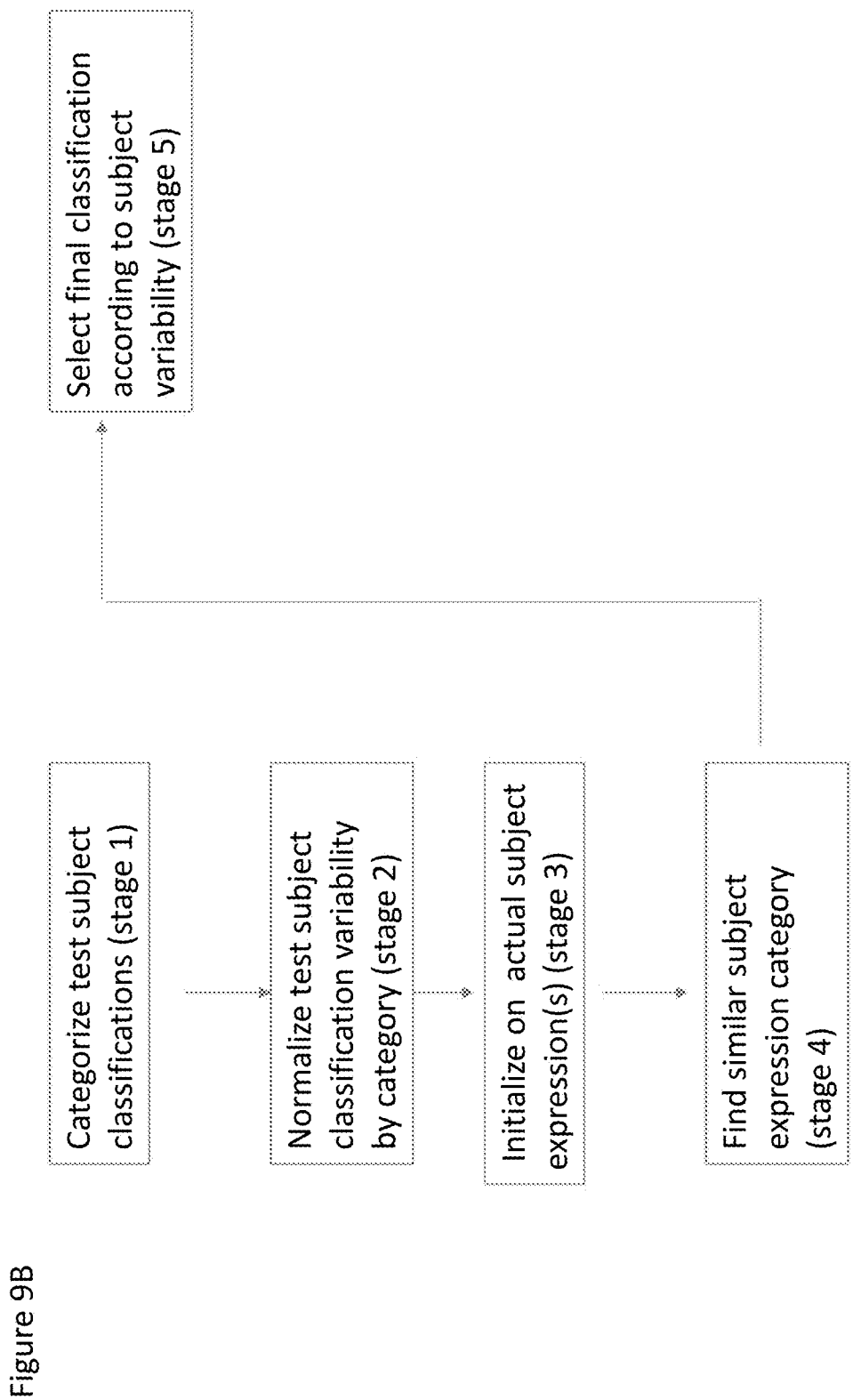

As described below in more detail, FIG. 9B shows an exemplary, non-limiting, illustrative method for facial expression classification adaptation which may be used for facial expression classification, whether as a stand-alone method or in combination with one or more other methods as described herein. The method shown may be used for facial expression classification according to categorization or pattern matching, against a data set of a plurality of known facial expressions and their associated EMG signal information.

Turning back to stage 3, the classifier 108, in some implementations, can classify the preprocessed EMG signals to identify facial expressions being made by the user, and/or to otherwise classify the detected underlying muscle activity as described in the discussion of FIG. 1A.

In stage 4, the classifier 108 can, in some implementations, determine a facial expression of the user based on the classification made by the classifier 108.

Figure 7A:
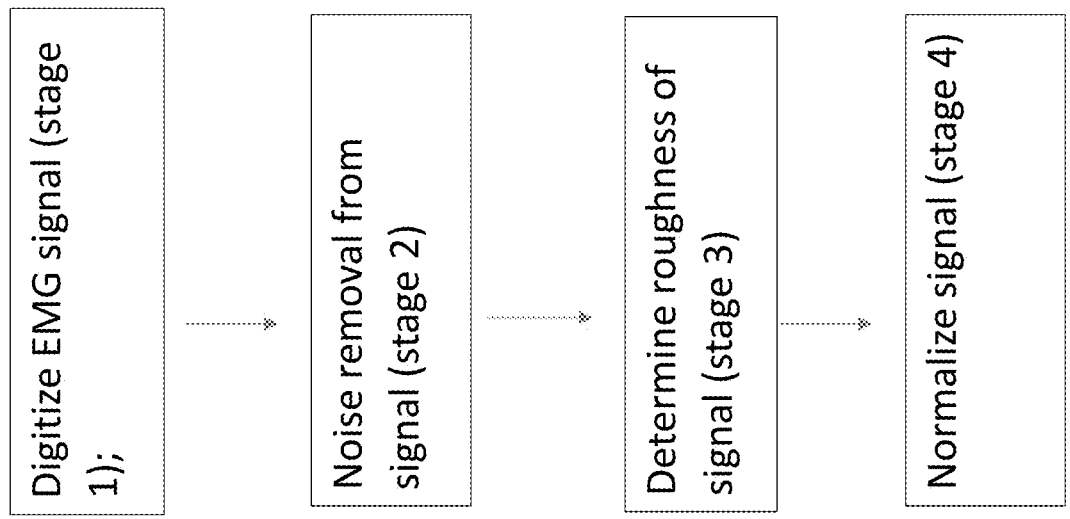
FIG. 7A shows an exemplary, non-limiting, illustrative method for preprocessing of EMG signals according to some embodiments.
Figure 7B:
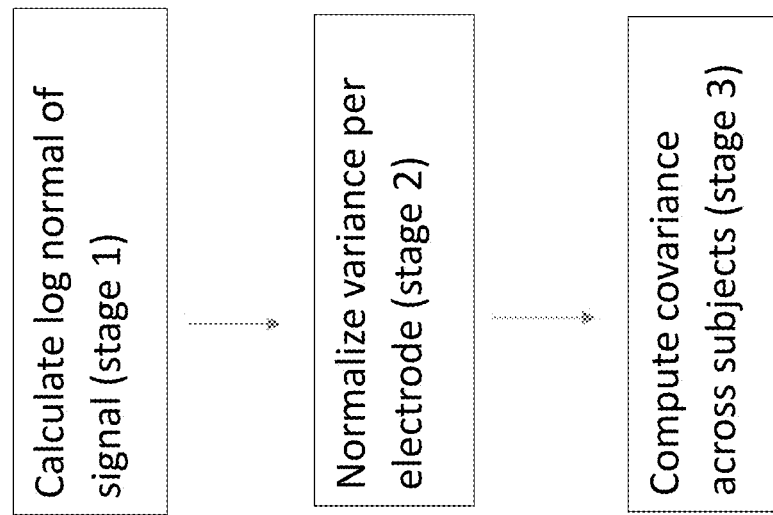
FIG. 7B shows an exemplary, non-limiting, illustrative method for normalization of EMG signals according to some embodiments.
Figure 7C:
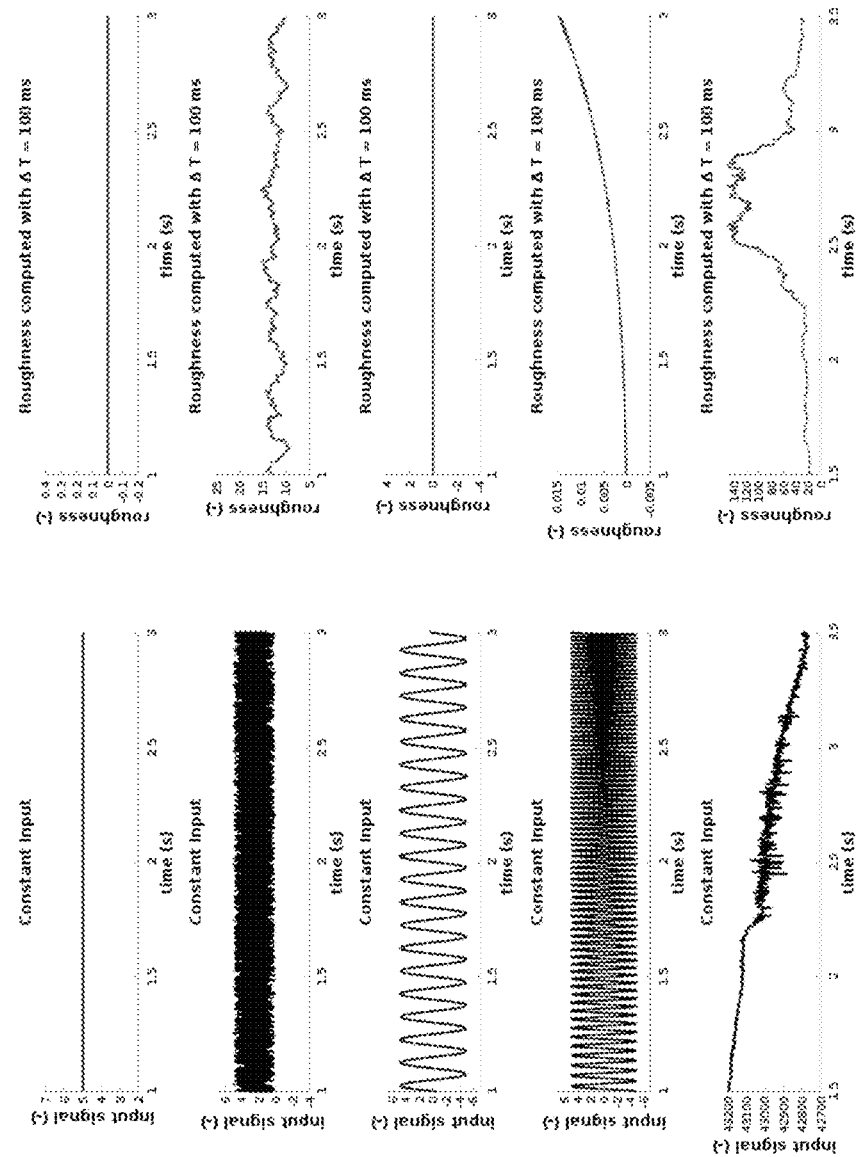
FIG. 7C shows the results of typical roughness calculations for different examples of signal inputs.

With respect to FIGS. 7A-7C, the following variables may be used in embodiments described herein:

vector of raw data recorded by electrodes 113, at a time i, of size (p×1), where p can be a dimension of the vector (e.g., where the dimension can correspond to a number of electrodes 113 attached to the user and/or collecting data from the user's muscles).

:x_i^((raw)) where the common mode has been removed.

x_i: roughness computed on x_i^((rcm)) (e.g., to be used as features for classification).

K: number of classes to which classifier 108 can classify x_i^((raw))

μk: sample mean vector for points belonging to class k.

Σk: sample covariance matrix for points belonging to class k.

FIG. 7A shows an exemplary, non-limiting, illustrative method for preprocessing of EMG signals according to at least some embodiments. As shown, in stage 1 the signal processing abstraction layer 104 can digitize analog EMG signal, to convert the analog signal received by the electrodes 113 to a digital signal. For example, in stage 1, the classifier 108 can calculate the log normal of the signal. In some implementations, when the face of a user has a neutral expression, the roughness may follow a multivariate Gaussian distribution. In other implementations, when the face of a user is not neutral and is exhibiting a non-neutral expression, the roughness may not follow a multivariate Gaussian distribution, and may instead follow a multivariate log-normal distribution. Many known classification methods, however, are configured to process features that do follow a multivariate Gaussian distribution. Thus, to process EMG signals obtained from non-neutral user expressions, the classifier 108 can compute the log of the roughness before applying a classification algorithm:

$$x_i^{(log)} = \log(x_i)$$

Other than log-normalization, other types of normalization for the signals include whitening. Both whitening and log-normalization support normalization of the signal so that variations in the electrode signals across subjects are reduced or eliminated, for example due to different mask positioning, user's head size, environment or hardware. Whitening involves enforcing the covariance matrix of the feature signal to identity matrix. In an ideal situation, the covariance matrix computed over the roughness samples extracted from a Neutral phase should be an identity matrix, such that all electrodes should have a same variance and there should be no covariance between two electrodes. A transformation matrix may be applied to enforce that an identity matrix is used.

Given the covariance matrix C computed from the neutral samples, whitening consists of applying the transformation matrix T which, when applied to the samples, will enforce the covariance matrix to identity. T is given as the (matrix) square root of the inverse of C.

Stage 2 features the normalization of the variance of the signal for each electrode 113. In stage 2, signal processing abstraction layer 104 can reduce and/or remove noise from the digital EMG signal. Noise removal, in some implementations, includes common average referencing. When multiple electrodes are used during an experiment, the recorded signal of all the electrodes can be aggregated into a single signal of interest, which may have additional noise or interference common to electrodes 113 (e.g., such as power line interference):

$$x_{i,e}^{(raw)} = x_{i,e}^{(rcm)} + \xi_i \quad (1)$$

In the above equation, ξi can be a noise signal that may contaminate the recorded EMG signals on all the electrodes. To clean the signal, a common mode removal method may be used, an example of which is defined as follows:

$$\xi_i = \frac{1}{p} \sum_{e=1}^{p} x_{i,e}^{(raw)} \quad (2)$$

$$x_{i,e}^{(rcm)} = x_{i,e}^{(raw)} - \frac{1}{p} \sum_{e=1}^{p} x_{i,e}^{(raw)} \quad (3)$$

In stage 3, the covariance is calculated across electrodes and in some implementations, across a plurality of users. For example, in stage 3, the classifier 108 can analyze the cleaned signal to determine one or more features. For example, the classifier 108 can determine the roughness of the cleaned signal.

The roughness can be used to determine a feature xi that may be used to classify facial expressions. For example, the roughness of the cleaned EMG signal can indicate the amount of high frequency content in the clean signal $x_{i,e}^{(rcm)}$ and is defined as the filtered, second symmetric derivative of the cleaned EMG signal. For example, to filter the cleaned EMG signal or the roughness of the cleaned EMG signal, the classifier 108 can calculate a moving average of the roughness of the EMG signal based on time windows of ΔT. The roughness $r_{i,e}$ of the cleaned EMG signals from each electrode 113 can then be computed independently such that, for a given electrode e, the following function calculates the roughness of the EMG signals derived from that electrode:

$$\Delta x_{i,e} = \left( x_{i,e}^{(rcm)} - x_{i-1,e}^{(rcm)} \right) \quad (4)$$

$$\Delta^2 x_{i,e} = x_{i-2,e}^{(rcm)} - 2x_{i-1,e}^{(rcm)} + x_{i,e}^{(rcm)} \quad (5)$$

$$r_{i,e} = \frac{1}{\Delta T} \sum_{j=-\Delta T}^{0} (\Delta^2 x_{i+j,e})^2 \quad (6)$$

Optionally, in addition to or in place of applying the moving average used to filter the roughness, an exponential averaging (or exponential smoothing) can be used. Exponential averaging may be used to reduce noise in real-time data. It uses a recursive low pass bandpass filter as described by the following difference equation:

$$y(n) = \alpha^* x(n) + (1-\alpha)^* y(n-1)$$

where alpha a is a constant weighting factor in the range 0<α<1.

Exponential averaging in some situations may provide a smoother frequency response, and since it is implemented with an infinite impulse response (IIR) filter it requires less processing power (and memory).

Stages 2 and 3 can therefore process the EMG signals so as to be more efficiently classified using classifiers such as LDA and QDA methods, and their variants such as sQDA. The computation of the covariance in stage 3 is especially important for training discriminant classifiers such as QDA. However stages 2 and 3 are less critical for classifiers such as Riemannian geometry. The computation of the covariance in stage 3 can also be used for running classifiers based upon Riemannian geometry.

In stage 4, the classifier 108 can also normalize the EMG signal. Normalization may optionally be performed as described in greater detail below with regard to FIG. 7B. FIG. 7B shows an exemplary, non-limiting, illustrative method for normalization of EMG signals according to at least some embodiments of the present invention.

In stage 1, the log normal of the signal is optionally calculated. The inventors have found, surprisingly, that when the face of a subject has a neutral expression, the roughness diverges less from a multivariate Gaussian distribution, than when the subject has a non-neutral expression. However, when the face of a subject is not neutral and is exhibiting a non-neutral expression, the roughness diverges even more from a multivariate Gaussian distribution. In fact it is well described by a multivariate log-normal distribution. However many, if not all, classification methods (especially the most computationally efficient ones) expect the features to be analyzed to follow a multivariate Gaussian distribution. To overcome this problem, one can simply compute the log of the roughness before applying any classification algorithms:

$$x_i^{(log)} = \log(x_i) \tag{7}$$

Stage 2 features the normalization of the variance of the signal for each electrode. In stage 3, the covariance is calculated across electrodes, and in some implementations, across a plurality of users. For example, in stage 3, the classifier 108 can analyze the cleaned signal to determine one or more features. For example, the classifier 108 can determine the roughness of the cleaned signal.

FIG. 7C shows example results of roughness calculations for different examples of signal inputs. In general, the roughness can be seen as a nonlinear transformation of the input signal that enhances the high-frequency contents. For example, in some implementations, roughness may be considered as the opposite of smoothness.

Since the roughness of an EMG signal can be a filter, the roughness can contain one free parameter that can be fixed a priori (e.g., such as a time window $\Delta T$ over which the roughness is computed). This free parameter (also referred to herein as a meta-parameter), in some implementations, can have a value of 100 milliseconds. In this manner, the meta-parameter can be used to improve the efficiency and accuracy of the classification of the EMG signal.

FIGS. 8A and 8B show different example, non-limiting, illustrative methods for facial expression classification according to at least some embodiments.

With respect to FIGS. 8A-8B, the following variables may be used in embodiments described herein: xi: data vector at time i, of size (p×1), where p is the dimension of the data vector (e.g., a number of features represented and/or potentially represented within the data vector).

K: number of classes (i.e. the number of expressions to classify)

μ: sample mean vector

Σ: sample covariance matrix

FIG. 8A shows an exemplary, non-limiting, illustrative method for facial expression classification according to a quadratic form of discriminant analysis, which can include QDA or sQDA.

In stage 1, the state of the user can be determined, in particular with regard to whether the face of the user has a neutral expression or a non-neutral expression. The data is therefore, in some implementations, analyzed to determine whether the face of the user is in a neutral expression state or a non-neutral expression state. Before facial expression determination begins, the user can be asked to maintain a deliberately neutral expression, which is then analyzed. Alternatively, the signal processing abstraction layer 104 can determine the presence of a neutral or non-neutral expression without this additional information, through a type of pre-training calibration.

The determination of a neutral or non-neutral expression can be performed based on a determination that the roughness of EMG signals from a neutral facial expression can follow a multivariate Gaussian distribution with a given mean and covariance matrix corresponding to the neutral state. Thus, by performing this process, the signal processing abstraction layer 104 can detect the presence or absence of an expression before the classification occurs.

Assume that in the absence of expression, the roughness r is distributed according to a multivariate Gaussian distribution (possibly after log transformation):

$$r \sim \mathcal{N}(\mu_0, \Sigma_0)$$

Neutral parameters can be estimated from the recordings using sample mean and sample covariance. Training to achieve these estimations is described with regard to FIG. 10 according to a non-limiting, example illustrative training method.

At each time-step, the signal processing abstraction layer 104 can compute the chi-squared distribution (i.e. the multivariate Z-score):

$$z_i = (r_i - \mu_0)^T \Sigma_0^{-1} (r_i - \mu_0);$$

If $z_i > z_{threshold}$, then the signal processing abstraction layer 104 can determine that the calculated roughness significantly differ from that which would be expected if the user's facial muscles were in a neutral state (i.e., that the calculated roughness does not follow a neutral multivariate Gaussian distribution). This determination can inform the signal processing abstraction layer 104 that an expression was detected for the user, and can trigger the signal processing abstraction layer 104 to send the roughness value to the classifier 108, such that the classifier 108 can classify the data using one of the classifiers.

If $z_i <= z_{threshold}$, then the signal processing abstraction layer 104 can determine that the calculated roughness follows a neutral multivariate Gaussian distribution with mean mu0 and covariance matrix sigma0, and can therefore determine that the user's expression is neutral.

In some implementations, the threshold $z_{threshold}$ can be set to a value given in a chi-squared table for p-degree of liberty and an $\alpha=0.001$, and/or to a similar value. In some implementations, this process can improve the accuracy at which neutral states are detected, and can increase an efficiency of the system in classifying facial expressions and/or other information from the user.

In stage 2, if the signal processing abstraction layer 104 determines that the user made a non-neutral facial expression, discriminant analysis can be performed on the data to classify the EMG signals from the electrodes 113. Such discriminant analysis may include LDA analysis, QDA analysis, variations such as sQDA, and/or the like.

In a non-limiting example, using a QDA analysis, the classifier can perform the following:

In the linear and quadratic discriminant framework, data $x_k$ from a given class k is assumed to come from multivariate Gaussian distribution with mean, μk and covariance Σk. Formally one can derive the QDA starting from probability theory.

Assume (x|k) follows a multivariate Gaussian distribution:

$$p(x|k) = \frac{1}{(2\pi)^{\frac{p}{2}} |\Sigma_k|^{\frac{1}{2}}} \exp\left[-\frac{1}{2}(x-\mu_k)^T \sum_k^{-1} (x-\mu_k)\right] \tag{8}$$

with class prior distribution πk $$\sum_{k=1}^{K} \pi_k = 1 \tag{9}$$

and unconditional probability distribution:

$$p(x) = \sum_{k=1}^{K} \pi_k p(x \mid k) \quad (10)$$

Then applying Bayes rule, the posterior distribution is given by:

$$p(k \mid x) = \frac{\pi_k p(x \mid k)}{p(x)} \quad (11)$$

$$p(k \mid x) \propto \pi_k p(x \mid k) \quad (12)$$

Description of QDA

The goal of the QDA is to find the class k that maximizes the posterior distribution p(k|x) defined by Eq. 12 for a data point $x_i$.

$$\hat{k}_i = \mathrm{argmax}_k p(k \mid x_i) \quad (13)$$

In other words, for a data point xi QDA describes the most probable probability distribution p(k|x) from which the data point is obtained, under the assumption that the data are normally distributed.

Equation 13 can be reformulated to explicitly show why this classifier may be referred to as a quadratic discriminant analysis, in terms of its log-posterior log ($\pi_k p(x_i|k)$), also called log-likelihood.

Posterior:

The posterior Gaussian distribution is given by:

$$\pi_k p(x_i \mid k) = \pi_k (2\pi)^{-\frac{p}{2}} |\textstyle\sum_k|^{-\frac{1}{2}} \exp\left[-\frac{1}{2}(x_i - \mu_k)^T \textstyle\sum_k^{-1} (x_i - \mu_k)\right] \quad (14)$$

Log-Posterior:

Taking the log of the posterior does not change the location of its maximum (since the log-function is monotonic), so the Log-Posterior is:

$$\log(\pi_k p(x_i \mid k)) = \quad (15)$$
$$\log\left(\pi_k (2\pi)^{-\frac{p}{2}} |\textstyle\sum_k|^{-\frac{1}{2}} \exp\left[-\frac{1}{2}(x_i - \mu_k)^T \textstyle\sum_k^{-1} (x_i - \mu_k)\right]\right)$$

$$\log[(\pi\_k p(x\_i \mid k)) = \quad (16)$$
$$\log[[(\pi\_k) - 1/2(p\log(2\pi) + \log(|\Sigma\_k|) + (x\_i - \mu\_k)^\wedge$$
$$T\Sigma\_k^\wedge(-1)(x\_i - \mu\_k))]]$$

QDA Discriminant Function

Since the class k that maximizes Eq. 16 for a data point xi is of interest, it is possible to discard the terms that are not class-dependent (i.e., log (2π) and for readability multiply by −2, thereby producing the discriminant function given by:

$$d_k^{(qda)}(x_i) = (x_i - \mu_k)^T \Sigma_k^{-1}(x_i - \mu_k) + \log(|\Sigma_k|) - 2\log(\pi_k) \quad (17)$$

In equation 17, it is possible to see that the discriminant function of the QDA is quadratic in x, and to therefore define quadratic boundaries between classes. The classification problem stated in Eq. 13 can be rewritten as:

$$\hat{k} = \mathrm{argmin}_k d_k^{(qda)}(x_i) \quad (18)$$

LDA

In the LDA method, there is an additional assumption on the class covariance of the data, such that all of the covariance matrices a of each class are supposed to be equal, and classes only differ by their mean μk:

$$\Sigma_k = \Sigma, \forall k \in \{1, \ldots, K\} \quad (19)$$

Replacing Σk by Σ and dropping all the terms that are not class-dependent in Eq. 17, the discriminant function of the LDA $d_k^{(lda)}(x_i)$ is obtained:

$$d_k^{(lda)}(x_i) = 2\mu_k^T \Sigma^{-1} x_i - \mu_k^T \Sigma^{-1} \mu_k - 2\log(\pi_k) \quad (20)$$

QDA for a Sequence of Data Points

In the previous section, the standard QDA and LDA were derived from probability theory. In some implementations, QDA classifies data point by point; however, in other implementations, the classifier can classify a plurality of n data points at once. In other words, the classifier can determine from which probability distribution the sequence z has been generated. It is a naive generalization of the QDA for time series. This generalization can enable determination of (i) if it performs better than the standard QDA on EMG signal data and (ii) how it compares to the Riemann classifier described with regard to FIG. 8B below.

Assuming that a plurality of N data points is received, characterized as:

$$\{x_i, \ldots x_{i+N}\}$$

then according to Equation 12 one can compute the probability of that sequence to have been generated by the class k, simply by taking the product of the probability of each data point:

$$p(k \mid \tilde{x}) = \prod_{i=1}^{N} p(k \mid x_i) \quad (21)$$

$$p(k \mid \tilde{x}) \propto \prod_{i=1}^{N} (\pi_k p(x_i \mid k)) \quad (22)$$

As before, to determine the location of the maximum value, it is possible to take the log of the posterior, or the log-likelihood of the time-series:

$$\log\left[\prod_{i=1}^{N} (\pi_k p(x_i \mid k))\right] = \sum_{i=1}^{N} [\log(\pi_k p(x_i \mid k))] \quad (23)$$

$$= \sum_{i=1}^{N} [\log(p(x_i \mid k)) + \log(\pi_k)] \quad (24)$$

$$= \sum_{i=1}^{N} \log(p(x_i \mid k)) + \sum_{i=1}^{N} \log(\pi_k) \quad (25)$$

$$= \sum_{i=1}^{N} \log(p(x_i \mid k)) + N\log(\pi_k) \quad (26)$$

Plugging Eq. 8, the log-likelihood $L(\tilde{x}|k)$ of the data is given by:

$$L(\tilde{x} \mid k) = N\log(\pi_k) - \frac{1}{2}\sum_{i=1}^{N}\left(p\log(2\pi) + \log\left(\left|\textstyle\sum_i\right|\right) + \quad (27)\right.$$
$$\left.(x_i - \mu_k)^T \textstyle\sum_k^{-1}(x_i - \mu_k)\right)$$

$$= N\log(\pi_k) - \frac{Np}{2}\log(2\pi) - \frac{N}{2}\log(|\Sigma_k|) - \quad (28)$$
$$\frac{1}{2}\sum_{i=1}^{N}\left((x_i - \mu_k)^T \Sigma_k^{-1}(x_i - \mu_k)\right)$$

As for the standard QDA, dropping the terms that are not class-dependent and multiplying by −2 gives use the new discriminant function $$d_k^{(sQDA)}(\tilde{x})$$

of the sequential QDA (sQDA) as follows:

$$d_k^{(sQDA)}(\tilde{x}) = \quad (29)$$
$$\sum_{i=1}^{N}\left[(x_i - \mu_k)^T \Sigma_k^{-1}(x_i - \mu_k)\right] + N\log(|\Sigma_k|) - 2N\log(\pi_k)$$

Finally, the decision boundaries between classes leads to the possibility of rewriting the classification problem stated in Eq. 13 as:

$$\hat{k} = \text{argmin}_k d_k^{(sQDA)}(\tilde{x}) \quad (30)$$

Links Between QDA and Time-Series sQDA

In some implementations of the QDA, each data point can be classified according to Eq. 18. Then, to average out transient responses so as to provide a general classification (rather than generating a separate output at each time-step), a majority voting strategy may be used to define output labels every N-time-step.

In the majority voting framework, the output label $$\tilde{k}$$

can be defined as the one with the most occurrences during the N last time-step. Mathematically it can be defined as:

$$\tilde{k}^{(qda)} = \text{argmax}_{1 \leq k \leq K} \sum_{i=1}^{N}\left(f(\hat{k}_i, k)\right) \quad (31)$$

For equation 31, f is equal to one when the two arguments are the same and zero otherwise.

In the case of the sQDA, the output label $$\tilde{k}$$

can be computed according to Equation 29. The two approaches can thus differ in the way they each handle the time-series. Specifically, in the case of the QDA, the time-series can be handled by a majority vote over the last N time samples, whereas for the sQDA, the time-series can be handled by cleanly aggregating probabilities overtime.

$$\tilde{k}^{(s-qda)} = \text{argmax}_{1 \leq k \leq K} \prod_{i=1}^{N}(\pi_k p(x_i | k)) \quad (32)$$

Regularized LDA (RDA)

The regularized discriminant analysis classifier is a combination of the LDA and the QDA.

The RDA classifier is useful when we have a limited number of samples per class compared to the number of features (the number of channels in this example) or when class-covariance matrices are singular or close to singularity, i.e., matrix condition number is large.

In this situation, the RDA can reduce the complexity by weighting the class-covariance matrices of the QDA towards the LDA global covariance matrix.

This regularization is done by computing new class-covariance matrices:

$$\hat{\Sigma}_k(\lambda) = (1-\lambda)\Sigma_k + \lambda \Sigma$$

The $\Sigma k$ matrix denotes the class-covariance matrices (QDA) and $\Sigma$ is the averaged (LDA) covariance matrix. Lambda ($0 \leq \lambda \leq 1$) is the regularization parameter.

A second shrinkage parameter $\gamma$ may also be used. This shrinkage parameter forces the eigenvalues of the class-covariance matrices toward equality.

$$\hat{\Sigma}_k(\lambda, \gamma) = (1-\gamma)\hat{\Sigma}_k(\lambda) + \frac{\gamma}{d}tr\left[\hat{\Sigma}_k(\lambda)\right]I$$

where $\gamma$ ($0 \leq \gamma \leq 1$) is the regularization parameter, d is the number of channels and tr denotes the trace of the matrix.

Comparison of the QDA and sQDA Classifiers

Figure 8C:
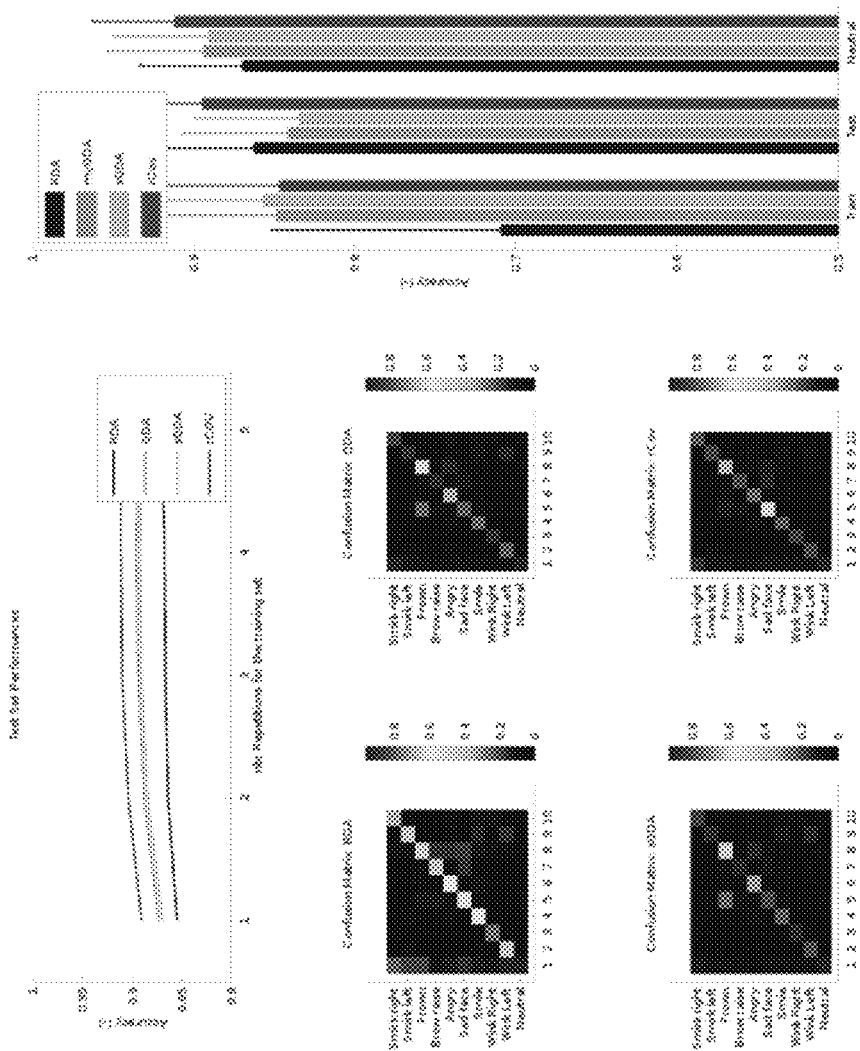
FIGS. 8C-8F show the results of various analyses and comparative tests.

FIG. 8C shows the accuracy obtained of a test of classification averaged on 4 different users. Each test set is composed of a maximum of 5 repetitions of a task where the user is asked to display the 10 selected expressions twice.

For example, FIG. 8C(A) shows accuracy on the test set as a function of the training set size in number of repetitions of the calibration protocol. FIG. 8C(B) show confusion matrices of the four different models. FIG. 8C(C) shows accuracy as a function of the used classification model, computed on the training set, test set and on the test for the neutral model.

From FIG. 8C(C), one can observe that no model performs better on the training set than on the test set, indicating absence of over-fitting. Second, from FIG. 8C(A), one can observe that all of the models exhibit good performances with the minimal training set. Therefore, according to at least some embodiments, the calibration process may be reduced to a single repetition of the calibration protocol. An optional calibration process and application thereof is described with regard to FIG. 9A, although this process may also be performed before or after classification.

Third, the confusion matrices FIG. 8C(B) illustrate that the classifier 108 may use more complex processes to classify some expressions correctly, such as for example expressions that may appear as the same expression to the classifier, such as sad, frowning and angry expressions.

Finally, the models do not perform equivalently on the neutral state (data not shown). In particular, both the sQDA and the QDA methods encounter difficulties staying in the neutral state in between forced (directed) non-neutral expressions. To counterbalance this issue, determining the state of the subject's expression, as neutral or non-neutral, may optionally be performed as described with regard to stage 1.

Turning back to FIG. 8A, in stage 3, the probabilities obtained from the classification of the specific user's results can be considered to determine which expression the user is likely to have on their face. In stage 4, the predicted expression of the user is selected. In stage 5, the classification can be adapted to account for inter-user variability, as described with regard to the example, illustrative non-limiting method for adaptation of classification according to variance between users shown in FIG. 9A.

FIG. 8B shows an exemplary, non-limiting, illustrative method for classification according to Riemannian geometry. Stage 1, in some implementations, can proceed as previously described for stage 1 of FIG. 8A. In stage 2, rCOV can be calculated for a plurality of data points, optionally according to the example method described below.

The Riemannian Framework

Riemann geometry takes advantage of the particular structure of covariance matrices to define distances that can be useful in classifying facial expressions. Mathematically, the Riemannian distance as a way to classify covariance matrices may be described as follows:

Covariance matrices have some special structure that can be seen as constraints in an optimization framework.

Covariance matrices are semi-positive definite matrices (SPD).

Since covariance can be SPD, the distance between two covariance matrices may not be measurable by Euclidean distance, since Euclidean distance may not take into account the special form of the covariance matrix.

To measure the distance between covariance matrices, one has to use the Riemannian distance $\delta_r$ given by:

$$\delta_r\left(\sum\nolimits_1, \sum\nolimits_2\right) = \left\|\log\left(\sum\nolimits_1^{-\frac{1}{2}} \sum\nolimits_2 \sum\nolimits_1^{-\frac{1}{2}}\right)\right\|_F = \left(\sum_{c=1}^{C} \log^2(\lambda_c)\right)^{\frac{1}{2}} \quad (33)$$

where $$\|\cdots\|_F$$

is the Froebenius norm and where $$\lambda_c, c=1, \ldots, C$$

are the real eigenvalues of $$\sum\nolimits_1^{-\frac{1}{2}} \sum\nolimits_2 \sum\nolimits_1^{-\frac{1}{2}}$$

then the mean covariance matrix $\Sigma_k$ over a set of I covariance matrices may not be computed as the Euclidean mean, but instead can be calculated as the covariance matrix that minimizes the sum squared Riemannian distance over the set:

$$\sum\nolimits_k = \mathfrak{S}\left(\sum\nolimits_1, \ldots, \sum\nolimits_I\right) = argmin_{\Sigma} \sum_{i=1}^{I} \delta_r^2\left(\sum, \sum\nolimits_i\right) \quad (34)$$

Note that the mean covariance $\Sigma_k$ computed on a set of I covariance matrices, each of them estimated using t milliseconds of data, may not be equivalent to the covariance estimated on the full data set of size tI. In fact, the covariance estimated on the full data set may be more related to the Euclidean mean of the covariance set.

Calculating the Riemannian Classifier, rCOV

To implement the Riemennian calculations described above as a classifier, the classifier 108 can:

Select the size of the data used to estimate a covariance matrix.

For each class k, compute the set of covariance matrices of the data set.

The class covariance matrix $\Sigma_k$ is the Riemannian mean over the set of covariances estimated before.

A new data point, in fact a new sampled covariance matrix $\Sigma_i$, is assigned to the closest class:

$$\hat{k}^{(i)} = argmin_k \delta_T(\Sigma_k, \Sigma_i)$$

Relationship Between sQDA and rCov Classifiers

First, the sQDA discriminant distance can be compared to the Riemannian distance. As explained before in the sQDA framework, the discriminant distance between a new data point $x_i$ and a reference class k is given by Eq. 29, and can be the sum of the negative log-likelihood. Conversely, in the Riemannian classifier, the classification can be based on the distance given by Eq. 33. To verify the existence of conceptual links between these different methods, and to be able to bridge the gap between sQDA and rCOV, FIG. 8F shows the discriminant distance as a function of the Riemann distance, computed on the same data set and split class by class. Even if these two distances correlate, there is no obvious relationship between them, because the estimated property obtained through sQDA is not necessarily directly equivalent to the Riemannian distance—yet in terms of practical application, the inventors have found that these two methods provide similar results. By using the Riemannian distance, the classifier 108 can use fewer parameters to train to estimate the user's facial expression.

FIG. 8F shows the sQDA discriminant distance between data points for a plurality of expressions and one reference class as a function of the Riemann distance. The graphs in the top row, from the left, show the following expressions: neutral, wink left, wink right. In the second row, from the left, graphs for the following expressions are shown: smile, sad face, angry face. The third row graphs show the following expressions from the left: brow raise and frown. The final graph at the bottom right shows the overall distance across expressions.

Comparison of QDA, sQDA and rCOV Classifiers

To see how each of the QDA, rCOV, and the sQDA methods perform, accuracy of each of these classifiers for different EMG data sets taken from electrodes in contact with the face are presented in Table 1.

| Model | Subject's classifier | | Global classifier | |
|---|---|---|---|---|
| | mean(accuracy) (%) | std(accuracy) (%) | mean(accuracy) (%) | std(accuracy) (%) |
| LDA | 91.04 | 11.45 | 85.81 | 12.66 |
| QDA | 94.26 | 8.53 | 88.61 | 13.94 |
| sQDA | 96.79 | 6.08 | 90.48 | 13.69 |
| rCOV | 93.27 | 10.51 | 87.72 | 11.06 |

Table 1 shows the classification accuracy of each model for 11 subjects (mean and standard deviation of performance across subjects). Note that for sQDA and rCOV, one label is computed using the last 100 ms of data, and featuring an optional 75% overlap (i.e. one output label every 25 ms).

When the previously described stage 1 model of distinguishing between neutral and non-neutral expressions is used, the stability in the neutral state increases for all the models, and overall performance increases (compare columns 2 and 4 in Table 1). However, different versions of this model show similar results across different classifier methods in FIGS. 8D and 8E, which show the predicted labels for the four different neutral models.

Figure 8D:
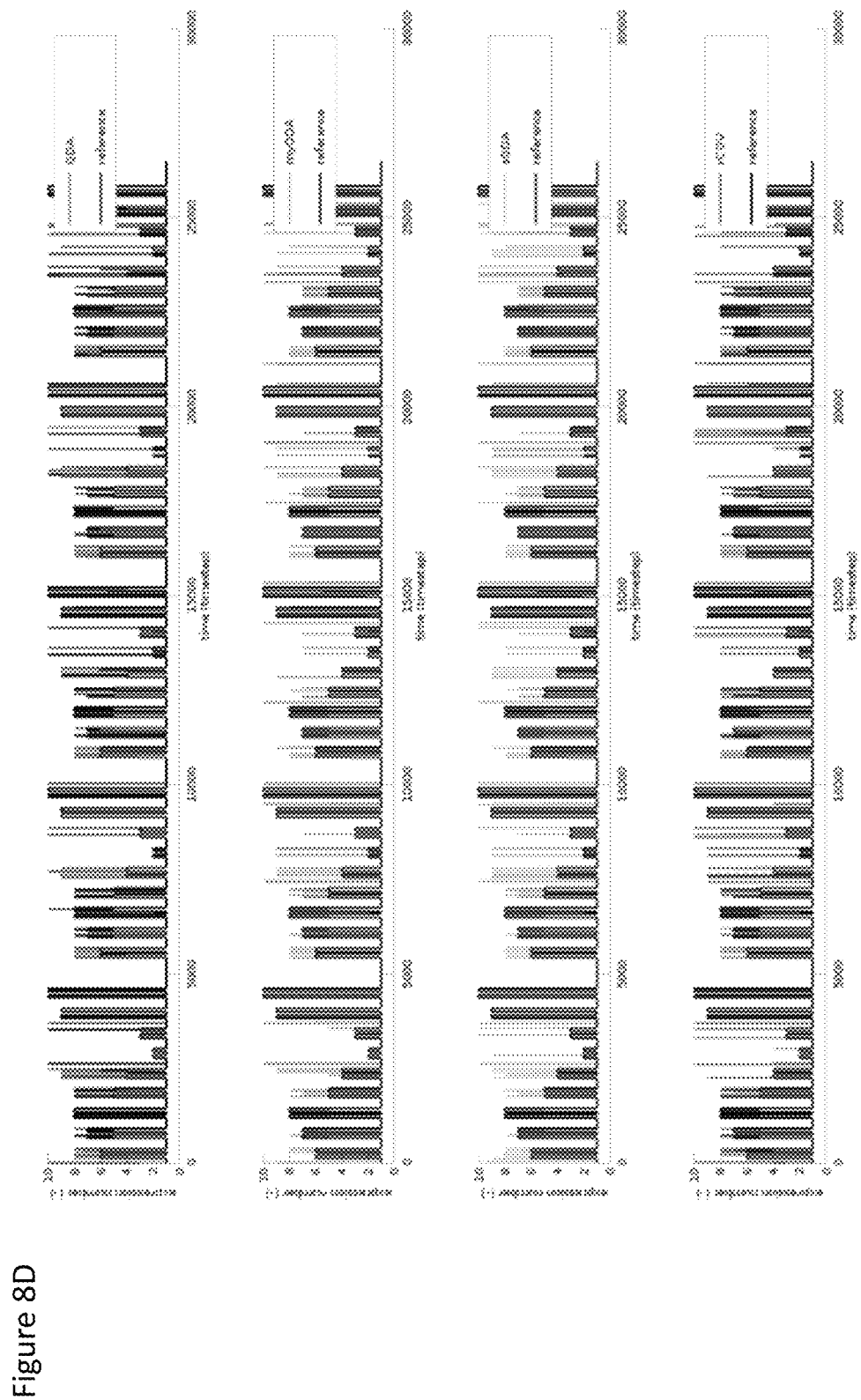
Figure 8E:
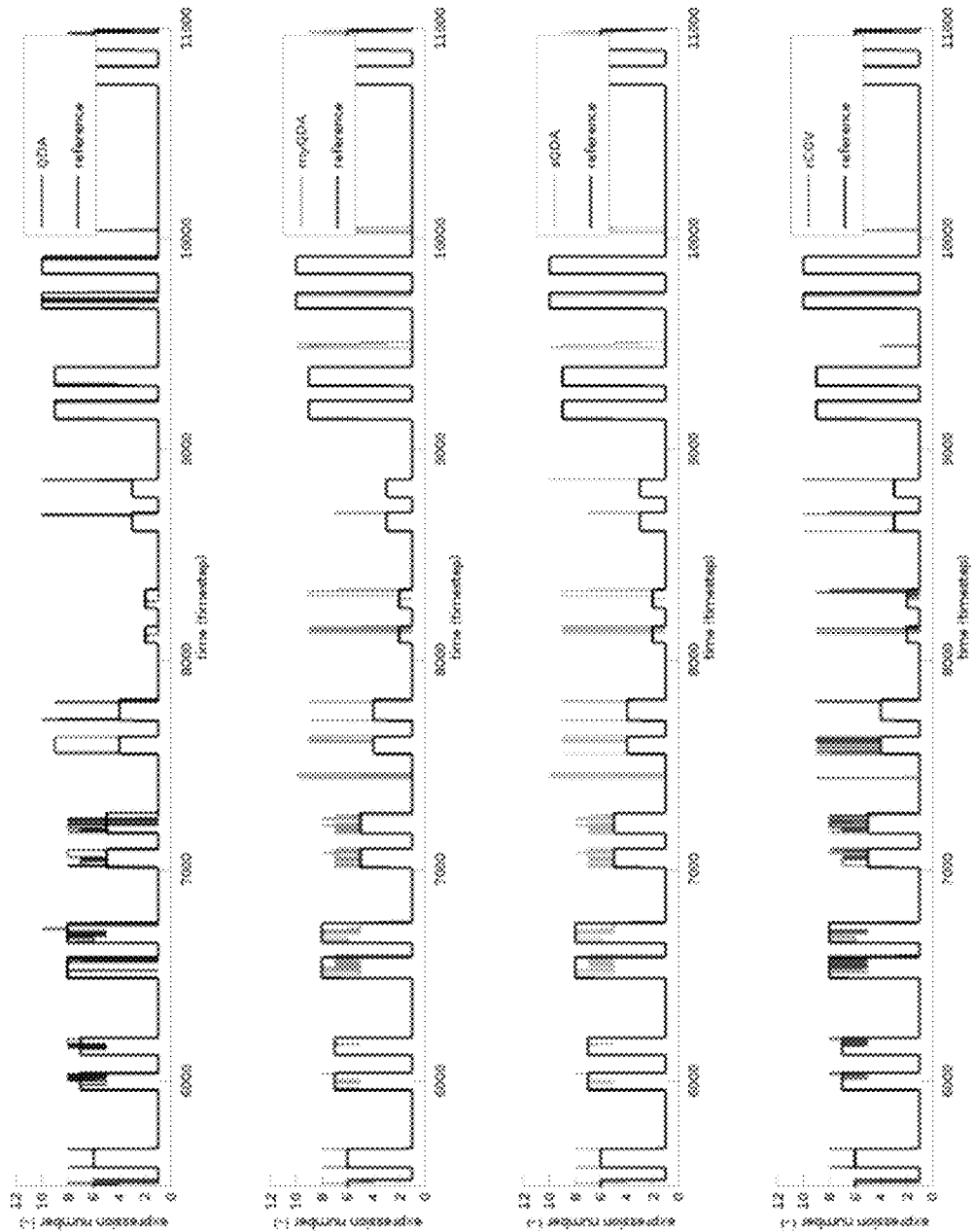
Figure 8F:
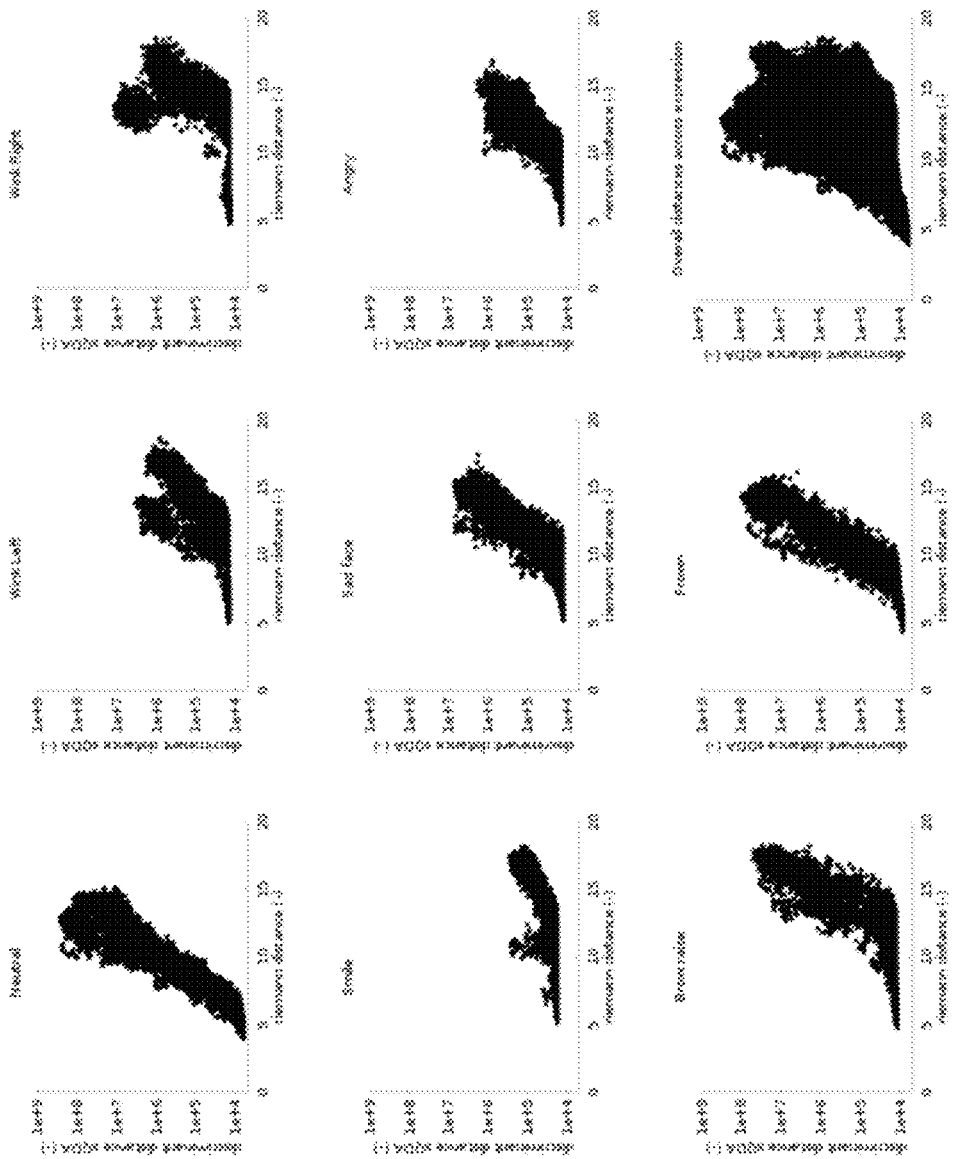

FIG. 8D shows the reference label and predicted label of the a) QDA, b) RDA, c) sQDA, and d) rCOV models. The RDA (regularized discriminant analysis) model can be a merger of the LDA and QDA methods, and may optionally be used for example if there is insufficient data for an accurate QDA calculation. In the drawings, "myQDA" is the RDA model. FIG. 8E shows a zoomed version of FIG. 8D.

Turning back to FIG. 8B, stages 3-5 are, in some implementations, performed as described with regard to FIG. 8A.

Optionally, a level of facial expression may be determined with regard to the roughness. The roughness is determined as previously described. Level of expression is well approximated by the standard deviation of the roughness across the electrodes. Without wishing to be limited by a single hypothesis, intuitively this can be explained by the fact that for any facial expressions, only a subset of electrodes are activated at the same time, so that the variance across the electrodes increases proportionally to the strength of the expression. Thus, level of expression may be determined as follows:

$$l_i = \log(\sigma(r_t^{(ma)}) + 1)$$

where the sigma function is the standard deviation across dimensions and the logarithm is used to reduce by compression the subject-to-subject variability. Note that for the neutral state (i.e. no facial expression), the value of the level of expression will be close to zero, since all the electrodes picked up approximately the same static signal and no muscular activity is determined to be present. It is thus feasible to use the level of expression as an activity detector by simply thresholding $l_i$.

Turning now to FIGS. 9A and 9B, different example, non-limiting, illustrative methods for facial expression classification adaptation according to at least some embodiments of the present invention are shown.

FIG. 9A shows an exemplary, illustrative non-limiting method for adaptation of classification according to variance between users. According to at least some embodiments, when adaptation is implemented, the beginning of classification can be the same. Adaptation in these embodiments can be employed at least once after classification of at least one expression of each user, at least as a check of accuracy and optionally to improve classification. Alternatively or additionally, adaptation may be used before the start of classification before classification of at least one expression for each user.

In some implementations, adaptation can be used during training, with both neutral and non-neutral expressions. However, after training, the neutral expression (the neutral state) may be used for adaptation. For example, if the classifier employs QDA or a variant thereof, adaptation may reuse what was classified before as neutral, to retrain the parameters of the neutral classes. Next, the process may re-estimate the covariance and mean of neutral for adaptation, as this may deviate from the mean that was assumed by global classifier. In some implementations, only a non-neutral expression is used, such as a smile or an angry expression, for example. In that case, a similar process would be followed with one or more non-neutral expressions.

In the non-limiting example shown in FIG. 9A, expression data from the user is used for retraining and re-classification of obtained results. In stage 1, such expression data is obtained with its associated classification for at least one expression, which may optionally be the neutral expression for example. In stage 2, the global classifier is retrained on the user expression data with its associated classification. In stage 3, the classification process can be performed again with the global classifier. In some implementations, this process is adjusted according to category parameters, which may optionally be obtained as described with regard to the non-limiting, example method shown in FIG. 9B. In stage 4, a final classification can be obtained.

FIG. 9B shows an exemplary, non-limiting, illustrative method for facial expression classification adaptation which may be used for facial expression classification, whether as a stand-alone method or in combination with one or more other methods as described herein. The method shown may be used for facial expression classification according to categorization or pattern matching, against a data set of a plurality of known facial expressions and their associated EMG signal information. The method is based upon results obtained by the present inventors, which surprisingly indicate that users with at least one expression that shows a similar pattern of EMG signal information are likely to show such similar patterns for a plurality of expressions and even for all expressions.

In stage 1, a plurality of test user classifications from a plurality of different users are categorized into various categories or "buckets." Each category, in some implementations, represents a pattern of a plurality of sets of EMG signals that correspond to a plurality of expressions. In some implementations, data is obtained from a sufficient number of users such that a sufficient number of categories are obtained to permit optional independent classification of a new user's facial expressions according to the categories.

In stage 2, test user classification variability is, in some implementations, normalized for each category. In some implementations, such normalization is performed for a sufficient number of test users such that classification patterns can be compared according to covariance. The variability is, in some implementations, normalized for each set of EMG signals corresponding to each of the plurality of expressions. Therefore, when comparing EMG signals from a new user to each category, an appropriate category may be selected based upon comparison of EMG signals of at least one expression to the corresponding EMG signals for that expression in the category, in some implementations, according to a comparison of the covariance. In some implementations, the neutral expression may be used for this comparison, such that a new user may be asked to assume a neutral expression to determine which category that user's expressions are likely to fall into.

In stage 3, the process of classification can be initialized on at least one actual user expression, displayed by the face of the user who is to have his or her facial expressions classified. As described above, in some implementations, the neutral expression may be used for this comparison, such that the actual user is asked to show the neutral expression on his or her face. The user may be asked to relax his or her face, for example, so as to achieve the neutral expression or state. In some implementations, a plurality of expressions may be used for such initialization, such as a plurality of non-neutral expressions, or a plurality of expressions including the neutral expression and at least one non-neutral expression.

If the process described with regard to this drawing is being used in conjunction with at least one other classification method, optionally for example such another classification method as described with regard to FIGS. 8A and 8B, then initialization may include performing one of those methods as previously described for classification. In such a situation, the process described with regard to this drawing may be considered as a form of adaptation or check on the results obtained from the other classification method.

In stage 4, a similar user expression category is determined by comparison of the covariances for at least one expression, and a plurality of expressions, after normalization of the variances as previously described. The most similar user expression category is, in some implementations, selected. If the similarity does not at least meet a certain threshold, the process may stop as the user's data may be considered to be an outlier (not shown).

In stage 5, the final user expression category is selected, also according to feedback from performing the process described in this drawing more than once (not shown) or alternatively also from feedback from another source, such as the previous performance of another classification method.

Figure 10:
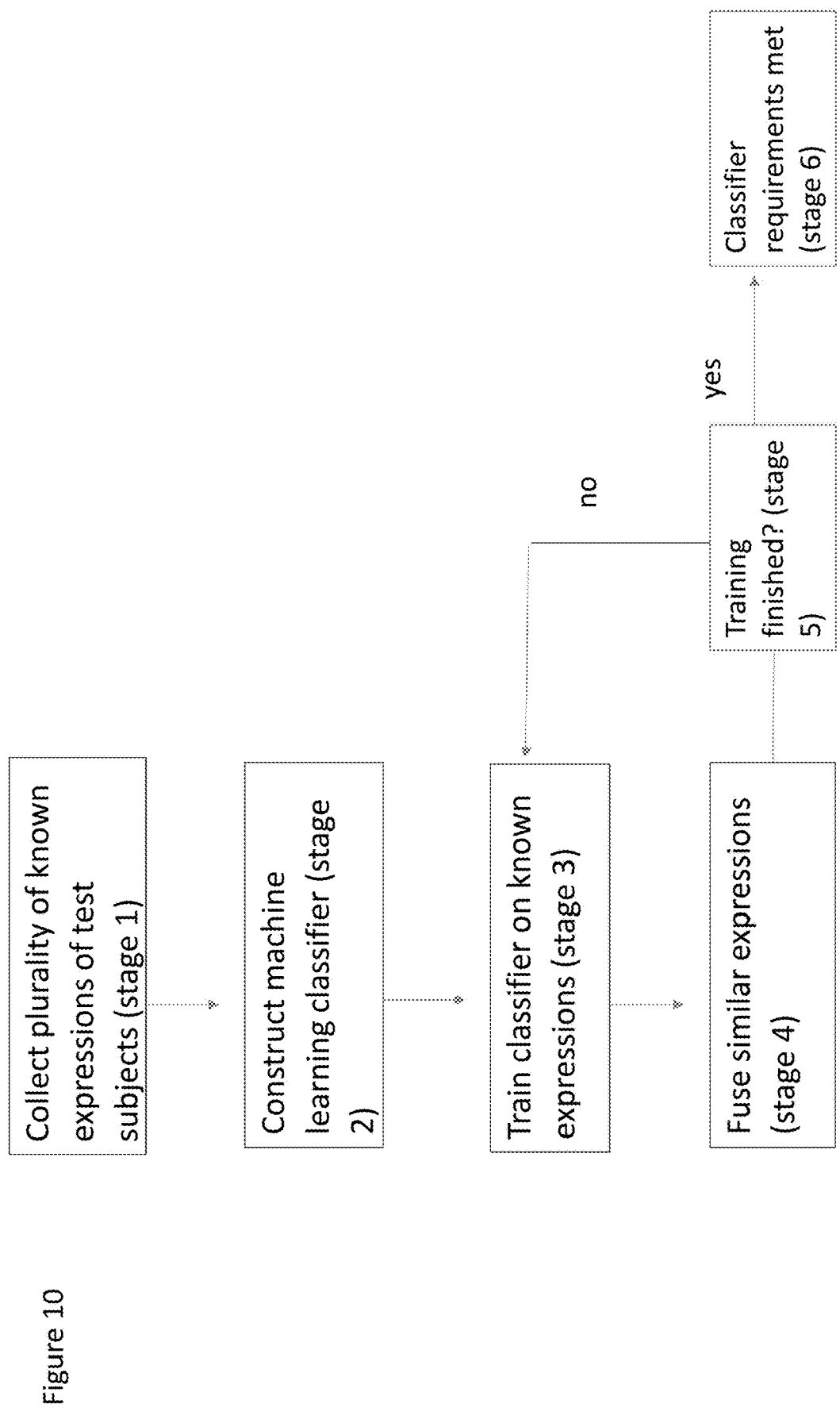
FIG. 10 shows an exemplary, non-limiting, illustrative method for training a facial expression classifier according to some embodiments.

FIG. 10 shows an exemplary, non-limiting, illustrative method for training a facial expression classifier according to at least some embodiments of the present invention. In stage 1, the set of facial expressions for the training process is determined in advance, in some implementations, including a neutral expression.

Data collection may be performed as follows. A user is equipped with the previously described facemask to be worn such that the electrodes are in contact with a plurality of facial muscles. The user is asked to perform a set of K expression with precise timing. When is doing this task, the electrodes' activities are recorded as well as the triggers. The trigger clearly encodes the precise timing at which the user is asked to performed a given expression. The trigger is then used to segment data. At the end of the calibration protocol, the trigger time series trig$_i$ and the raw electrodes' activities $x_i^{(raw)}$ are ready to be used to calibrate the classifier.

In stage 2, a machine learning classifier is constructed for training, for example, according to any suitable classification method described herein. In stage 3, the classifier is trained. The obtained data is, in some implementations, prepared as described with regard to the preprocessing stage as shown for example in FIG. 6, stage 2 and subsequent figures. The classification process is then performed as shown for example in FIG. 6, stage 3 and subsequent figures. The classification is matched to the known expressions so as to train the classifier. In some implementations, in stage 3, the determination of what constitutes a neutral expression is also determined. As previously described, before facial expression determination begins, the user is asked to maintain a deliberately neutral expression, which is then analyzed.

Therefore, first only the segment of the data is considered where the users were explicitly asked to stay in the neutral state $x_i$, $i \in$ neutral. This subset of the data $X_{neutral}$ is well described by a multivariate Gaussian distribution $$X_{neutral} \sim \mathcal{N}(\vec{\mu}_{neutral}, \Sigma_{neutral}).$$

The mean vector $\vec{\mu}_{neutral}$ and the covariance matrix $\Sigma_{neutral}$ can be computed as the sample-mean and sample-covariance:

$$\vec{\mu}_{neutral} = \frac{1}{N_{neutral}} \sum_{i=1}^{N_{neutral}} \vec{x}_{i \in neutral} \tag{35}$$

$$\Sigma_{neutral} = \frac{1}{(N_{neutral} - 1)} \sum_{i=1}^{N_{neutral}} (\vec{x}_{i \in neutral} - \vec{\mu}_{neutral})(\vec{x}_{i \in neutral} - \vec{\mu}_{neutral})^T \tag{36}$$

Once the parameters have been estimated, it is possible to define a statistical test that tells if a data point $x_i$ is significantly different from this distribution, i.e. to detect when a non-neutral expression is performed by the face of the user.

When the roughness distribution statistically diverges from the neutral distribution, the signal processing abstraction layer 104 can determine that a non-neutral expression is being made by the face of the user. To estimate if the sampled roughness $x_i$ statistically diverges from the neutral state, the signal processing abstraction layer 104 can use the Pearson's chi-squared test given by:

$$z_i = (\vec{x}_i - \vec{\mu}_{neutral})^T \Sigma_{neutral}^{-1} (\vec{x}_i - \vec{\mu}_{neutral}) \tag{37}$$

$$\text{state} = \begin{cases} \text{neutral}, & \text{if } z_i \leq z_{th} \\ \text{expression}, & \text{otherwise} \end{cases}$$

$$z_i = (\vec{x}_i - \vec{\mu}_{neutral})^T \Sigma_{neutral}^{-1} (\vec{x}_i - \vec{\mu}_{neutral}) \tag{11}$$

$$\text{state} = \begin{cases} \text{neutral}, & \text{if } z_i \leq z_{th} \\ \text{expression}, & \text{otherwise} \end{cases}$$

For the above equation, note that the state description is shortened to "neutral" for a neutral expression and "expression" for a non-neutral expression, for the sake of brevity.

In the above equation, $z_{th}$ is a threshold value that defines how much the roughness should differ from the neutral expression before triggering detection of a non-neutral expression. The exact value of this threshold depends on the dimension of the features (i.e. the number of electrodes) and the significance of the deviation a. As a non-limiting example, according to the $\chi^2$ table for 8 electrodes and a desired $\alpha$-value of 0.001, for example, $z_{th}$ must be set to 26.13.

In practice but as an example only and without wishing to be limited by a single hypothesis, to limit the number of false positives and so to stabilize the neutral state, a value of $z_{th}=50$ has been found by the present inventors to give good results. Note that a $z_{th}$ of 50 corresponds to a probability $\alpha$-value of $\approx 1e^{-7}$, which is, in other words, a larger probability $p(x_i \neq \text{neutral}|z_i)=0.99999995$ of having an expression at this time step.

To adjust the threshold for the state detection, the standard $\chi^2$ table is used for 8 degrees of freedom in this example, corresponding to the 8 electrodes in this example non-limiting implementation. Alternatively given a probability threshold, one can use the following Octave/matlab code to set $z_{th}$:

degreeOfFreedom=8;

dx=0.00001;

xx=0:dx:100;

y=chi2pdf(xx,degreeOfFreedom);

zTh=xx(find(cumsum(y*dx)>=pThreshold))(1);

In some implementations, in stage 4, the plurality of facial expressions is reduced to a set which can be more easily distinguished. For example, the present inventors initially started with a set of 25 expressions, but now use 5 expressions according to at least some embodiments of the present invention. The determination of which expressions to fuse may be performed by comparing their respective covariance matrices. If these matrices are more similar than a threshold similarity, then the expressions may be fused rather than being trained separately. In some implementations, the threshold similarity is set such that classification of a new user's expressions may be performed with retraining. Additionally or alternatively, the threshold similarity may be set according to the application of the expression identification, for example for online social interactions. Therefore, expressions which are less required for such an application, such as a "squint" (in case of difficulty seeing), may be dropped as potentially being confused with other expressions.

Once the subset of data where non-neutral expression occurs is defined, as is the list of expressions to be classified, it is straightforward to extract the subset of data coming from a given expression. The trigger vector contains all theoretical labels. By combining these labels with the estimated state, one can extract what is called the ground-truth label $y_i$, which takes discrete values corresponding to each expression.

$$y_i \in (1, \ldots, K) \quad (38)$$

where K is the total number of expressions that are to be classified.

In stage 5, the results are compared between the classification and the actual expressions. If sufficient training has occurred, then the process moves to stage 6. Otherwise, it returns to stages 3 and 4, which are optionally repeated as necessary until sufficient training has occurred. In stage 6, the training process ends and the final classifier is produced.

Figure 11A:
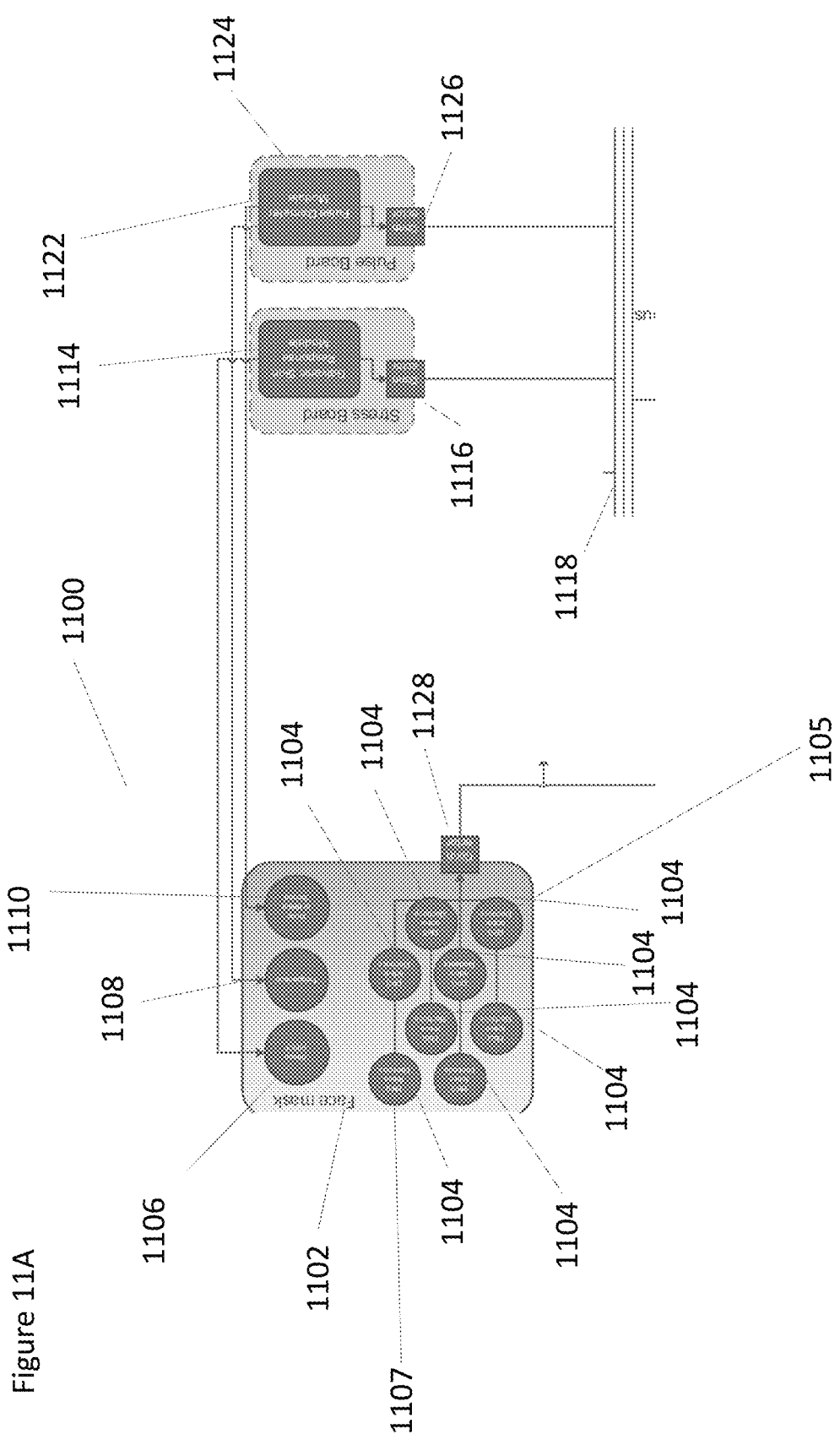
FIGS. 11A and 11B show an additional example, non-limiting, illustrative schematic electronic diagram of a facemask apparatus and system according to some embodiments.
Figure 11B:
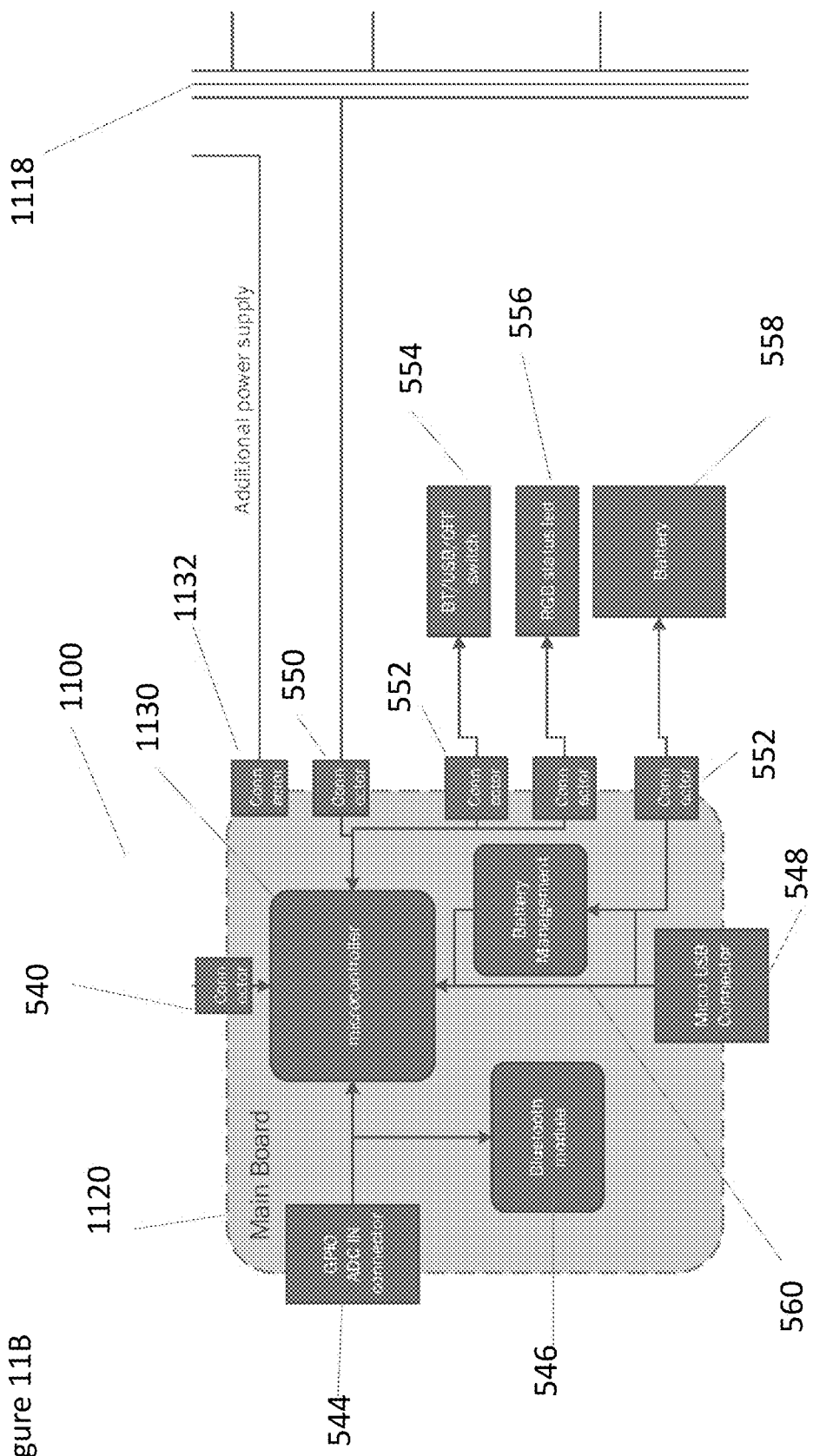

FIGS. 11A and 11B show an additional example, non-limiting, illustrative schematic electronic diagram of a facemask apparatus and system according to at least some embodiments of the present invention. The components of the facemask system are shown divided between FIGS. 11A and 11B, while the facemask apparatus is shown in FIG. 11A. The facemask apparatus and system as shown, in some implementations, feature additional components, in comparison to the facemask apparatus and system as shown in FIGS. 5A-5B.

Turning now to FIG. 11A, a facemask system 1100 includes a facemask apparatus 1102. Facemask apparatus 1102 includes a plurality of electrodes 1104, and may optionally include one or more of a stress sensor 1106, a temperature sensor 1108 and a pulse oximeter sensor 1110 as shown. Electrodes 1104 may optionally be implemented as described with regard to electrodes 530 as shown in FIG. 5B, for example. Electrodes 1104 include a ground electrode 1105 and a reference electrode 1107.

Stress sensor 1106 may optionally include a galvanic skin monitor, to monitor sweat on the skin of the face which may be used as a proxy for stress. Temperature sensor 1108, in some implementations, measures the temperature of the skin of the face. Pulse oximeter sensor 1110 may optionally be used to measure oxygen concentration in the blood of the skin of the face.

Stress sensor 1106 is, in some implementations, connected to a local stress board 1112, including a galvanic skin response module 1114 and a stress board connector 1116. The measurements from stress sensor 1106 are, in some implementations, processed into a measurement of galvanic skin response by galvanic skin response module 1114. Stress board connector 1116 in turn is in communication with a bus 1118. Bus 1118 is in communication with a main board 1120 (see FIG. 11B).

Temperature sensor 1108 and pulse oximeter sensor 1110 are, in some implementations, connected to a local pulse oximeter board 1122, which includes a pulse oximeter module 1124 and a pulse oximeter board connector 1126. Pulse oximeter module 1124, in some implementations, processes the measurements from pulse oximeter sensor 1110 into a measurement of blood oxygen level. Pulse oximeter module 1124 also, in some implementations, processes the measurements from temperature sensor 1108 into a measurement of skin temperature. Pulse oximeter board connector 1126 in turn is in communication with bus 1118. A facemask apparatus connector 1128 on facemask apparatus 1102 is coupled to a local board (not shown), which in turn is in communication with main board 1120 in a similar arrangement to that shown in FIGS. 5A-5C.

FIG. 11B shows another portion of system 1100, featuring main board 1120 and bus 1118. Main board 1120 has a number of components that are repeated from the main board shown in FIGS. 5A-5C; these components are numbered according to the numbering shown therein. Main board 1120, in some implementations, features a microcontroller 1130, which may be implemented similarly to microcontroller 542 of FIGS. 5A-5C but which now features logic and/or programming to be able to control and/or receive input from additional components. A connector 1132, in some implementations, connects to an additional power supply (not shown). Connector 550 connects to bus 1118.

Figure 12A:
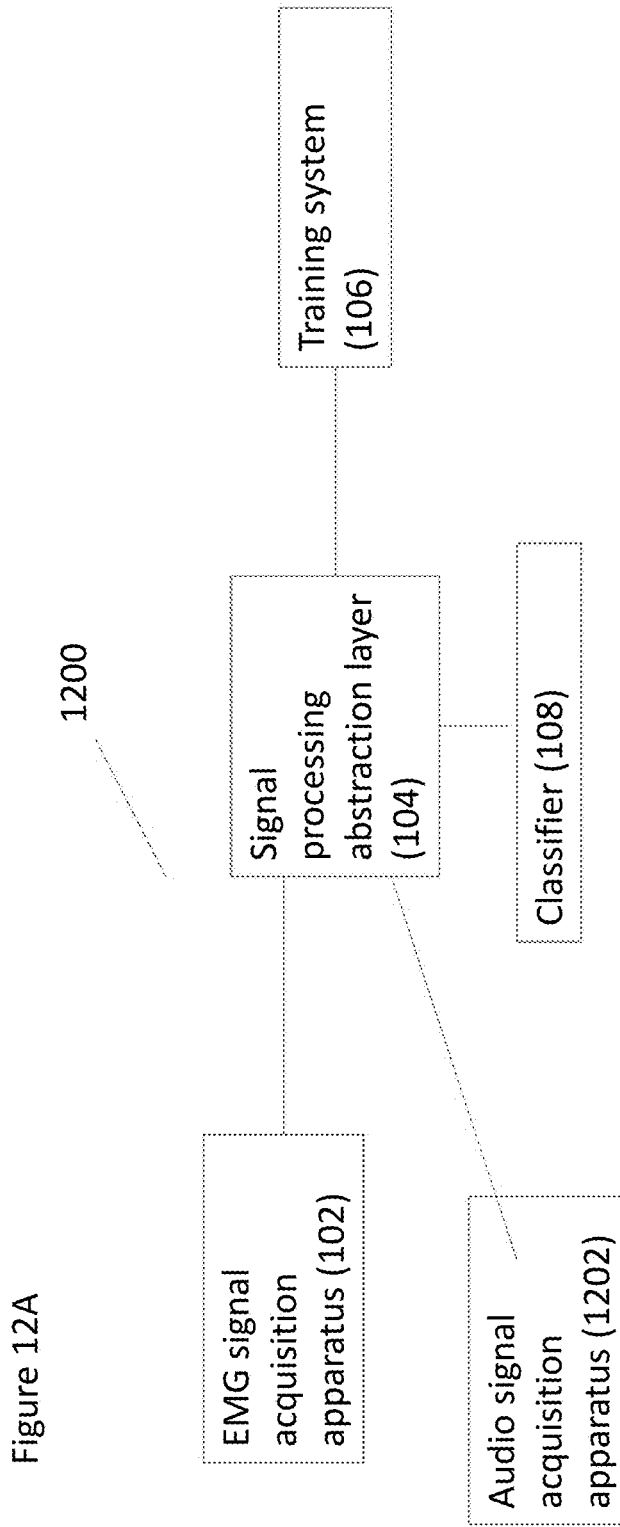
FIG. 12A shows another exemplary system overview according to at least some embodiments of the present invention.

FIG. 12A shows another exemplary system overview according to at least some embodiments of the present invention. As shown, a system 1200 features a number of components from FIG. 1A, having the same or similar function. In addition, system 1200 features an audio signal acquisition apparatus 1202, which may for example comprise a microphone. As described in greater detail below, system 1200 may optionally correct, or at least reduce the amount of, interference of speaking on facial expression classification. When the subject wearing EMG signal acquisition apparatus 102 is speaking, facial muscles are used or affected by such speech. Therefore, optionally the operation of classifier 108 is adjusted when speech is detected, for example according to audio signals from audio signal acquisition apparatus 1202.

Figure 12B:
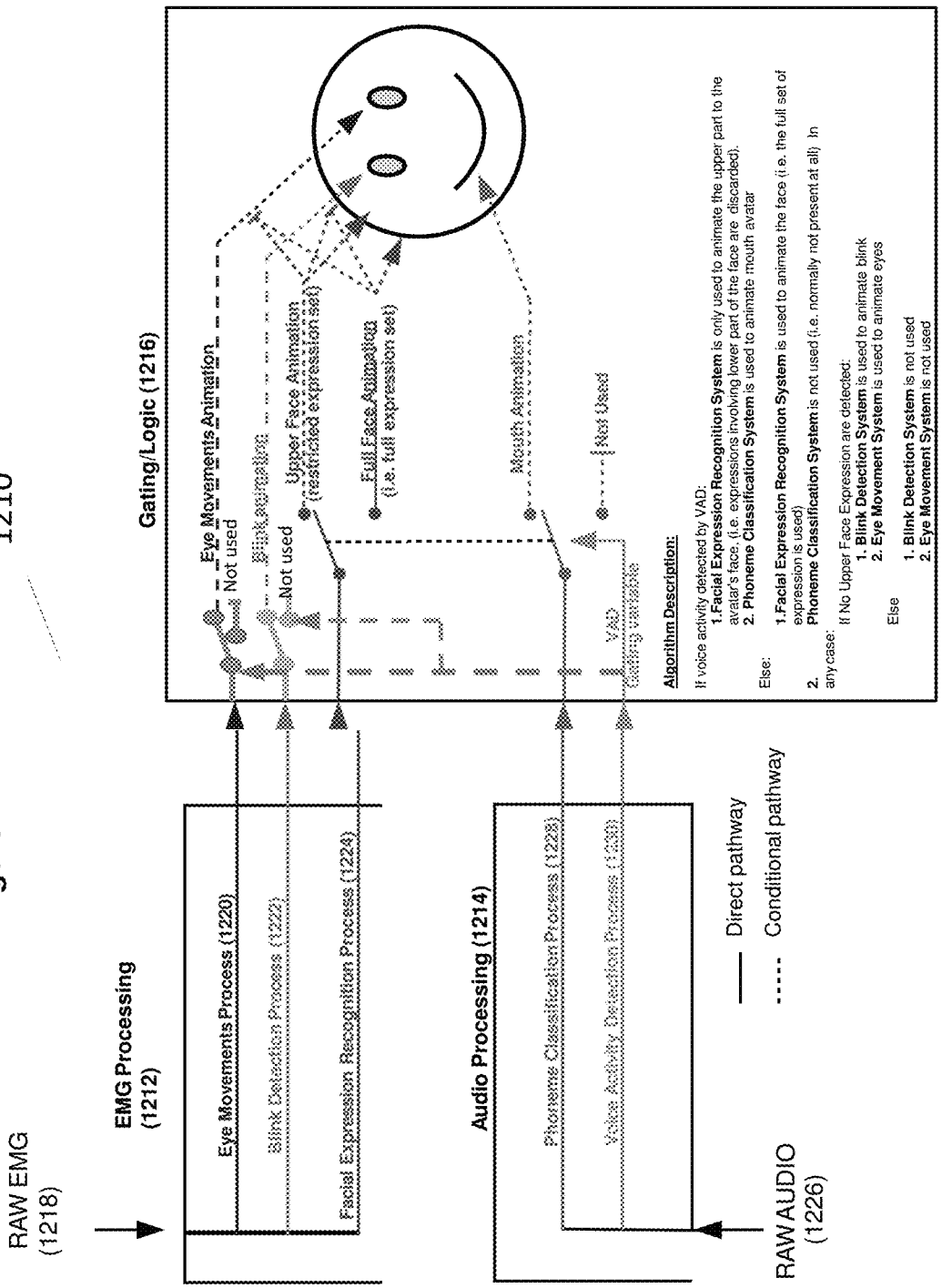
FIG. 12B shows an exemplary processing flow overview according to at least some embodiments of the present invention.

FIG. 12B shows an exemplary processing flow overview according to at least some embodiments of the present invention. As shown, a flow 1210 includes an EMG processing 1212, an audio processing 1214 and a gating/logic 1216.

EMG processing 1212 begins with input raw EMG data from a raw EMG 1218, such as for example from EMG signal acquisition apparatus 102 or any facemask implementation as described herein (not shown). Raw EMG 1218 may for example include 8 channels of data (one for each electrode), provided as 16 bits @2000 Hz. Next, EMG processing 1212 processes the raw EMG data to yield eye motion detection in an eye movements process 1220. In addition, EMG processing 1212 determines a blink detection process 1222, to detect blinking. EMG processing 1212 also performs a facial expression recognition process 1224, to detect the facial expression of the subject. All three processes are described in greater detail with regard to a non-limiting implementation in FIG. 13.

Optionally EMG processing 1212 also is able to extract cardiac related information, including without limitation heart rate, ECG signals and the like. This information can be extracted as described above with regard to eye movements process 1220 and blink detection process 1222.

Audio processing 1214 begins with input raw audio data from a raw audio 1226, for example from a microphone or any type of audio data collection device. Raw audio 1226 may for example include mono, 16 bits, @44100 Hz data.

Raw audio 1226 then feeds into a phoneme classification process 1228 and a voice activity detection process 1230. Both processes are described in greater detail with regard to a non-limiting implementation in FIG. 14.

Figure 15:
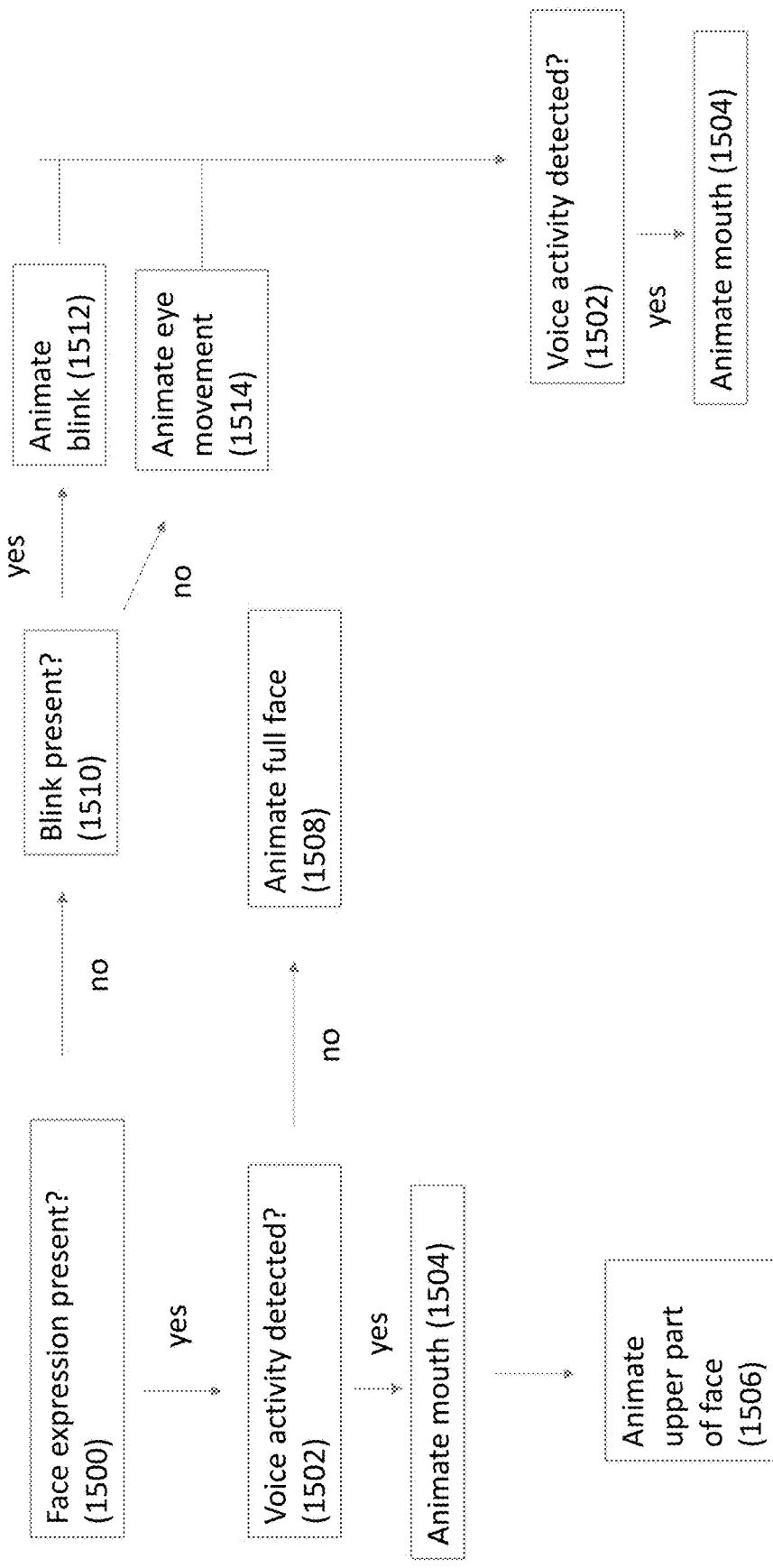
FIG. 15 describes an exemplary, non-limiting flow for the process of gating/logic 1216.

A non-limiting implementation of gating/logic 1216 is described with regard to FIG. 15. In the non-limiting example shown in FIG. 12B, the signals have been analyzed to determine that voice activity has been detected, which means that the mouth animation process is operating, to animate the mouth of the avatar (if present). Either eye movement or blink animation is provided for the eyes, or upper face animation is provided for the face; however, preferably full face animation is not provided.

Figure 13:
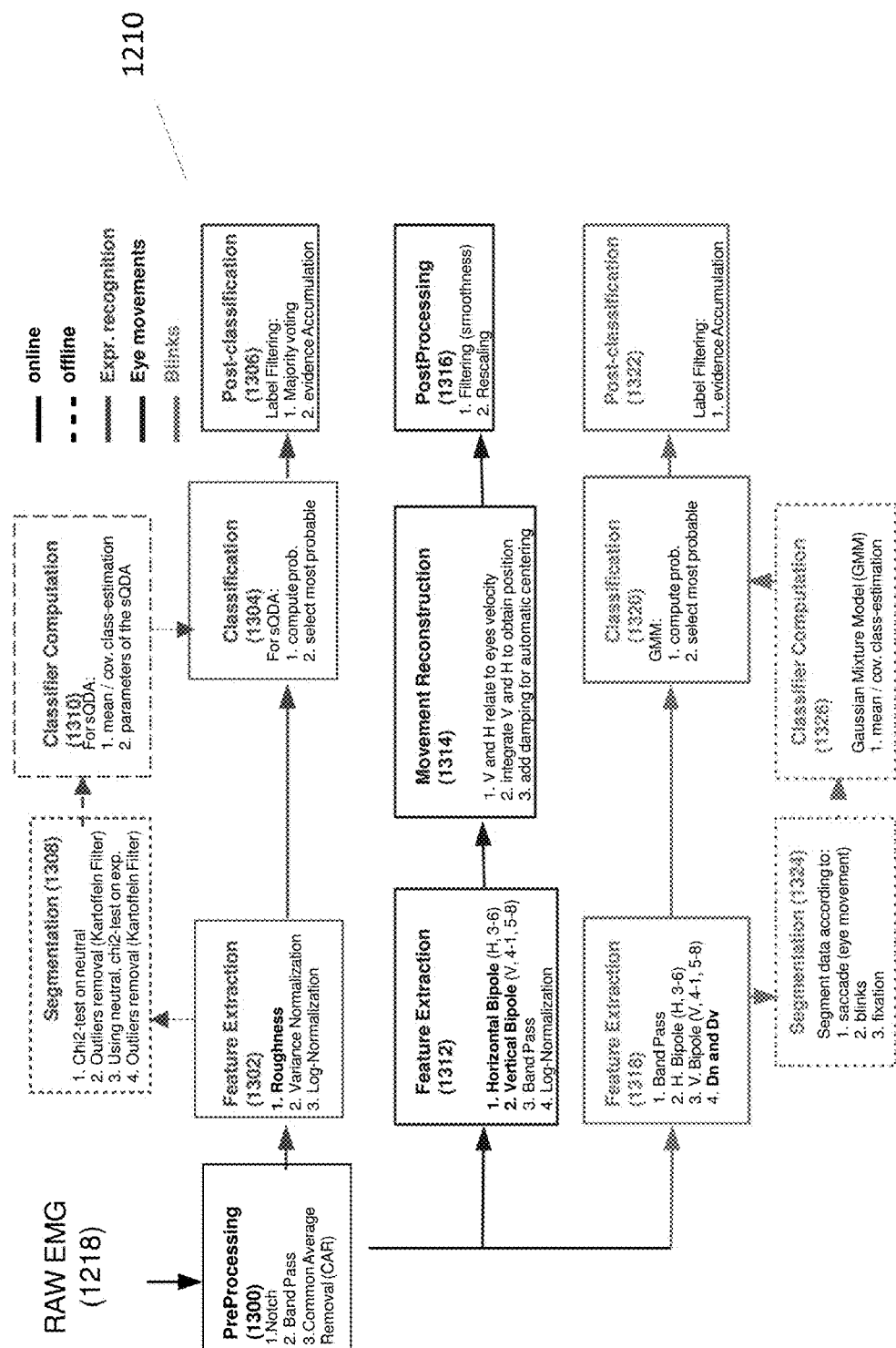
FIG. 13 shows a non-limiting implementation of EMG processing 1212.

FIG. 13 shows a non-limiting implementation of EMG processing 1212. Eye movements process 1220 is shown in blue, blink detection process 1222 is shown in green and facial expression recognition process 1224 is shown in red. An optional preprocessing 1300 is shown in black; preprocessing 1300 was not included in FIG. 12B for the sake of simplicity.

Raw EMG 1218 is received by EMG processing 1212 to begin the process. Preprocessing 1300 preferably preprocesses the data. Optionally, preprocessing 1300 may begin with a notch process to remove electrical power line interference or PLI (such as noise from power inlets and/or a power supply), such as for example 50 Hz or 60 Hz, plus its harmonics. This noise has well-defined characteristics that depend on location. Typically in the European Union, PLI appears in EMG recordings as strong 50 Hz signal in addition to a mixture of its harmonics, whereas in the US or Japan, it appears as a 60 Hz signal plus a mixture of its harmonics.

To remove PLI from the recordings, the signals are optionally filtered with two series of Butterworth notch filter of order 1 with different sets of cutoff frequencies to obtain the proper filtered signal. EMG data are optionally first filtered with a series of filter at 50 Hz and all its harmonics up to the Nyquist frequency, and then with a second series of filter with cutoff frequency at 60 Hz and all its harmonics up to the Nyquist frequency.

In theory, it would have been sufficient to only remove PLI related to the country in which recordings were made, however since the notch filter removes PLI and also all EMG information present in the notch frequency band from the data, it is safer for compatibility issues to always apply the two sets of filters.

Next a bandpass filter is optionally applied, to improve the signal to noise ratio (SNR). As described in greater detail below, the bandpass filter preferably comprises a low pass filter between 0.5 and 150 Hz. EMG data are noisy, can exhibit subject-to-subject variability, can exhibit device-to device variability and, at least in some cases, the informative frequency band is/are not known.

These properties affect the facemask performances in different ways. It is likely that not all of the frequencies carry useful information. It is highly probable that some frequency bands carry only noise. This noise can be problematic for analysis, for example by altering the performance of the facemask.

As an example, imagine a recording where each electrode is contaminated differently by 50 Hz noise, so that even after common average referencing (described in greater detail below), there is still noise in the recordings. This noise is environmental, so that one can assume that all data recorded in the same room will have the same noise content. Now if a global classifier is computed using these data, it will probably give good performances when tested in the same environment. However if tested it elsewhere, the classifier may not give a good performance.

To tackle this problem, one can simply filter the EMG data. However to do it efficiently, one has to define which frequency band contains useful information. As previously described, the facial expression classification algorithm uses a unique feature: the roughness. The roughness is defined as the filtered (with a moving average, exponential smoothing or any other low-pass filter) squared second derivative of the input. So it is a non-linear transform of the (preprocessed) EMG data, which means it is difficult to determine to which frequency the roughness is sensitive.

Various experiments were performed (not shown) to determine the frequency or frequency range to which roughness is sensitive. These experiments showed that while roughness has sensitivity in all the frequency bands, it is non-linearly more sensitive to higher frequencies than lower ones. Lower frequency bands contain more information for roughness. Roughness also enhances high-frequency content. Optionally, the sampling rate may create artifacts on the roughness. For example, high frequency content (>~900 Hz) was found to be represented in the 0-200 Hz domains.

After further testing (not shown), it was found that a bandpass filter improved the performance of the analysis, due to a good effect on roughness. The optimal cutoff frequency of the bandpass filter was found to be between 0.5 and 40 Hz. Optionally its high cutoff frequency it 150 Hz.

After the bandpass filter is applied, optionally CAR (common average referencing) is performed, as for the previously described common mode removal.

The preprocessed data then moves to the three processes of eye movements process 1220 (blue), blink detection process 1222 (green) and facial expression recognition process 1224 (red). Starting with facial expression recognition process 1224, the data first undergoes a feature extraction process 1302, as the start of the real time or "online" process. Feature extraction process 1302 includes determination of roughness as previously described, optionally followed by variance normalization and log normalization also as previously described. Next a classification process 1304 is performed to classify the facial expression, for example by using sQDA as previously described.

Next, a post-classification process 1306 is optionally performed, preferably to perform label filtering, for example according to majority voting, and/or evidence accumulation, also known as serial classification. The idea of majority voting consists in counting the occurrence of each class within a given time window and to return the most frequent label. Serial classification selects the label that has the highest joint probability over a given time window. That is, the output of the serial classification is the class for which the product of the posterior conditional probabilities (or sum of the log-posterior conditional probabilities) over a given time window is the highest. Testing demonstrated that both majority voting and serial classification effectively smoothed the output labels, producing a stable result (data not shown), and may optionally be applied whether singly or as a combination.

An offline training process is preferably performed before the real time classification process is performed, such that the results of the training process may inform the real time classification process. The offline training process preferably includes a segmentation 1308 and a classifier computation 1310.

Segmentation 1308 optionally includes the following steps:
1. Chi²-test on neutral
2. Outliers removal (Kartoffeln Filter)
3. Using neutral, chi2-test on the expression
4. Outliers removal (Kartoffeln Filter)

The Chi²-test on the neutral expression is performed to create a detector for the neutral expression. As previously described, separation of neutral and non-neutral expressions may optionally be performed to increase the performance accuracy of the classifier. Next the Kartoffeln Filter is applied to determine outliers. If an expression is determined to be non-neutral, as in step 3, then the segmentation window needs to be longer than the expression to capture it fully. Other statistical tests may optionally be used, to determine the difference between neutral and non-neutral expressions for segmentation. Outliers are then removed from this segmentation as well.

The Kartoffeln filter may optionally be performed as follows. Assume a P-dimensional variable x that follows a P-dimensional Gaussian distribution:

$$x \sim \mathcal{N}(\mu, \Sigma)$$

with $\mu$ its P-dimensional mean and/its covariance matrix. For any P-dimensional data point rt at time step t, one can compute the probability that it comes from the aforementioned P-dimensional Gaussian distribution. To do so one can use the generalization of the standard z-score in P-dimension, called $\chi^2$-score given by:

$$z_t = (r_t - \mu)^T \Sigma^{-1} (r_t - \mu)$$

This score represents the distance between the actual data point $r_t$ and the mean $\mu$ of the reference Normal distribution in unit of the covariance matrix $\Sigma$.

Using $z_t$, one can easily test the probability that a given point $r_t$ comes from a reference normal distribution parametrized by $\mu$ and $\Sigma$ simply by looking at a $\chi^2$ ($\alpha$, df) distribution table with the correct degree of freedom df and probability $\alpha$.

Thus by thresholding the time series z with a threshold $\chi^2$ ($\alpha_{th}$, df), it is possible to remove all data points that have probabilities lower than $\alpha_{th}$ to come from the reference Normal distribution.

The outlier filtering process (i.e. also known as the Kartoffeln filter) is simply an iterative application of the aforementioned thresholding method. Assume one has data points r where $$r \in \mathbb{R}^{P \times T}$$

with P=8 the dimension (i.e. the number of electrodes) and T the total number of data points in the data set.
1. Compute the sample mean:

$$\mu = \frac{1}{T} \sum_{t=1}^{T} r_t$$

2. Compute the sample covariance:

$$\Sigma = \frac{1}{T-1} \sum_{t=1}^{T} (r_t - \mu)(r_t - \mu)^T$$

3. Compute the $\chi^2$-score:

$$z_t = (r_t - \mu)^T \Sigma^{-1} (r_t - \mu)$$

4. Remove all the $T_1$ data point with $$z_t > \chi^2(a_{th}, df)$$

from the data set, so that we now have the new data set $$\hat{r} \in \mathbb{R}^{P \times (T - T_1)}$$

which is a subset of r
5. Update data points distribution $T \leftarrow (T - T_1)$ and $r \leftarrow \hat{r}$
6. Go back to point 1 until not more points are removed (i.e., $T_1 = 0$)

In theory and depending on the threshold value, this algorithm will iteratively remove points that do not come from its estimated underlying Gaussian distribution, until all the points in the data set are likely to come from the same P distribution. In other words, assuming Gaussianity, it removes outliers from a data set. This algorithm is empirically stable and efficiently removes outliers from a data set.

Classifier computation 1310 is used to train the classifier and construct its parameters as described herein.

Turning now to eye movements process 1220, a feature extraction 1312 is performed, optionally as described with regard to Toivanen et al ("A probabilistic real-time algorithm for detecting blinks, saccades, and fixations from EOG data", Journal of Eye Movement Research, 8(2):1,1-14). The process detects eye movements (EOG) from the EMG data, to automatically detect blink, saccade, and fixation events. A saccade is a rapid movement of the eye between fixation points. A fixation event is the fixation of the eye upon a fixation point.

This process optionally includes the following steps (for 1-3, the order is not restricted):
1. Horizontal Bipole (H, 304c-304d)
2. Vertical Bipole (V, 304a-304e; 304b-304f)
3. Band Pass
4. Log-Normalization
5. Feature extraction Horizontal bipole and vertical bipole are determined as they relate to the velocity of the eye movements. These signals are then optionally subjected to at least a low pass bandpass filter, but may optionally also be subject to a high pass bandpass filter. The signals are then optionally log normalized.

Feature extraction preferably at least includes determination of two features. A first feature, denoted as Dn, is the norm of the derivative of the filtered horizontal and vertical EOG signals:

$$D_n = \sqrt{\left(\frac{dH}{dt}\right)^2 + \left(\frac{dV}{dt}\right)^2}$$

where H and V denote the horizontal and vertical components of the EOG signal. This feature is useful in separating fixations from blinks and saccades.

The second feature, denoted as Dv, is used for separating blinks from saccades. With the positive electrode for the vertical EOG located above the eye (signal level increases when the eyelid closes), the feature is defined as:

$$D_v = \max - \min - |\max + \min|.$$

Both features may optionally be used for both eye movements process 1220 and blink detection process 1222, which may optionally be performed concurrently.

Next, turning back to eye movements process 1220, a movement reconstruction process 1314 is performed. As previously noted, the vertical and horizontal bipole signals relate to the eye movement velocity. Both bipole signals are integrated to determine the position of the eye. Optionally damping is added for automatic centering.

Next post-processing 1316 is performed, optionally featuring filtering for smoothness and rescaling. Rescaling may optionally be made to fit the points from −1 to 1.

Blink detection process 1222 begins with feature extraction 1318, which may optionally be performed as previously described for feature extraction 1312. Next, a classification 1320 is optionally be performed, for example by using a GMM (Gaussian mixture model) classifier. GMM classifiers are known in the art; for example, Lotte et al describe the use of a GMM for classifying EEG data ("A review of classification algorithms for EEG-based brain-computer interfaces", Journal of Neural Engineering 4(2). July 2007). A post-classification process 1322 may optionally be performed for label filtering, for example according to evidence accumulation as previously described.

An offline training process is preferably performed before the real time classification process is performed, such that the results of the training process may inform the real time classification process. The offline training process preferably includes a segmentation 1324 and a classifier computation 1326.

Segmentation 1324 optionally includes segmenting the data into blinks, saccades and fixations, as previously described.

Classifier computation 1326 preferably includes training the GMM. The GMM classifier may optionally be trained with an expectation maximization (EM) algorithm (see for example Patrikar and Baker, "Improving accuracy of Gaussian mixture model classifiers with additional discriminative training", Neural Networks (IJCNN), 2016 International Joint Conference on). Optionally the GMM is trained to operate according to the mean and/or co-variance of the data.

Figure 14:
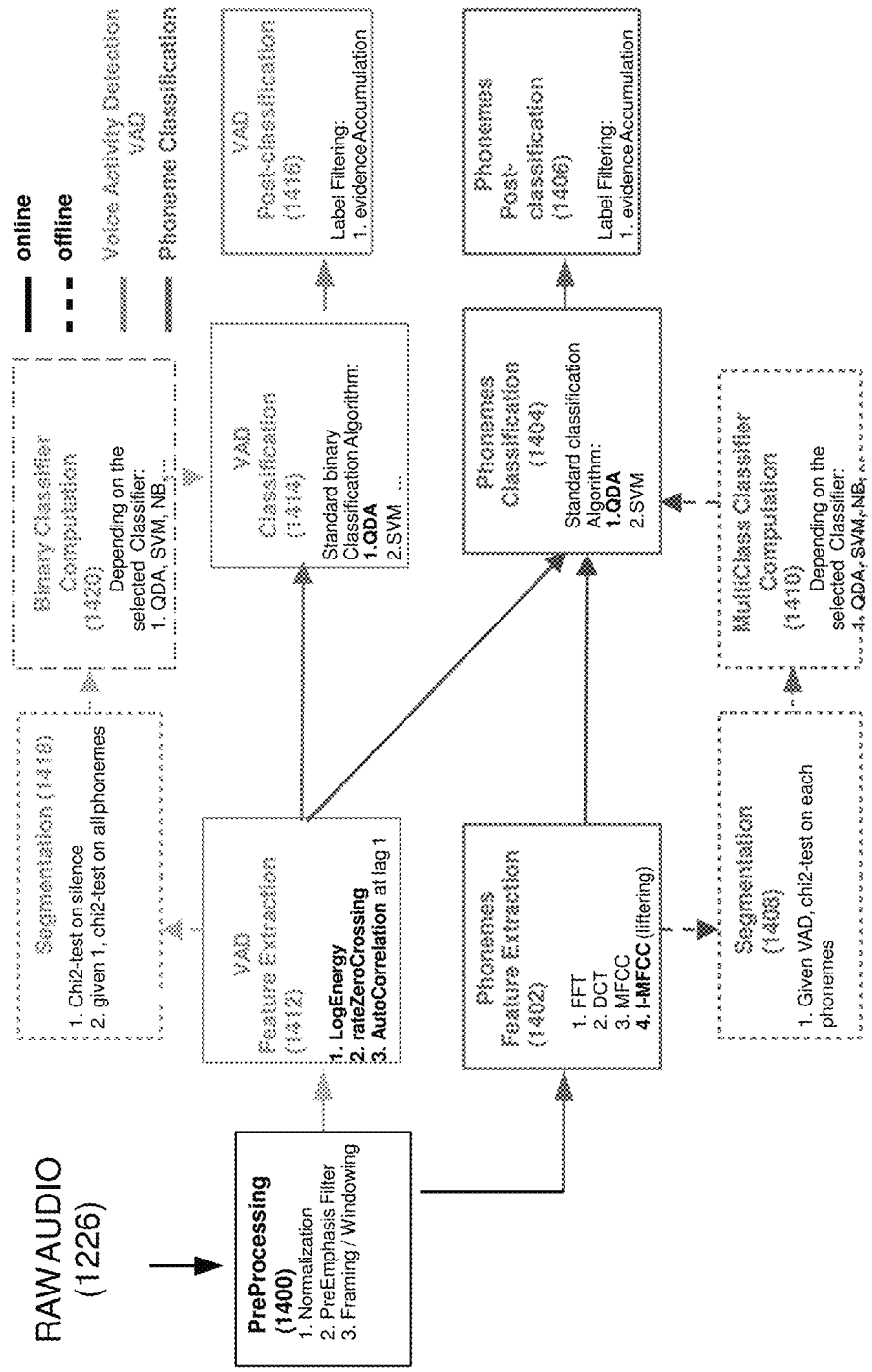
FIG. 14 shows a non-limiting, exemplary implementation of audio processing 1214.

FIG. 14 shows a non-limiting, exemplary implementation of audio processing 1214, shown as phoneme classification process 1228 (red) and voice activity detection process 1230 (green).

Raw audio 1226 feeds into a preprocessing process 1400, which optionally includes the following steps:
1. Optional normalization (audio sensor dependent, so that the audio data is within a certain range, preferably between −1 and 1)
2. PreEmphasis Filter
3. Framing/Windowing The pre-emphasis filter and windowing are optionally performed as described with regard to "COMPUTING MEL-FREQUENCY CEPSTRAL COEFFICIENTS ON THE POWER SPECTRUM" (Molau et al, Acoustics, Speech, and Signal Processing, 2001. Proceedings. (ICASSP '01). 2001 IEEE International Conference on). The filter involves differentiating the audio signal and may optionally be performed as described in Section 5.2 of "The HTK Book", by Young et al (Cambridge University Engineering Department, 2009). The differentiated signal is then cut into a number of overlapping segments for windowing, which may for example optionally be each 25 ms long and shifted by 10 ms. The windowing is preferably performed according to a Hamming window, as described in Section 5.2 of "The HTK Book".

Next, the preprocessed data is fed into phoneme classification process 1228, which begins with a phonemes feature extraction 1402. Phonemes feature extraction 1402 may optionally feature the following steps, which may optionally also be performed according to the above reference by Molau et al:
1. FFT
2. DCT
3. MFCC
4. 1-MFCC (liftering).

The filtered and windowed signal is then analyzed by FFT (Fast Fourier Transform). The Molau et al reference describes additional steps between the FFT and the DCT (discrete cosine transformation), which may optionally be performed (although the step of VTN warping is preferably not performed). In any case the DCT is applied, followed by performance of the MFCC (Mel-frequency cepstral coefficients; also described in Sections 5.3, 5.4 and 5.6 of "The HTK Book").

Next liftering is performed as described in Section 5.3 of "The HTK Book".

The extracted phonemes are then fed into a phonemes classification 1404, which may optionally use any classifier as described herein, for example any facial expression classification method as described herein. Next a phonemes post-classification process 1406 is performed, which may optionally comprise any type of suitable label filtering, such as for example the previously described evidence accumulation process.

An offline training process is preferably performed before the real time classification process is performed, such that the results of the training process may inform the real time classification process. The offline training process preferably includes a segmentation 1408 and a classifier computation 1410. Segmentation 1408 preferably receives the results of voice activity detection process 1230 as a first input to determine whether phonemes can be classified. Given that voice activity is detected, segmentation 1408 then preferably performs a $Chi^2$ test on the detected phonemes. Next, classifier computation 1410 preferably performs a multiclass computation which is determined according to the type of classifier selected.

Turning now to voice activity detection process 1230, raw audio 1226 is fed into a VAD (voice activity detection) feature extraction 1412. VAD feature extraction 1412 optionally performs the following steps:
1. LogEnergy
2. rateZeroCrossing
3. AutoCorrelation at lag 1

The LogEnergy step may optionally be performed as described in Section 5.8 of "The HTK Book".

The rateZeroCrossing step may optionally be performed as described in Section 4.2 of "A large set of audio features for sound description (similarity and classification) in the CUIDADO project", by G. Peeters, 2004, https://www.researchgate.net/publication/200688649_A_large_set_of_audio_features_for_sound_description_similarity_and_classification_in_the_CUIDADO_project). This step can help to distinguish between periodic sounds and noise.

The autocorrelation step may optionally be performed as described in Section 4.1 of "A large set of audio features for sound description (similarity and classification) in the CUIDADO project".

Optionally, time derivatives may also be obtained as part of the feature extraction process, for example as described in Section 5.9 of "The HTK Book".

The output of VAD feature extraction 1412 is preferably fed to both a VAD classification 1414 and the previously described phonemes classification 1414. In addition, segmentation 1408 preferably also has access to the output of VAD feature extraction 1412.

Turning now to VAD classification 1414, this process may optionally be performed according to any classifier as described herein, for example any facial expression classification method as described herein.

Next a VAD post-classification process 1416 is performed, which may optionally comprise any type of suitable label filtering, such as for example the previously described evidence accumulation process.

An offline training process is preferably performed before the real time classification process is performed, such that the results of the training process may inform the real time classification process. The offline training process preferably includes a segmentation 1418 and a classifier computation 1420. Segmentation 1418 preferably performs a $Chi^2$ test on silence, which may optionally include background noise, which may for example be performed by asking the subject to be silent. Given that silence is not detected, segmentation 1418 next preferably performs a $Chi^2$ test on the detected phonemes (performed when the subject has been asked to speak the phonemes).

Next, classifier computation 1420 preferably performs a binary computation (on voice activity/not voice activity) which is determined according to the type of classifier selected.

FIG. 15 describes an exemplary, non-limiting flow for the process of gating/logic 1216. As shown, at 1500, it is determined whether a face expression is present. The face expression may for example be determined according to the previously described facial expression recognition process (1224).

At 1502, it is determined whether voice activity is detected by VAD, for example according to the previously described voice activity detection process (1230). If so, then mouth animation (for animating the mouth of the avatar, if present) is preferably performed in 1504, for example as determined according to the previously described phoneme classification process (1228). The avatar animation features a predetermined set of phonemes, with each phoneme being animated, preferably including morphing between states represented by different phoneme animations. Optionally only a subset of phonemes is animated.

Next, an upper face expression is animated in stage 1506, for example as determined according to the previously described facial expression recognition process (1224). Once voice activity has been detected, preferably expressions involving the lower part of the face are discarded and are not considered.

Turning now back to 1502, if no voice activity is detected, then a full face expression is animated in 1508.

Turning back now to 1500, if no face expression is detected, then it is determined whether a blink is present in 1510. If so, then it is animated in 1512. The blink may optionally be determined according to the previously described blink detection process (1222).

If not, then eye movement is animated in 1514. The eye movement(s) may optionally be determined according to the previously described eye movements process 1220.

After either 1512 or 1514, the process returns to detection of voice activity in 1502, and animation of the mouth if voice activity is detected in 1504.

Figure 16:
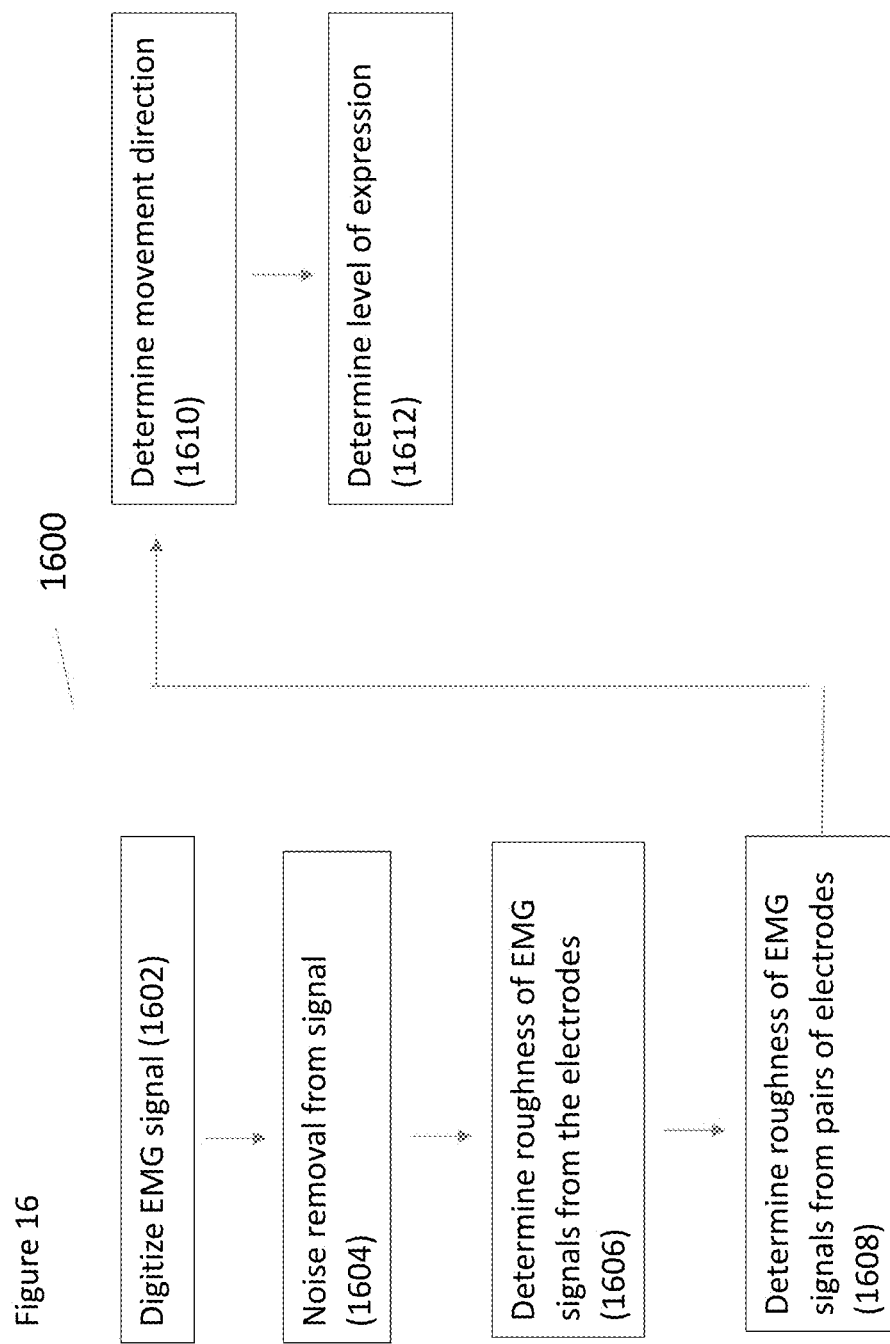
FIG. 16 shows an exemplary, non-limiting, illustrative method for determining features of EMG signals according to some embodiments.

FIG. 16 shows an exemplary, non-limiting, illustrative method for determining features of EMG signals according to some embodiments. As shown, in a method 1600, the method begins with digitizing the EMG signal in 1602, followed by noise removal from the signal in 1604. In stage 1606, the roughness of EMG signals from individual electrodes is determined, for example as previously described.

In stage 1608, the roughness of EMG signals from pairs of electrodes, or roughness of EMG-dipoles, is determined. Roughness of the EMG signal is an accurate descriptor of the muscular activity at a given location, i.e. the recording site, however facial expressions involve co-activation of different muscles. Part of this co-activation is encoded in the difference in electrical activity picked up by electrode pairs. Such dipoles capture information that specifically describes co-activation of electrode pairs. To capture this co-activation it is possible to extend the feature space by considering the roughness of the "EMG-dipoles". EMG-dipoles are defined as the differences in activity between any pairs of electrodes, (dipole)

$$x_{(i,j),t}^{(dipole)} = x(i)_t - x_{(j),t}$$

for electrodes i and j at time-step t, such that for N EMG signals, the dimensionality of the EMG-dipole is $N(N-1)$. After having computed these EMG-dipoles, it is straightforward to compute their roughness as previously described for single electrode EMG signals. Since roughness computation takes the square of the double derivative of the input, a signal from electrode pair (i, j) gives a similar result to a signal from electrode pair (j, i), so that by removing redundant dimension in the roughness space, the full roughness dipole dimensionality is $N(N-1)/2$. The full feature space is given by concatenating the N-dimensional roughness $r_t^{(ma)}$ with the $N(N-1)/2$ dimensional roughness, leading to a $N^2/2$ dimensional feature space.

In stage 1610, a direction of movement may be determined. Motion direction carries relevant information about facial expressions, which may optionally be applied, for example to facial expression classification. EMG-dipole captures relative motion direction by computing differences between pairs of electrodes before taking the square of the signal. Optionally, information about motion direction (for example as extracted from dipole activity) may be embedded directly into the roughness calculation by changing its signs depending on the inferred direction of motion. Without wishing to be limited by a single hypothesis, this approach enables an increase of the information carried by the features without increasing the dimensionality of the feature space, which can be useful for example and without limitation when operating the method on devices with low computational power, such as smart-phones as a non-limiting example.

In stage 1612, a level of expression may be determined, for example according to the standard deviation of the roughness as previously described.

Roughness and the results of any of stages 1608, 1610 and 1612 are non-limiting examples of features, which may be calculated or "extracted" from the EMG signals (directly or indirectly) as described above.

Figure 17A:
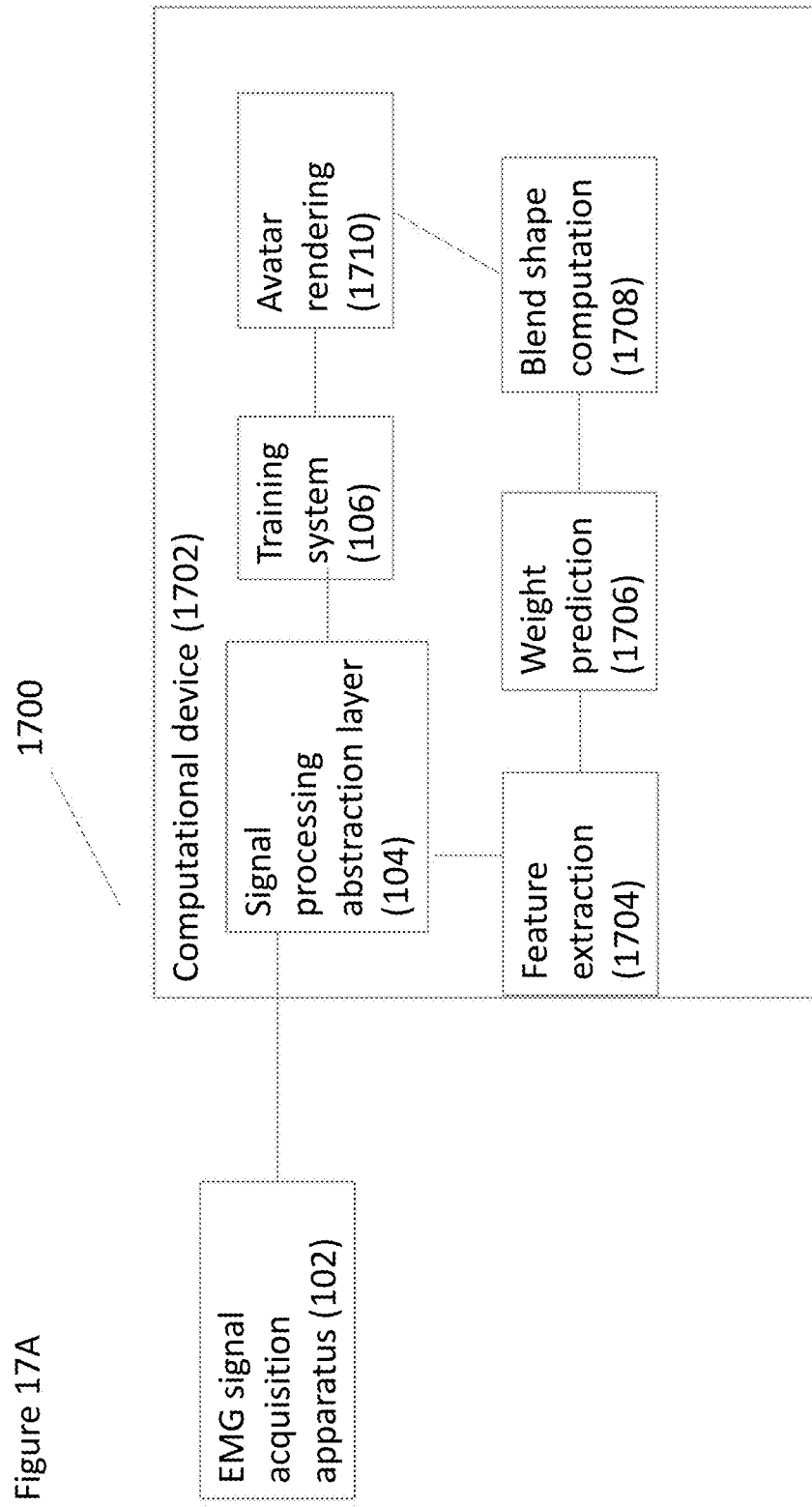
FIG. 17A shows an exemplary, non-limiting, illustrative system for facial expression tracking through morphing according to some embodiments.
Figure 17B:
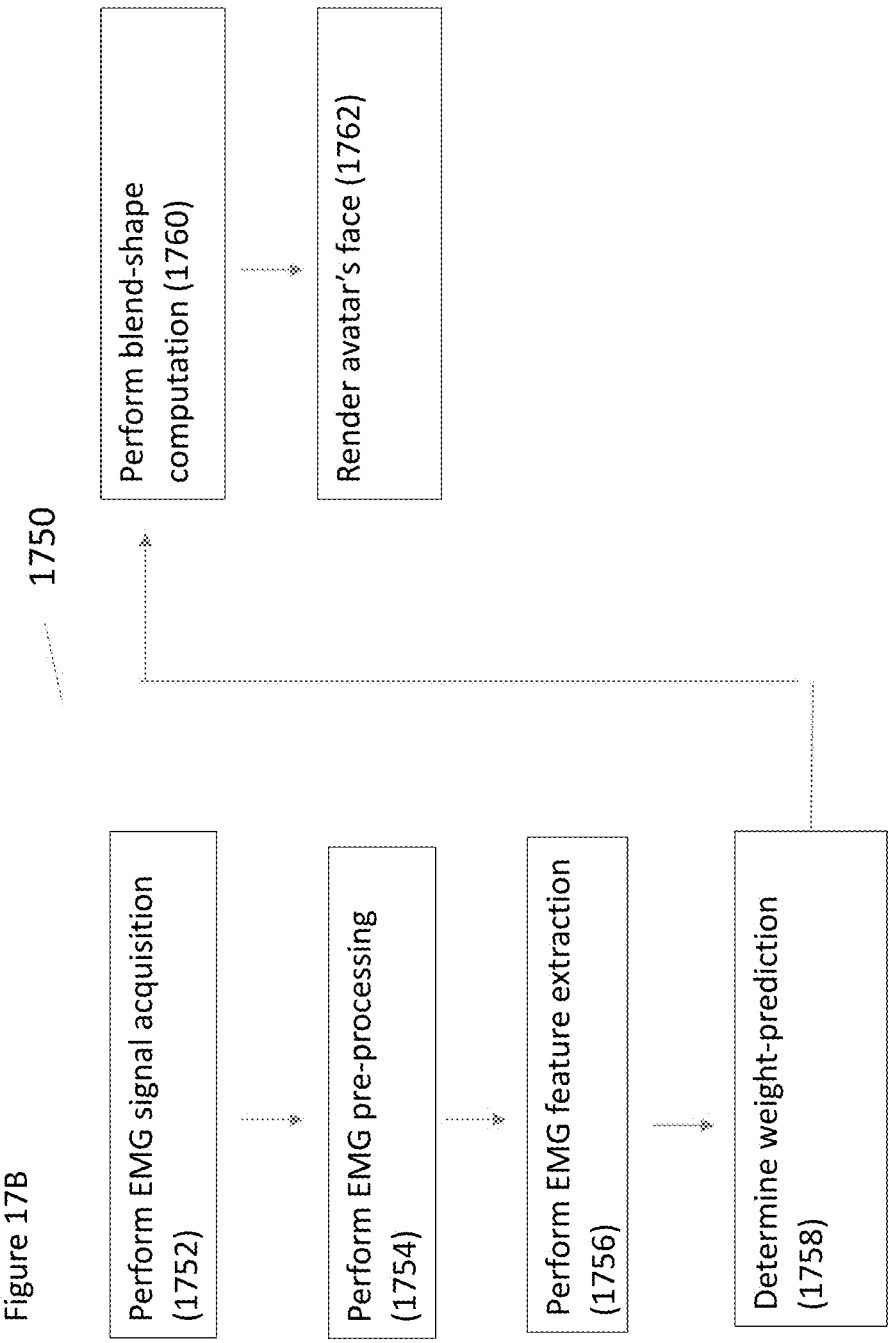
FIG. 17B shows an exemplary, non-limiting, illustrative method for facial expression tracking through morphing according to some embodiments.

FIG. 17A shows an exemplary, non-limiting, illustrative system for facial expression tracking through morphing according to some embodiments, while FIG. 17B shows an exemplary, non-limiting, illustrative method for facial expression tracking through morphing according to some embodiments.

Turning now to FIG. 17A, a system 1700 features a computational device 1702 in communication with EMG signal acquisition apparatus 102. EMG signal acquisition apparatus 102 may be implemented as previously described. Although computational device 1702 is shown as being separate from EMG signal acquisition apparatus 102, optionally they are combined, for example as previously described.

Computational device 1702 preferably operates signal processing abstraction layer 104 and training system 106, each of which may be implemented as previously described. Computational device 1702 also preferably operates a feature extraction module 1704, which may extract features of the signals. Non-limiting examples of such features include roughness, dipole-EMG, direction of movement and level of facial expression, which may be calculated as described herein. Features may then be passed to a weight prediction module 1706, for performing weight-prediction based on extracted features. Such a weight-prediction is optionally performed, for example to reduce the computational complexity and/or resources required for various applications of the results. A non-limiting example of such an application is animation, which may be performed by system 1700. Animations are typically displayed at 60 (or 90 Hz), which is one single frame every 16 ms (11 ms, respectively), whereas the predicted weights are computed at 2000 Hz (one weight-vector $\hat{w}_t$ every 0.5 ms). It is possible to take advantage of these differences in frequency by smoothing the predicted weight (using exponential smoothing filter, or moving average) without introducing a noticeable delay. This smoothing is important since it will manifest as a more natural display of facial expressions.

A blend shape computational module 1708 optionally blends the basic avatar with the results of the various facial expressions to create a more seamless avatar for animation applications. Avatar rendering is then optionally performed by an avatar rendering module 1710, which receives the blend-shape results from blend shape computational module 1708. Avatar rendering module 1710 is optionally in communication with training system 106 for further input on the rendering.

Optionally, a computational device 1702, whether part of the EMG apparatus or separate from it in a system configuration, comprises a hardware processor configured to perform a predefined set of basic operations in response to receiving a corresponding basic instruction selected from a predefined native instruction set of codes, as well as memory (not shown). Computational device 1702 comprises a first set of machine codes selected from the native instruction set for receiving EMG data, a second set of machine codes selected from the native instruction set for preprocessing EMG data to determine at least one feature of the EMG data and a third set of machine codes selected from the native instruction set for determining a facial expression and/or determining an animation model according to said at least one feature of the EMG data; wherein each of the first, second and third sets of machine code is stored in the memory.

Turning now to FIG. 17B, a method 1750 optionally features two blocks, a processing block, including stages 1752, 1754 and 1756; and an animation block, including stages 1758, 1760 and 1762.

In stage 1752, EMG signal measurement and acquisition is performed, for example as previously described. In stage 1754, EMG pre-processing is performed, for example as previously described. In stage 1756, EMG feature extraction is performed, for example as previously described.

Next, in stage 1758, weight prediction is determined according to the extracted features. Weight prediction is optionally performed to reduce computational complexity for certain applications, including animation, as previously described.

In stage 1760, blend-shape computation is performed according to a model, which is based upon the blend-shape. For example and without limitation, the model can be related to a muscular model or to a state-of-the-art facial model used in the graphical industry.

The avatar's face is fully described at each moment in time t by a set of values, which may for example be 34 values according to the apparatus described above, called the weight-vector wt. This weight vector is used to blend the avatar's blend-shape to create the final displayed face. Thus to animate the avatar's face it is sufficient to find a model that links the feature space X to the weight w.

Various approaches may optionally be used to determine the model, ranging for example from the simplest multilinear regression to more advanced feed-forward neural network. In any case, finding a good model is always stated as a regression problem, where the loss function is simply taken as the mean squared error (mse) between the model predicted weight $\hat{w}$ and the target weight w.

In stage 1762, the avatar's face is rendered according to the computed blend-shapes.

While the invention has been described with respect to a limited number of embodiments, it will be appreciated that many variations, modifications and other applications of the invention may be made, including different combinations of various embodiments and sub-embodiments, optionally including any suitable combinations and sub-combinations, even if not specifically described herein.

What is claimed is:

1. A method for determining a facial expression on a face of a user, the method operated by a computational device, the method comprising:
   receiving a plurality of EMG (electromyography) electrode signals from EMG electrodes in contact with the face of the user;
   processing said EMG signals to form processed EMG signals, comprising determining roughness of said EMG signals according to a defined window; and
   determining if the facial expression is a neutral expression or a non-neutral expression; and
   classifying said non-neutral expression according to said roughness to determine the facial expression, when the facial expression is a non-neutral expression; wherein said processing said EMG signals to form processed EMG signals further comprises removing noise from said EMG signals before said determining said roughness, and further comprises normalizing said EMG signals after said determining said roughness.

2. The method of claim 1, wherein said electrodes comprise unipolar electrodes and wherein said removing noise comprises removing common mode interference of said unipolar electrodes.

3. The method of claim 2, wherein said defined window occurs within 100 MS.

4. The method of claim 1, wherein said normalizing said EMG signals further comprises calculating a log normal of said EMG signals and normalizing a variance for each electrode.

5. The method of claim 4, wherein said normalizing said EMG signals further comprises calculating covariance across a plurality of users.

6. The method of claim 1, further comprising:
before said classifying the facial expression, training said classifier on a plurality of sets of processed EMG signals from a plurality of training users, wherein:
each set comprising a plurality of groups of processed EMG signals from each training user,
each group of processed EMG signals corresponding to a classified facial expression of said training user;
said training said classifier comprises determining a pattern of covariances for each of said groups of processed EMG signals across said plurality of training users corresponding to each classified facial expression; and
said classifying comprises comparing said normalized EMG signals of the user to said patterns of covariance to adjust said classification of the facial expression of the user.

7. The method of claim 1, wherein said classifying further comprises receiving at least one determined facial expression of the user before said determining if the facial expression is a neutral expression or a non-neutral expression.

8. The method of claim 7, wherein said at least one predetermined facial expression is a neutral expression.

9. The method of claim 7, wherein said at least one predetermined facial expression is a non-neutral expression.

10. The method of claim 1, further comprising:
training said classifier, before said classifying the facial expression, on a plurality of sets of processed EMG signals from a plurality of training users, wherein:
each set comprising a plurality of groups of processed EMG signals from each training user,
each group of processed EMG signals corresponding to a classified facial expression of said training user;
said training further comprises:
assessing a similarity score for said classified facial expressions of said training users, and
fusing together each plurality of said classified facial expressions having said similarity score above a threshold indicating excessive similarity, to form a reduced number of said classified facial expressions wherein said training said classifier comprises training on said reduced number of said previously classified facial expressions.

11. The method of claim 10, wherein said training further comprises:
determining a pattern of variance for each of said groups of processed EMG signals across said plurality of training users corresponding to each classified facial expression,
wherein said classifying comprises comparing said processed EMG signals of the user to said patterns of variance to adjust said classification of the facial expression of the user.

12. The method of claim 1, further comprising performing a post-classification process, comprising counting an occurrence of each facial expression within a time window, and returning a most frequent facial expression.

13. The method of claim 1, further comprising performing a post-classification process, comprising selecting a facial expression having a highest joint probability over a given time window according to serial classification.

14. The method of claim 1, further comprising detecting eye motion of the user, according to feature extraction from said EMG signals to detect one or more of blink, saccade, and fixation events.

15. The method of claim 14, wherein said feature extraction further comprises determining a plurality of bipole signals from said EMG signals, said bipole signals comprising one of horizontal bipole signals, vertical bipole signals or a combination thereof.

16. The method of claim 15, wherein said feature extraction further comprises applying band-pass and log normalization to said bipole signals.

17. The method of claim 15, further comprising detecting a blink of the user by separating a blink from a saccade according to detecting an increased signal level for a positive electrode located above an eye of the user.

* * * * *